US012791904B2

(12) United States Patent
Jack et al.

(10) Patent No.: US 12,791,904 B2
(45) Date of Patent: Nov. 10, 2026

(54) CONTROLLING TRANSITIONS IN OPTICALLY SWITCHABLE DEVICES

(71) Applicant: View, Inc., San Jose, CA (US)

(72) Inventors: Gordon Jack, San Jose, CA (US); Sridhar K. Kailasam, Fremont, CA (US); Stephen C. Brown, San Mateo, CA (US); Anshu A. Pradhan, Collierville, TN (US)

(73) Assignee: View Corporation Operation, San Jose, CA (US)

( * ) Notice: Subject to any disclaimer, the term of this patent is extended or adjusted under 35 U.S.C. 154(b) by 220 days.

(21) Appl. No.: 18/756,238

(22) Filed: Jun. 27, 2024

(65) Prior Publication Data

US 2024/0411195 A1 Dec. 12, 2024

Related U.S. Application Data

(60) Continuation of application No. 18/152,573, filed on Jan. 10, 2023, now Pat. No. 12,061,404, which is a (Continued)

(51) Int. Cl.

*G02F 1/163* (2006.01)
*G02F 1/153* (2006.01)

(Continued)

(52) U.S. Cl.

CPC ............ *G02F 1/163* (2013.01); *G02F 1/1533* (2013.01); *G02F 1/155* (2013.01); *G09G 3/19* (2013.01);

(Continued)

(58) Field of Classification Search

CPC ...... G02F 1/163; G02F 1/0121; G02F 1/0018; G02F 1/13306; G02F 1/13318;

(Continued)

(56) References Cited

U.S. PATENT DOCUMENTS 4,217,579 A 8/1980 Hamada et al.
5,124,832 A 6/1992 Greenberg et al.

(Continued)

FOREIGN PATENT DOCUMENTS

AU 2003232073 A1 11/2003
CN 1402067 A 3/2003

(Continued)

OTHER PUBLICATIONS

"SageGlass helps Solar Decathlon- and AIA award-winning home achieve net-zero energy efficiency" in MarketWatch.com, http://www.marketwatch.com/story/sageglass-helps-solar-decathlon-and-aia-award-winning-home-achieve-net-zero-energy-efficiency-2012-06-07, Jun. 7, 2012.

(Continued)

*Primary Examiner* — Brandi N Thomas

(74) *Attorney, Agent, or Firm* — Cha & Reiter, LLC

(57) ABSTRACT

Aspects of this disclosure concern controllers and control methods for applying a drive voltage to bus bars of optically switchable devices such as electrochromic devices. Such devices are often provided on windows such as architectural glass. In certain embodiments, the applied drive voltage is controlled in a manner that efficiently drives an optical transition over the entire surface of the electrochromic device. The drive voltage is controlled to account for differences in effective voltage experienced in regions between the bus bars and regions proximate the bus bars. Regions near the bus bars experience the highest effective voltage.

19 Claims, 17 Drawing Sheets

Related U.S. Application Data continuation of application No. 17/249,265, filed on Feb. 25, 2021, now Pat. No. 11,579,509, which is a continuation of application No. 16/459,142, filed on Jul. 1, 2019, now Pat. No. 10,969,646, which is a continuation of application No. 15/786,488, filed on Oct. 17, 2017, now Pat. No. 10,401,702, which is a division of application No. 14/900,037, filed as application No. PCT/US2014/043514 on Jun. 20, 2014, now Pat. No. 9,885,935, which is a continuation of application No. 13/931,459, filed on Jun. 28, 2013, now Pat. No. 9,412,290.

(51) Int. Cl.

| | |
|---|---|
| ***G02F 1/155*** | (2006.01) |
| ***G09G 3/19*** | (2006.01) |
| ***G09G 3/38*** | (2006.01) |
| *G02F 1/133* | (2006.01) |
| *G02F 1/1343* | (2006.01) |
| *G02F 1/1516* | (2019.01) |
| *G02F 1/157* | (2006.01) |

(52) U.S. Cl.

CPC ........... *G09G 3/38* (2013.01); *G02F 1/13306* (2013.01); *G02F 1/13318* (2013.01); *G02F 1/13439* (2013.01); *G02F 1/15165* (2019.01); *G02F 1/153* (2013.01); *G02F 1/157* (2013.01)

(58) Field of Classification Search

CPC ........... G02F 1/155; G02F 1/157; G09G 3/19; G09G 3/38; G09G 2320/0686; G09G 2360/145; B32B 17/10513; E06B 2009/2464

See application file for complete search history.

(56) References Cited

U.S. PATENT DOCUMENTS

| | | | |
|---|---|---|---|
| 5,124,833 | A | 6/1992 | Barton et al. |
| 5,170,108 | A | 12/1992 | Peterson et al. |
| 5,204,778 | A | 4/1993 | Bechtel |
| 5,220,317 | A | 6/1993 | Lynam et al. |
| 5,290,986 | A | 3/1994 | Colon et al. |
| 5,353,148 | A | 10/1994 | Eid et al. |
| 5,365,365 | A | 11/1994 | Ripoche et al. |
| 5,379,146 | A | 1/1995 | Defendini |
| 5,384,578 | A | 1/1995 | Lynam et al. |
| 5,402,144 | A | 3/1995 | Ripoche |
| 5,451,822 | A | 9/1995 | Bechtel et al. |
| 5,598,000 | A | 1/1997 | Popat |
| 5,621,526 | A | 4/1997 | Kuze |
| 5,673,028 | A | 9/1997 | Levy |
| 5,694,144 | A | 12/1997 | Lefrou et al. |
| 5,764,402 | A | 6/1998 | Thomas et al. |
| 5,822,107 | A | 10/1998 | Lefrou et al. |
| 5,900,720 | A | 5/1999 | Kallman et al. |
| 5,956,012 | A | 9/1999 | Turnbull et al. |
| 5,973,818 | A | 10/1999 | Sjursen et al. |
| 5,973,819 | A | 10/1999 | Pletcher et al. |
| 5,978,126 | A | 11/1999 | Sjursen |
| 6,039,850 | A | 3/2000 | Schulz |
| 6,055,089 | A | 4/2000 | Schulz et al. |
| 6,084,700 | A | 7/2000 | Knapp et al. |
| 6,130,448 | A | 10/2000 | Bauer et al. |
| 6,130,772 | A | 10/2000 | Cava |
| 6,222,177 | B1 | 4/2001 | Bechtel et al. |
| 6,262,831 | B1 | 7/2001 | Bauer et al. |
| 6,317,248 | B1 | 11/2001 | Agrawal et al. |
| 6,362,806 | B1 | 3/2002 | Reichmann et al. |
| 6,386,713 | B1 | 5/2002 | Turnbull et al. |
| 6,407,468 | B1 | 6/2002 | LeVesque et al. |
| 6,407,847 | B1 | 6/2002 | Poll et al. |
| 6,449,082 | B1 | 9/2002 | Agrawal et al. |
| 6,471,360 | B2 | 10/2002 | Rukavina et al. |
| 6,535,126 | B2 | 3/2003 | Lin et al. |
| 6,567,708 | B1 | 5/2003 | Bechtel et al. |
| 6,614,577 | B1 | 9/2003 | Yu et al. |
| 6,707,590 | B1 | 3/2004 | Bartsch |
| 6,795,226 | B2 | 9/2004 | Agrawal et al. |
| 6,829,511 | B2 | 12/2004 | Bechtel et al. |
| 6,856,444 | B2 | 2/2005 | Ingalls et al. |
| 6,897,936 | B1 | 5/2005 | Li et al. |
| 6,940,627 | B2 | 9/2005 | Freeman et al. |
| 6,965,813 | B2 | 11/2005 | Granqvist et al. |
| 7,085,609 | B2 | 8/2006 | Bechtel et al. |
| 7,133,181 | B2 | 11/2006 | Greer |
| 7,215,318 | B2 | 5/2007 | Turnbull et al. |
| 7,277,215 | B2 | 10/2007 | Greer |
| 7,304,787 | B2 | 12/2007 | Whitesides et al. |
| 7,417,397 | B2 | 8/2008 | Berman et al. |
| 7,542,809 | B2 | 6/2009 | Bechtel et al. |
| 7,548,833 | B2 | 6/2009 | Ahmed |
| 7,567,183 | B2 | 7/2009 | Schwenke |
| 7,610,910 | B2 | 11/2009 | Ahmed |
| 7,817,326 | B1 | 10/2010 | Rennig et al. |
| 7,822,490 | B2 | 10/2010 | Bechtel et al. |
| 7,873,490 | B2 | 1/2011 | Macdonald |
| 7,941,245 | B1 | 5/2011 | Popat |
| 7,972,021 | B2 | 7/2011 | Scherer |
| 7,990,603 | B2 | 8/2011 | Ash et al. |
| 8,004,739 | B2 | 8/2011 | Letocart |
| 8,018,644 | B2 | 9/2011 | Gustavsson et al. |
| 8,080,987 | B1 | 12/2011 | Qiu et al. |
| 8,102,586 | B2 | 1/2012 | Albahri |
| 8,213,074 | B1 | 7/2012 | Shrivastava et al. |
| 8,254,013 | B2 | 8/2012 | Mehtani et al. |
| 8,292,228 | B2 | 10/2012 | Mitchell et al. |
| 8,456,729 | B2 | 6/2013 | Brown et al. |
| 8,547,624 | B2 | 10/2013 | Ash et al. |
| 8,705,162 | B2 | 4/2014 | Brown et al. |
| 8,723,467 | B2 | 5/2014 | Berman et al. |
| 8,836,263 | B2 | 9/2014 | Berman et al. |
| 8,864,321 | B2 | 10/2014 | Mehtani et al. |
| 8,902,486 | B1 | 12/2014 | Chandrasekhar |
| 8,976,440 | B2 | 3/2015 | Berland et al. |
| 9,016,630 | B2 | 4/2015 | Mitchell et al. |
| 9,030,725 | B2 | 5/2015 | Pradhan et al. |
| 9,081,247 | B1 | 7/2015 | Pradhan et al. |
| 9,335,602 | B2 | 5/2016 | Chung et al. |
| 9,412,290 | B2 | 8/2016 | Jack et al. |
| 9,454,056 | B2 | 9/2016 | Pradhan et al. |
| 9,477,131 | B2 | 10/2016 | Pradhan et al. |
| 9,482,922 | B2 | 11/2016 | Brown et al. |
| 9,638,978 | B2 | 5/2017 | Brown et al. |
| 9,778,532 | B2 | 10/2017 | Pradhan |
| 9,885,935 | B2 | 2/2018 | Jack et al. |
| 9,921,450 | B2 | 3/2018 | Pradhan et al. |
| 10,120,258 | B2 | 11/2018 | Jack et al. |
| 10,401,702 | B2 | 9/2019 | Jack et al. |
| 10,451,950 | B2 | 10/2019 | Jack et al. |
| 10,503,039 | B2 | 12/2019 | Jack et al. |
| 10,514,582 | B2 | 12/2019 | Jack et al. |
| 10,520,785 | B2 | 12/2019 | Pradhan et al. |
| 10,895,796 | B2 | 1/2021 | Pradhan et al. |
| 10,935,865 | B2 | 3/2021 | Pradhan et al. |
| 10,948,797 | B2 | 3/2021 | Pradhan |
| 10,969,646 | B2 | 4/2021 | Jack et al. |
| 11,030,929 | B2 | 6/2021 | Pradhan et al. |
| 11,112,674 | B2 | 9/2021 | Jack et al. |
| 11,397,360 | B2 | 7/2022 | Greer et al. |
| 11,482,147 | B2 | 10/2022 | Pradhan et al. |
| 11,579,509 | B2 | 2/2023 | Jack et al. |
| 11,592,724 | B2 | 2/2023 | Pradhan et al. |
| 11,630,367 | B2 | 4/2023 | Pradhan et al. |
| 11,640,096 | B2 | 5/2023 | Brown et al. |
| 11,668,991 | B2 | 6/2023 | Pradhan |
| 11,829,045 | B2 | 11/2023 | Jack et al. |
| 11,835,834 | B2 | 12/2023 | Jack et al. |
| 11,927,867 | B2 | 3/2024 | Pradhan et al. |
| 12,061,404 | B2 | 8/2024 | Jack et al. |
| 2002/0030891 | A1 | 3/2002 | Schierbeek |

(56) References Cited

U.S. PATENT DOCUMENTS

2002/0075472 A1 6/2002 Holton
2002/0109900 A1* 8/2002 Johnson .................. G09G 3/38 359/275
2002/0152298 A1 10/2002 Kikta et al.
2003/0210449 A1 11/2003 Ingalls et al.
2003/0210450 A1 11/2003 Yu et al.
2003/0227663 A1 12/2003 Agrawal et al.
2003/0227664 A1 12/2003 Agrawal et al.
2004/0001056 A1 1/2004 Atherton et al.
2004/0135989 A1 7/2004 Klebe
2004/0160322 A1 8/2004 Stilp
2005/0200934 A1 9/2005 Callahan et al.
2005/0225830 A1 10/2005 Huang et al.
2005/0268629 A1 12/2005 Ahmed
2005/0270620 A1 12/2005 Bauer et al.
2005/0278047 A1 12/2005 Ahmed
2006/0018000 A1 1/2006 Greer
2006/0107616 A1 5/2006 Ratti et al.
2006/0170376 A1 8/2006 Piepgras et al.
2006/0187608 A1 8/2006 Stark
2006/0209007 A1 9/2006 Pyo et al.
2006/0245024 A1 11/2006 Greer
2007/0002007 A1 1/2007 Tam
2007/0067048 A1 3/2007 Bechtel et al.
2007/0162233 A1 7/2007 Schwenke
2007/0206263 A1 9/2007 Neuman et al.
2007/0285759 A1 12/2007 Ash et al.
2008/0018979 A1 1/2008 Mahe et al.
2008/0136261 A1 6/2008 Mierta
2009/0027759 A1 1/2009 Albahri
2009/0066157 A1 3/2009 Tarng et al.
2009/0143141 A1 6/2009 Wells et al.
2009/0243732 A1 10/2009 Tarng et al.
2009/0243802 A1 10/2009 Wolf et al.
2009/0296188 A1 12/2009 Jain et al.
2010/0039410 A1 2/2010 Becker et al.
2010/0066484 A1 3/2010 Hanwright et al.
2010/0082081 A1 4/2010 Niessen et al.
2010/0085624 A1 4/2010 Lee et al.
2010/0172009 A1 7/2010 Matthews
2010/0172010 A1 7/2010 Gustavsson et al.
2010/0188057 A1 7/2010 Tarng
2010/0235206 A1 9/2010 Miller et al.
2010/0243427 A1 9/2010 Kozlowski et al.
2010/0245972 A1 9/2010 Wright
2010/0315693 A1 12/2010 Lam et al.
2011/0046810 A1 2/2011 Bechtel et al.
2011/0063708 A1 3/2011 Letocart
2011/0148218 A1 6/2011 Rozbicki
2011/0164304 A1 7/2011 Brown et al.
2011/0167617 A1 7/2011 Letocart
2011/0235152 A1 9/2011 Letocart
2011/0249313 A1 10/2011 Letocart
2011/0255142 A1 10/2011 Ash et al.
2011/0261293 A1 10/2011 Kimura
2011/0266419 A1 11/2011 Jones et al.
2011/0285930 A1 11/2011 Kimura et al.
2011/0286071 A1 11/2011 Huang et al.
2011/0292488 A1 12/2011 McCarthy et al.
2011/0304898 A1 12/2011 Letocart
2012/0026573 A1 2/2012 Collins et al.
2012/0062975 A1* 3/2012 Mehtani .................. G02F 1/163 359/265
2012/0062976 A1 3/2012 Burdis
2012/0133315 A1 5/2012 Berman et al.
2012/0190386 A1 7/2012 Anderson
2012/0194895 A1 8/2012 Podbelski et al.
2012/0200908 A1 8/2012 Bergh et al.
2012/0236386 A1 9/2012 Mehtani et al.
2012/0239209 A1 9/2012 Brown et al.
2012/0268803 A1 10/2012 Greer et al.
2012/0293855 A1 11/2012 Shrivastava et al.
2012/0307352 A1 12/2012 Jain et al.
2013/0003157 A1 1/2013 Wang et al.
2013/0057937 A1 3/2013 Berman et al.
2013/0157493 A1 6/2013 Brown
2013/0158790 A1 6/2013 McIntyre, Jr. et al.
2013/0194250 A1 8/2013 Amundson et al.
2013/0222881 A1 8/2013 Aizenberg et al.
2013/0242370 A1 9/2013 Wang
2013/0263510 A1 10/2013 Gassion
2013/0271812 A1 10/2013 Brown et al.
2013/0271813 A1 10/2013 Brown
2013/0271814 A1 10/2013 Brown
2013/0271815 A1 10/2013 Pradhan et al.
2013/0278988 A1 10/2013 Jack et al.
2014/0016053 A1 1/2014 Kimura
2014/0067733 A1 3/2014 Humann
2014/0148996 A1 5/2014 Watkins
2014/0160550 A1 6/2014 Brown et al.
2014/0236323 A1 8/2014 Brown et al.
2014/0259931 A1 9/2014 Plummer
2014/0268287 A1 9/2014 Brown et al.
2014/0300945 A1 10/2014 Parker
2014/0330538 A1 11/2014 Conklin et al.
2014/0368899 A1 12/2014 Greer
2014/0371931 A1 12/2014 Lin et al.
2015/0002919 A1 1/2015 Jack et al.
2015/0049378 A1 2/2015 Shrivastava et al.
2015/0060648 A1 3/2015 Brown et al.
2015/0062975 A1 3/2015 Shet
2015/0070745 A1 3/2015 Pradhan
2015/0116808 A1 4/2015 Branda et al.
2015/0116811 A1 4/2015 Shrivastava et al.
2015/0122474 A1 5/2015 Petersen
2015/0185581 A1 7/2015 Pradhan et al.
2015/0214374 A1 7/2015 Hara et al.
2015/0293422 A1 10/2015 Pradhan et al.
2015/0346574 A1 12/2015 Collins et al.
2015/0346576 A1 12/2015 Pradhan et al.
2015/0355520 A1 12/2015 Chung et al.
2016/0062206 A1 3/2016 Paolini, Jr. et al.
2016/0139477 A1 5/2016 Jack et al.
2016/0202590 A1 7/2016 Ziebarth et al.
2016/0342061 A1 11/2016 Pradhan et al.
2016/0377949 A1 12/2016 Jack et al.
2017/0097553 A1 4/2017 Jack et al.
2017/0131610 A1 5/2017 Brown et al.
2017/0131611 A1 5/2017 Brown et al.
2017/0146884 A1 5/2017 Vigano et al.
2017/0371223 A1 12/2017 Pradhan
2018/0039149 A1 2/2018 Jack et al.
2018/0067372 A1 3/2018 Jack et al.
2018/0143501 A1 5/2018 Nagel et al.
2018/0143502 A1 5/2018 Pradhan et al.
2018/0341163 A1 11/2018 Jack et al.
2019/0025662 A1 1/2019 Jack et al.
2019/0221148 A1 7/2019 Pradhan et al.
2019/0317458 A1 10/2019 Shrivastava et al.
2019/0324342 A1 10/2019 Jack et al.
2019/0356508 A1 11/2019 Trikha et al.
2020/0061975 A1 2/2020 Pradhan et al.
2020/0073193 A1 3/2020 Pradhan et al.
2020/0089074 A1 3/2020 Pradhan et al.
2021/0080793 A1 3/2021 Pradhan et al.
2021/0116770 A1 4/2021 Pradhan et al.
2021/0181593 A1 6/2021 Pradhan
2021/0208468 A1 7/2021 Jack et al.
2021/0210026 A1 7/2021 Telfer et al.
2021/0294174 A1 9/2021 Brown et al.
2021/0356833 A1 11/2021 Jack et al.
2022/0066250 A1 3/2022 Schleder et al.
2022/0334445 A1 10/2022 Jack et al.
2022/0357626 A1 11/2022 Brown et al.
2023/0019843 A1 1/2023 Pradhan et al.
2023/0074720 A1 3/2023 Brown et al.
2023/0108776 A1 4/2023 Jack et al.
2023/0114995 A1 4/2023 Pradhan et al.
2023/0152655 A1 5/2023 Pradhan et al.
2023/0161213 A1 5/2023 Jack et al.
2023/0251542 A1 8/2023 Pradhan
2024/0118578 A1 4/2024 Jack et al.
2024/0142844 A1 5/2024 Pradhan et al.
2024/0248365 A1 7/2024 Pradhan et al.

(56) References Cited

U.S. PATENT DOCUMENTS

| | | | |
|---|---|---|---|
| 2025/0014490 | A1 | 1/2025 | Pradhan et al. |
| 2025/0093725 | A1 | 3/2025 | Kunadian et al. |
| 2025/0147373 | A1 | 5/2025 | Pradhan et al. |
| 2025/0257609 | A1 | 8/2025 | Kunadian et al. |
| 2025/0291223 | A1 | 9/2025 | Jack et al. |
| 2025/0328052 | A1 | 10/2025 | Pradhan et al. |

FOREIGN PATENT DOCUMENTS

| | | | |
|---|---|---|---|
| CN | 2590732 | Y | 12/2003 |
| CN | 1672189 | A | 9/2005 |
| CN | 1675585 | A | 9/2005 |
| CN | 1813280 | A | 8/2006 |
| CN | 1871546 | A | 11/2006 |
| CN | 1892803 | A | 1/2007 |
| CN | 1997935 | A | 7/2007 |
| CN | 101097343 | A | 1/2008 |
| CN | 101120393 | A | 2/2008 |
| CN | 101512423 | A | 8/2009 |
| CN | 101649196 | A | 2/2010 |
| CN | 101673018 | A | 3/2010 |
| CN | 101707892 | A | 5/2010 |
| CN | 101882423 | A | 11/2010 |
| CN | 101969207 | A | 2/2011 |
| CN | 102033380 | A | 4/2011 |
| CN | 102203370 | A | 9/2011 |
| CN | 102440069 | A | 5/2012 |
| CN | 202563220 | U | 11/2012 |
| CN | 103238107 | A | 8/2013 |
| CN | 103492940 | A | 1/2014 |
| CN | 103676391 | A | 3/2014 |
| CN | 104198829 | A | 12/2014 |
| CN | 104321497 | A | 1/2015 |
| CN | 104504292 | A | 4/2015 |
| CN | 104603686 | A | 5/2015 |
| CN | 104698663 | A | 6/2015 |
| CN | 104806128 | A | 7/2015 |
| CN | 105431772 | A | 3/2016 |
| CN | 109143714 | A | 1/2019 |
| DE | 10124673 | A1 | 11/2002 |
| DE | 10343445 | A1 | 4/2005 |
| DE | 10017834 | A1 | 9/2014 |
| EP | 0445314 | A1 | 9/1991 |
| EP | 0445720 | A2 | 9/1991 |
| EP | 0869032 | A2 | 10/1998 |
| EP | 0920210 | A1 | 6/1999 |
| EP | 1055961 | A2 | 11/2000 |
| EP | 0835475 | B1 | 9/2004 |
| EP | 1510854 | A1 | 3/2005 |
| EP | 1417535 | B1 | 11/2005 |
| EP | 1619546 | A2 | 1/2006 |
| EP | 1626306 | A2 | 2/2006 |
| EP | 2161615 | A1 | 3/2010 |
| EP | 2357544 | A2 | 8/2011 |
| EP | 2755197 | A2 | 7/2014 |
| EP | 2764998 | A1 | 8/2014 |
| JP | S6081044 | A | 5/1985 |
| JP | S6311914 | A | 1/1988 |
| JP | S63208830 | A | 8/1988 |
| JP | H02132420 | A | 5/1990 |
| JP | H0356943 | A | 3/1991 |
| JP | H05178645 | A | 7/1993 |
| JP | H1063216 | A | 3/1998 |
| JP | 2004245985 | A | 9/2004 |
| JP | 2007101947 | A | 4/2007 |
| JP | 2010060893 | A | 3/2010 |
| JP | 2010529488 | A | 8/2010 |
| JP | 4694816 | B2 | 6/2011 |
| JP | 4799113 | B2 | 10/2011 |
| JP | 2013057975 | A | 3/2013 |
| JP | 2015530613 | A | 10/2015 |
| JP | 2016038583 | A | 3/2016 |
| KR | 20050092607 | A | 9/2005 |
| KR | 200412640 | Y1 | 3/2006 |
| KR | 100752041 | B1 | 8/2007 |
| KR | 20080022319 | A | 3/2008 |
| KR | 20090026181 | A | 3/2009 |
| KR | 100904847 | B1 | 6/2009 |
| KR | 100931183 | B1 | 12/2009 |
| KR | 20100020417 | A | 2/2010 |
| KR | 20100034361 | A | 4/2010 |
| KR | 20110003698 | A | 1/2011 |
| KR | 20110094672 | A | 8/2011 |
| KR | 20120100665 | A | 9/2012 |
| KR | 20180135741 | A | 12/2018 |
| TW | 434408 | B | 5/2001 |
| TW | 460565 | B | 10/2001 |
| TW | 200532346 | A | 10/2005 |
| TW | 200736782 | A | 10/2007 |
| TW | 200920221 | A | 5/2009 |
| TW | 200920987 | A | 5/2009 |
| TW | 201029838 | A | 8/2010 |
| TW | I336228 | B | 1/2011 |
| TW | 201235757 | A | 9/2012 |
| TW | 201248286 | A | 12/2012 |
| TW | 201248486 | A | 12/2012 |
| TW | 201319704 | A | 5/2013 |
| TW | 201510605 | A | 3/2015 |
| WO | WO-9816870 | A1 | 4/1998 |
| WO | WO-0213052 | A2 | 2/2002 |
| WO | WO-2004003649 | A1 | 1/2004 |
| WO | WO-2005098811 | A1 | 10/2005 |
| WO | WO-2005103807 | A2 | 11/2005 |
| WO | WO-2007016546 | A2 | 2/2007 |
| WO | WO-2007146862 | A2 | 12/2007 |
| WO | WO-2008030018 | A1 | 3/2008 |
| WO | WO-2008147322 | A1 | 12/2008 |
| WO | WO-2009124647 | A1 | 10/2009 |
| WO | WO-2010120771 | A1 | 10/2010 |
| WO | WO-2011020478 | A1 | 2/2011 |
| WO | WO-2011087684 | A1 | 7/2011 |
| WO | WO-2011087687 | A1 | 7/2011 |
| WO | WO-2011124720 | A2 | 10/2011 |
| WO | WO-2011127015 | A1 | 10/2011 |
| WO | WO-2012079159 | A1 | 6/2012 |
| WO | WO-2012080618 | A1 | 6/2012 |
| WO | WO-2012080656 | A1 | 6/2012 |
| WO | WO-2012080657 | A1 | 6/2012 |
| WO | WO-2012125325 | A2 | 9/2012 |
| WO | WO-2012145155 | A1 | 10/2012 |
| WO | WO-2013059674 | A1 | 4/2013 |
| WO | WO-2013109881 | A2 | 7/2013 |
| WO | WO-2013155467 | A1 | 10/2013 |
| WO | WO-2013158365 | A1 | 10/2013 |
| WO | WO-2014121863 | A1 | 8/2014 |
| WO | WO-2014130471 | A1 | 8/2014 |
| WO | WO-2014134451 | A2 | 9/2014 |
| WO | WO-2014209812 | A1 | 12/2014 |
| WO | WO-2015077097 | A1 | 5/2015 |
| WO | WO-2015134789 | A1 | 9/2015 |
| WO | WO-2017123138 | A1 | 7/2017 |
| WO | WO-2017189307 | A2 | 11/2017 |
| WO | WO-2017189307 | A8 | 3/2018 |
| WO | WO-2018128906 | A1 | 7/2018 |
| WO | 2023009972 | A1 | 2/2023 |
| WO | 2023212087 | | 11/2023 |

OTHER PUBLICATIONS

APC by Schneider Electric, Smart-UPS 120V Product Brochure, 2013, 8 pp.

CA Office Action dated Aug. 6, 2024 in CA Application No. 3205173.

CA Office Action dated Dec. 2, 2022 in Application No. CA3001233.

CA Office Action dated Dec. 22, 2021, in Application No. CA2916862.

CA Office Action dated Jan. 20, 2022, in Application No. CA2880920.

CA Office Action dated May 24, 2023, in application No. CA3022490.

CA Office Action dated Nov. 2, 2023 in CA Application No. CA3001233.

Canadian Office Action dated Jun. 9, 2020 issued in CA Application No. 2,880,920.

Canadian Office Action dated May 23, 2019 in CA Application No. 2,880,920.

(56) References Cited

OTHER PUBLICATIONS

Chinese Notice of Allowance (w/Search Report) dated Jan. 8, 2019 in CN Application No. 201480042689.2.
Chinese Office Action dated Aug. 27, 2020 in Chinese Application No. 201580055381.6.
Chinese Office Action dated Aug. 5, 2015 in Chinese Application No. 201280020475.6.
Chinese Office Action dated Dec. 14, 2020 in CN Application No. 201680063171.6.
Chinese Office Action dated Feb. 2, 2021 in Chinese Application No. 201580055381.6.
Chinese Office Action dated Jun. 1, 2018 in CN Application No. 201480042689.2.
Chinese Office Action dated Jun. 22, 2016 in CN Application No. 201380046356.2.
Chinese Office Action dated Mar. 20, 2020 in Chinese Application No. 201580055381.6.
Chinese Office Action dated Mar. 26, 2015 in CN Application No. 201280060910.8.
Chinese Office Action dated Mar. 4, 2020 in CN Application No. 201611216264.6.
Chinese Office Action dated May 13, 2021 in Chinese Application No. 201680063171.6.
Chinese Office Action dated May 18, 2021 in Chinese Application No. 201780033674.3.
Chinese Office Action dated May 19, 2016 in Chinese Application No. 201280020475.6.
Chinese Office Action dated Nov. 11, 2015 in Chinese Application No. 201380046356.2.
Chinese Office Action dated Nov. 18, 2020 in Chinese Application No. 201580055381.6.
Chinese Office Action dated Oct. 9, 2020 in Chinese Application No. 201780033674.3.
CN Office Action dated Aug. 18, 2023, in Application No. CN202110930339.1 with English translation.
CN Office Action dated Aug. 21, 2023, in Application No. CN202210372916.4 with English translation.
CN Office Action dated Jan. 10, 2022, in Application No. CN201780033674.3 with English Translation.
CN Office Action dated Oct. 25, 2021, in application No. CN201910216428.2 with English translation.
CN Office Action dated Sep. 15, 2021, in Application No. CN20178033674 with English translation.
CN Office Action dated Sep. 20, 2023, in Application No. CN202111422558.5 withEnglish translation.
Communication re Third-Party Observation dated Dec. 4, 2014 and Third-Party Observation dated Dec. 3, 2014 in PCT/US2014/016974.
Duchon, Claude E. et al., “Estimating Cloud Type from Pyranometer Observations,” Journal of Applied Meteorology, vol. 38, Jan. 1999, pp. 132-141.
EP Extended European Search Report dated Dec. 16, 2022 in Application No. EP22189558.4.
EP Extended European Search report dated May 7, 2024 in EP Application No. 24154933.6.
EP office action dated Apr. 24, 2023, in application No. EP21187538.0.
EP Office Action dated Dec. 13, 2023, in EP Application No. 12756917.6.
EP Office Action dated Dec. 18, 2023 in EP Application No. 22189558.4.
EP Office Action dated Jul. 24, 2024, in EP Application No. 22189558.4.
EP office action dated Jun. 7, 2023, in application No. EP21155613.9.
EP Office Action dated Jun. 27, 2024 in EP Application No. 21187538.0.
EP Office Action dated May 25, 2022, in Application No. EP20120756917.6.
EP Office Action dated Oct. 12, 2021, in Application No. EP17790130.3.
European Extended Search Report dated Jan. 26, 2017 in European Application No. 14818692.7.
European Extended Search Report dated Oct. 19, 2018 in European Application No. 18186119.6.
European Office Action dated Aug. 5, 2020 in EP Application No. 12756917.6.
European Office Action dated Feb. 21, 2023 for EP Application No. EP21165344.9.
European Office Action dated Jul. 12, 2017 in European Application No. 12756917.6.
European Office Action dated Jun. 26, 2019 in EP Application No. 15842292.3.
European Office Action dated Mar. 30, 2023 in Application No. EP21191793.5.
European Office Action dated Nov. 27, 2018 in EP Application No. 12756917.6.
European Office Action dated Nov. 27, 2020 in EP Application No. 17790130.3.
European Office Action dated Sep. 13, 2019 in EP Application No. 13828274.4.
European Office Action dated Sep. 30, 2019 in EP Application No. 18186119.6.
European Search Report dated Aug. 11, 2014 in European Application No. 12757877.1.
European Search Report dated Jul. 23, 2014 in European Application No. 12756917.6.
European Search Report dated Jul. 29, 2014 in European Application No. 12758250.0.
European Search Report dated Mar. 13, 2018 in EP Application No. 15842292.3.
European Search Report dated Mar. 30, 2016 in EP Application No. 13828274.4.
European Search Report dated Mar. 5, 2015 in European Application No. 12841714.4.
European Search Report (extended) dated Apr. 2, 2019 in European Application No. 16854332.0.
European Search Report (extended) dated Jun. 14, 2018 in European Application No. 15842292.3.
European Search Report (extended) dated Sep. 5, 2019 in EP Application No. 17790130.3.
European Summons to Oral Proceedings dated Jun. 12, 2020 in EP Application No. 15842292.3.
European Summons to Oral Proceedings dated May 11, 2020 in EP Application No. 18186119.6.
European Supplemental Search Report dated Jun. 16, 2021 in European Application No. 21165344.9.
Extended European Search Report dated Dec. 6, 2021, in application No. 21191793.5.
Extended European Search Report dated May 27, 2021 in EP Application No. 21155613.9.
Extended European Search Report dated Oct. 19, 2021, in application No. EP21187538.0.
Final Office Action dated Jun. 5, 2015 in U.S. Appl. No. 13/968,258.
Graham, Steve, “Clouds & Radiation,” Mar. 1, 1999. [http://earthobservatory.nasa.gov/Features/Clouds/].
Haby, Jeff, “Cloud Detection (IR v. VIS),” (known as of Sep. 3, 2014) [http://theweatherprediction.com/habyhints2/512/].
“Halio Rooftop Sensor Kit (Model SR500),” Product Data Sheet, Kinestral Technologies, 2020, 4 pp.
Hoosier Energy, “How do they do that? Measuring Real-Time Cloud Activity” Hoosier Energy Current Connections, (known as of Sep. 3, 2014). ( http://members.questline.com/Article.aspx?articleID=18550&accountID=196000&nl=11774).
“How Cleantech wants to make a 2012 comeback” http://mountainview.patch.com/articles/how-cleantech-wants-to-make-a-2012-comeback, Jan. 23, 2012.
IN Examination Report dated Sep. 15, 2021, in Application No. IN202028000731.
IN First Examination Report dated Sep. 15, 2021, in Application No. IN202048034247.

(56) References Cited

OTHER PUBLICATIONS

IN Office Action dated Jul. 25, 2022, in Application No. IN202128059149.
IN Office Action dated Mar. 2, 2022 in Application No. IN202138033318.
Indian Examination Report dated Dec. 17, 2018 in IN Application No. 242/MUMNP/2015.
Indian Office Action dated Dec. 22, 2020 in IN Appliclation No. 201837009842.
Indian Office Action dated Feb. 12, 2020 in IN Application No. 201647000484.
International Preliminary Report on Patentability and Written Opinion dated Feb. 8, 2024 in PCT Application No. PCT/US2022/074221.
International Preliminary Report on Patentability dated Apr. 19, 2018, issued in PCT/US2016/055781.
International Preliminary Report on Patentability dated Feb. 19, 2015 issued in PCT/US2013/053625.
International Preliminary Report on Patentability dated Jan. 7, 2016 issued in PCT/US2014/043514.
International Preliminary Report on Patentability dated Mar. 30, 2017, issued in PCT/US2015/050047.
International Preliminary Report on Patentability dated May 1, 2014 in PCT/US2012/061137.
International Preliminary Report on Patentability dated Oct. 23, 2014 issued in PCT/US2013/036456.
International Preliminary Report on Patentability dated Oct. 30, 2014 issued in PCT/US2013/034998.
International Preliminary Report on Patentability dated Oct. 30, 2014 issued in PCT/US2013/036235.
International Preliminary Report on Patentability dated Oct. 30, 2018 in PCT/US17/28443.
International Preliminary Report on Patentability dated Sep. 26, 2013, issued in PCT/US2012/027742.
International Preliminary Report on Patentability dated Sep. 26, 2013, issued in PCT/US2012/027828.
International Preliminary Report on Patentability dated Sep. 26, 2013, issued in PCT/US2012/027909.
International Search Report and Written Opinion dated Aug. 2, 2023 in PCT Application No. PCT/US2023/020030.
International Search Report and Written Opinion dated Dec. 26, 2013, issued in PCT/US2013/053625.
International Search Report and Written Opinion dated Feb. 19, 2016, issued in PCT/US2015/050047.
International Search Report and Written Opinion dated Jan. 19, 2017, issued in PCT/US2016/055781.
International Search Report and Written Opinion dated Jul. 11, 2013, issued in PCT/US2013/034998.
International Search Report and Written Opinion dated Jul. 23, 2013, issued in PCT/US2013/036235.
International Search Report and Written Opinion dated Jul. 26, 2013, issued in PCT/US2013/036456.
International Search Report and Written Opinion dated Jun. 19, 2017 in PCT/US17/28443.
International Search Report and Written Opinion dated Mar. 28, 2013 in PCT/US2012/061137.
International Search Report and Written Opinion dated May 26, 2014 in PCT/US2014/016974.
International Search Report and Written Opinion dated Nov. 15, 2022 in PCT Application No. PCT/US2022/074221.
International Search Report and Written Opinion dated Oct. 16, 2014, issued in PCT/US2014/043514.
International Search Report and Written Opinion dated Oct. 27, 20223 in PCT Application No. PCT/US2023/026578.
International Search Report and Written Opinion dated Sep. 24, 2012, issued in PCT/US2012/027742.
International Search Report and Written Opinion dated Sep. 24, 2012, issued in PCT/US2012/027909.
International Search Report and Written Opinion dated Sep. 26, 2012, issued in PCT/US2012/027828.
Japanese Office Action dated Apr. 25, 2017 for JP Application No. 2015-526607.
Japanese Office Action dated Aug. 6, 2019 for JP Application No. 2017-243890.
Japanese Office Action dated Jan. 22, 2019 for JP Application No. 2017-243890.
Kipp & Zonen, "Solar Radiation" (known as of Sep. 3, 2014) [http://www.kippzonen.com/Knowledge-Center/Theoretical-info/Solar-Radiation].
Kleissl, Jan et al., "Recent Advances in Solar Variability Modeling and Solar Forecasting at UC San Diego," Proceedings, American Solar Energy Society, 2013 Solar Conference, Apr. 16-20, 2013, Baltimore, MD.
Korean Office Action dated Dec. 4, 2019 for KR Application No. 10-2015-7005247.
Korean Office Action dated Jun. 22, 2020 for KR Application No. 10-2020-7014838.
Korean Office Action dated May 31, 2019 for KR Application No. 10-2015-7005247.
KR Office action dated Aug. 22, 2022 in KR Application No. KR10-2022-7027594 with English translation.
KR Office Action dated Aug. 23, 2021 in Application No. KR-10-2021-7013335 with English Translation.
KR Office Action dated Feb. 25, 2022, in Application No. KR10-2021-7013335 with English translation.
Letter dated Dec. 1, 2014 re Prior Art re U.S. Appl. No. 13/772,969 from Ryan D. Ricks representing MechoShade Systems, Inc.
Lim, Sunnie H.N. et al., "Modeling of optical and energy performance of tungsten-oxide-based electrochromic windows including their intermediate states," Solar Energy Materials & Solar Cells, vol. 108, Oct. 16, 2012, pp. 129-135.
National Aeronautics & Space Administration, "Cloud Radar System (CRS)," (known as of Sep. 3, 2014), published date of Jun. 16, 2014, [ http://har.gsfc.nasa.gov/index.php?section=12].
National Aeronautics & Space Administration, "Cloud Remote Sensing and Modeling," (known as of Sep. 3, 2014), published date of Sep. 15, 2014, [http://atmospheres.gsfc.nasa.gov/climate/index.php?section=134 ].
"New from Pella: Windows with Smartphone-run blinds", Pella Corp., http://www.desmoinesregister.com/article/20120114/BUSINESS/301140031/0/biggame/?odyssey=nav%7Chead, Jan. 13, 2012.
Notice of Allowance dated Aug. 6, 2021 in U.S. Appl. No. 16/132,226.
Notice of Third-Party Observations dated Mar. 26, 2021 in EP Application No. 12756917.6.
Office Action dated Oct. 6, 2014 in U.S. Appl. No. 13/968,258.
"SPN1 Sunshine Pyranometer," Product Overview, Specification, Accessories and Product Resources, Delta-T Devices, May 5, 2016, 9 pp. https://www.delta-t.co.uk/product/spn1/ (downloaded Apr. 28, 2020).
Preliminary Amendment filed Dec. 8, 2016 for U.S. Appl. No. 15/195,880.
Preliminary Amendment filed May 24, 2016 for U.S. Appl. No. 14/900,037.
"Remote Sensing: Clouds," Department of Atmospheric and Ocean Science, University of Maryland, (known as of Sep. 3, 2014) [http://www.atmos.umd.edu/~pinker/remote_sensing_clouds.htm].
Russian Decision to Grant with Search Report dated Apr. 11, 2018 in Russian Application No. 2016102399.
Russian Office Action dated Aug. 22, 2017 in RU Application No. 2015107563.
Science and Technology Facilities Council. "Cloud Radar: Predicting The Weather More Accurately." Science Daily, Oct. 1, 2008. [www.sciencedaily.com/releases/2008/09/080924085200.htm].
Taiwanese Office Action dated Feb. 4, 2021 in TW Appliclation No. 105132659.
Taiwanese Office Action dated Jan. 11, 2016 TW Application No. 101108947.
Taiwanese Office Action dated Jul. 3, 2019 in TW Application No. 107101943.
Taiwanese Office Action dated Sep. 11, 2017 in TW Application No. 103122419.
Taiwanese Office Action dated Sep. 14, 2016 TW Application No. 105119037.

(56) References Cited

OTHER PUBLICATIONS

Third-Party Submission dated Feb. 2, 2015 and Feb. 18, 2015 PTO Notice re Third-Party Submission for U.S. Appl. No. 13/772,969.
TW Office Action dated Feb. 23, 2022, in Application No. TW110140782 with English translation.
TW Office Action dated Jul. 18, 2023, in Application No. TW111119514 with English Translation.
TW Office action dated Nov. 4, 2021, in TW Application No. TW20110000762 with English translation.
TW Office Action dated Sep. 3, 2021, in TW Application No. 11020865850 with English translation.
U.S. Corrected Notice of Allowance dated Sep. 23, 2022 in U.S. Appl. No. 16/097,197.
U.S. Notice of Allowance dated Jul. 12, 2022 in U.S. Appl. No. 16/097,197.
U.S. Corrected Notice of Allowance dated Aug. 11, 2023, in U.S. Appl. No. 18/047,839.
U.S. Corrected Notice of Allowance dated Feb. 2, 2023 in U.S. Appl. No. 17/247,088.
U.S. Corrected Notice of Allowance dated Feb. 6, 2023 in U.S. Appl. No. 17/247,825.
US Final Office Action dated Apr. 30, 2012 in U.S. Appl. No. 13/049,750.
U.S. Final Office Action dated Aug. 19, 2013 in U.S. Appl. No. 13/049,756.
US Final Office Action dated Feb. 11, 2021 in U.S. Appl. No. 16/132,226.
US Final Office Action dated Feb. 26, 2015 in U.S. Appl. No. 13/479,137.
US Final Office Action dated Jan. 14, 2020 in U.S. Appl. No. 15/685,624.
US Final Office Action dated Jan. 27, 2014 in U.S. Appl. No. 13/479,137.
U.S. Final Office Action dated Jul. 2, 2015 in U.S. Appl. No. 13/049,756.
US Final Office Action dated May 15, 2014 in U.S. Appl. No. 13/449,251.
US Final Office Action dated May 16, 2014 in U.S. Appl. No. 13/449,248.
U.S. Non Final Office Action dated Feb. 7, 2022 in U.S. Appl. No. 16/097,197.
U.S. Non-Final office Action dated Apr. 7, 2023 in U.S. Appl. No. 18/047,839.
U.S. Non-Final Office Action dated Jan. 25, 2024 in U.S. Appl. No. 17/946,692.
U.S. Non-Final Office Action dated Jun. 5, 2024 in U.S. Appl. No. 18/137,917.
U.S. Non-Final Office Action dated Jun. 14, 2023, in U.S. Appl. No. 18/152,573.
U.S. Non-Final office Action dated Nov. 23, 2022 in U.S. Appl. No. 17/163,202.
US Notice of Allowance (corrected) dated Jul. 12, 2016 in U.S. Appl. No. 13/931,459.
U.S. Notice of Allowance dated Apr. 1, 2024 in U.S. Appl. No. 18/152,573.
US Notice of Allowance dated Apr. 1, 2019 in U.S. Appl. No. 15/786,488.
U.S. Notice of Allowance dated Apr. 11, 2024 in U.S. Appl. No. 18/154,396.
US Notice of Allowance dated Apr. 13, 2015 in U.S. Appl. No. 14/657,380.
US Notice of Allowance dated Apr. 17, 2019 in U.S. Appl. No. 15/875,529.
U.S. Notice of Allowance dated Apr. 19, 2024 in U.S. Appl. No. 18/152,573.
U.S. Notice of Allowance dated Apr. 24, 2024 in U.S. Appl. No. 17/946,692.
U.S. Notice of Allowance dated Aug. 18, 2023 in U.S. Appl. No. 17/444,010.
US Notice of Allowance dated Aug. 7, 2019 in U.S. Appl. No. 15/875,529.
U.S. Notice of Allowance dated Dec. 28, 2022 in U.S. Appl. No. 17/339,776.
U.S. Notice of Allowance dated Feb. 12, 2024 in U.S. Appl. No. 18/065,204.
U.S. Notice of Allowance dated Feb. 15, 2023 in U.S. Appl. No. 17/163,202.
U.S. Notice of Allowance dated Feb. 28, 2023 in U.S. Appl. No. 17/163,202.
U.S. Notice of Allowance dated Jan. 3, 2024 in U.S. Appl. No. 18/154,396.
US Notice of Allowance dated Jan. 10, 2014 in U.S. Appl. No. 13/449,235.
U.S. Notice of Allowance dated Jan. 19, 2023 in U.S. Appl. No. 17/249,265.
US Notice of Allowance dated Jan. 22, 2015 in U.S. Appl. No. 13/682,618.
US Notice of Allowance dated Jan. 8, 2021 in U.S. Appl. No. 16/459,142.
U.S. Notice of Allowance dated Jul. 5, 2024 in U.S. Appl. No. 18/152,573.
U.S. Notice of Allowance dated Jul. 12, 2023 in U.S. Appl. No. 17/444,010.
US Notice of Allowance dated Jul. 19, 2016 in U.S. Appl. No. 14/822,781.
US Notice of Allowance dated Jul. 20, 2012 in U.S. Appl. No. 13/049,623.
US Notice of Allowance dated Jul. 21, 2016 in U.S. Appl. No. 14/735,043.
US Notice of Allowance dated Jul. 24, 2019 in U.S. Appl. No. 15/286,193.
U.S. Notice of Allowance dated Jul. 26, 2023 in U.S. Appl. No. 18/047,839.
US Notice of Allowance dated Jul. 28, 2017 in U.S. Appl. No. 14/900,037.
US Notice of Allowance dated Jul. 30, 2019 in U.S. Appl. No. 15/705,170.
US Notice of Allowance dated Jun. 17, 2014 in U.S. Appl. No. 13/309,990.
US Notice of Allowance dated Jun. 22, 2016 in U.S. Appl. No. 14/822,781.
US Notice of Allowance dated Jun. 27, 2016 in U.S. Appl. No. 14/735,043.
US Notice of Allowance dated Jun. 7, 2017 in U.S. Appl. No. 14/489,414.
US Notice of Allowance dated Jun. 8, 2016 in U.S. Appl. No. 13/931,459.
U.S. Notice of Allowance dated Mar. 3, 2023 in U.S. Appl. No. 17/339,776.
U.S. Notice of Allowance dated Mar. 15, 2023 in U.S. Appl. No. 17/339,776.
U.S. Notice of Allowance dated May 6, 2024 in U.S. Appl. No. 17/946,692.
US Notice of Allowance dated May 14, 2015 in U.S. Appl. No. 13/479,137.
US Notice of Allowance dated May 18, 2018 in U.S. Appl. No. 15/195,880.
US Notice of Allowance dated May 7, 2021 in U.S. Appl. No. 16/132,226.
US Notice of Allowance dated May 8, 2012 in U.S. Appl. No. 13/049,750.
U.S. Notice of Allowance dated Nov. 1, 2022 in U.S. Appl. No. 17/247,825.
U.S. Notice of Allowance dated Nov. 1, 2022 in U.S. Appl. No. 17/249,265.
U.S. Notice of Allowance dated Nov. 3, 2023 in U.S. Appl. No. 18/047,839.
U.S Notice of allowance dated Nov. 8, 2022 in U.S. Appl. No. 17/249,265.
US Notice of Allowance dated Nov. 9, 2020 in U.S. Appl. No. 15/685,624.

(56) References Cited

OTHER PUBLICATIONS

US Notice of Allowance dated Oct. 15, 2020 in U.S. Appl. No. 16/676,702.
U.S. Notice of Allowance dated Oct. 17, 2023 in U.S. Appl. No. 18/065,204.
US Notice of Allowance dated Oct. 19, 2017 in U.S. Appl. No. 15/226,793.
U.S. Notice of Allowance dated Oct. 20, 2023 in U.S. Appl. No. 17/444,010.
US Notice of Allowance dated Oct. 22, 2020 in U.S. Appl. No. 16/676,750.
U.S. Notice of Allowance dated Oct. 24, 2023 in U.S. Appl. No. 18/065,204.
U.S. Notice of Allowance dated Oct. 31, 2022 in U.S. Appl. No. 17/247,088.
US Notice of Allowance dated Sep. 26, 2017 in U.S. Appl. No. 14/900,037.
US Notice of Allowance (supplemental) dated Jun. 12, 2015 in U.S. Appl. No. 13/479,137.
US Office Action dated Apr. 11, 2017 in U.S. Appl. No. 15/226,793.
US Office Action dated Aug. 14, 2019 in U.S. Appl. No. 15/685,624.
US Office Action dated Dec. 24, 2013 in U.S. Appl. No. 13/309,990.
US Office Action dated Dec. 31, 2018 in U.S. Appl. No. 15/286,193.
US Office Action dated Feb. 24, 2015 in U.S. Appl. No. 14/163,026.
US Office Action dated Feb. 3, 2012 in U.S. Appl. No. 13/049,750.
US Office Action dated Jan. 11, 2018 in U.S. Appl. No. 15/195,880.
US Office Action dated Jan. 11, 2019 in U.S. Appl. No. 16/056,320.
US Office Action dated Jan. 16, 2015 in U.S. Appl. No. 14/468,778.
U.S. Office Action dated Jan. 18, 2013 in U.S. Appl. No. 13/049,756.
US Office Action dated Jul. 22, 2020 in U.S. Appl. No. 15/685,624.
US Office Action dated Jul. 3, 2014 in U.S. Appl. No. 13/479,137.
US Office Action dated Jun. 3, 2015 in U.S. Appl. No. 13/449,251.
US Office Action dated Mar. 19, 2019 in U.S. Appl. No. 15/705,170.
US Office Action dated Mar. 27, 2012 in U.S. Appl. No. 13/049,623.
US Office Action dated Nov. 22, 2016 in U.S. Appl. No. 14/489,414.
US Office Action dated Nov. 29, 2013 in U.S. Appl. No. 13/449,248.
US Office Action dated Nov. 29, 2013 in U.S. Appl. No. 13/449,251.
US Office Action dated Oct. 11, 2013 in U.S. Appl. No. 13/449,235.
US Office Action dated Oct. 22, 2015 in U.S. Appl. No. 13/931,459.
US Office Action dated Oct. 28, 2014 in U.S. Appl. No. 13/449,251.
U.S. Office Action dated Oct. 6, 2014 in U.S. Appl. No. 13/049,756.
US Office Action dated Sep. 15, 2014 in U.S. Appl. No. 13/682,618.
US Office Action dated Sep. 15, 2020 in U.S. Appl. No. 16/132,226.
US Office Action dated Sep. 23, 2013 in U.S. Appl. No. 13/479,137.
US Office Action dated Sep. 29, 2014 in U.S. Appl. No. 13/449,248.
U.S. Appl. No. 18/292,090, inventor Kunadian I, filed Jan. 25, 2024.
U.S. Appl. No. 18/777,268, inventors Pradhan A.A, et al., filed Jul. 18, 2024.
U.S. Restriction Requirement dated Oct. 3, 2022 in U.S. Appl. No. 17/163,202.
U.S Restriction requirement dated Oct. 27, 2023 in U.S. Appl. No. 17/946,692.

* cited by examiner

CONTROLLING TRANSITIONS IN OPTICALLY SWITCHABLE DEVICES

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

BACKGROUND

Electrochromic (EC) devices are typically multilayer stacks including (a) at least one layer of electrochromic material, that changes its optical properties in response to the application of an electrical potential, (b) an ion conductor (IC) layer that allows ions, such as lithium ions, to move through it, into and out from the electrochromic material to cause the optical property change, while preventing electrical shorting, and (c) transparent conductor layers, such as transparent conducting oxides or TCOs, over which an electrical potential is applied to the electrochromic layer. In some cases, the electric potential is applied from opposing edges of an electrochromic device and across the viewable area of the device. The transparent conductor layers are designed to have relatively high electronic conductances. Electrochromic devices may have more than the above-described layers such as ion storage or counter electrode layers that optionally change optical states.

Due to the physics of the device operation, proper function of the electrochromic device depends upon many factors such as ion movement through the material layers, the electrical potential required to move the ions, the sheet resistance of the transparent conductor layers, and other factors. The size of the electrochromic device plays an important role in the transition of the device from a starting optical state to an ending optical state (e.g., from tinted to clear or clear to tinted). The conditions applied to drive such transitions can have quite different requirements for different sized devices.

What are needed are improved methods for driving optical transitions in electrochromic devices.

SUMMARY

Aspects of this disclosure concern controllers and control methods for applying a drive voltage to bus bars of optically switchable devices such as electrochromic devices. Such devices are often provided on windows such as architectural glass. In certain embodiments, the applied drive voltage is controlled in a manner that efficiently drives an optical transition over the entire surface of the optically switchable device. The drive voltage is controlled to account for differences in effective voltage experienced in regions between the bus bars and regions proximate the bus bars. Regions near the bus bars experience the highest effective voltage.

Certain aspects of the disclosure may concern an apparatus for controlling a transition of an optically switchable device from a starting optical state to an ending optical state. The apparatus may include a processor designed or configured to apply a voltage to a first bus bar of the optically switchable device. At one or more times, the processor may determine an open circuit voltage between the first bus bar and a second bus bar of the optically switchable device and, at one or more times, determine a charge supplied to the optically switchable device. The processor may additionally determine whether the open circuit voltage has a magnitude greater than or equal to a magnitude of a target open circuit voltage, and may determine whether the supplied charge gives rise to a total delivered charge density greater than or equal to a threshold charge density. In an embodiment, if the magnitude of the determined open circuit voltage is greater than or equal to the magnitude of the target open circuit voltage, and if the magnitude of the total delivered charge density is determined to be greater than or equal to the magnitude of the threshold charge density, the processor may apply a hold voltage to the first bus bar of the optically switchable device.

In some embodiments, the open circuit voltage is determined at a defined time after applying the voltage to the first bus bar of the optically switchable device. The defined time may be between about 15-90 seconds, for example about 30 seconds in some cases. In other examples, the defined time is longer, for example up to about 120 minutes in some cases. The target open circuit voltage may have a magnitude that is between about 0-1V greater than the magnitude of the hold voltage, for example between about 0-0.4V greater than the magnitude of the hold voltage. In various cases, the magnitude of the target open circuit voltage is at least about 0.025V greater than the magnitude of the hold voltage. The magnitude of the threshold charge density may be between about $1\times10^{-5}$ C/cm$^2$ and about 5 C/cm$^2$ in certain embodiments. In some cases, for example, the magnitude of the threshold charge density is between about 0.01-0.04 C/cm$^2$.

In an implementation, after determining whether the open circuit voltage has a magnitude greater than or equal to a magnitude of a target circuit voltage, but before determining whether the supplied charge gives rise to a total delivered charge density greater than or equal to a threshold charge density, the processor may increase the magnitude of voltage applied as a result of determining that either the magnitude of the open circuit voltage is less than the magnitude of the target open circuit voltage, or that the magnitude of the total delivered charge density is less than the magnitude of the threshold charge density. The processor may further operate to repeat, at a frequency of between about 5 seconds and 5 minutes, the determination of whether the open circuit voltage has a magnitude greater than or equal to the magnitude of the target open circuit voltage and to determine whether the supplied charge density gives rise to a total delivered charge density greater than or equal to a threshold charge density.

In various embodiments, the optically switchable device is an electrochromic device. The bus bars may be separated from one another by at least about 10 inches in some cases.

Other aspects of the disclosure concern an apparatus for controlling a transition of an optically switchable device from a starting optical state to an ending optical state. Such apparatus may be characterized by the following elements: a processor designed or configured to apply a voltage to a first bus bar of the optically switchable device. At one or more times during the transition, reduce the magnitude of the voltage applied to the first bus bar of the optically switchable device to a probe voltage and detect a current response, and periodically determine a charge supplied to the optically switchable device and to determine whether the detected current response reaches a target current, and determine whether a magnitude of the supplied charge is greater than or equal to a threshold charge. If it is determined the detected current response reaches the target current, and that the magnitude of the supplied charge is greater than or equal to the magnitude of the threshold charge density, apply a hold voltage.

The processor may be further designed or configured to determine the open circuit voltage and total delivered charge density in at a defined time after applying the voltage to the first bus bar of the optically switchable device. The defined time may be between about 15-90 seconds, for example about 30 seconds in some cases. In other examples, the defined time is longer, for example up to about 120 minutes in some cases.

The target open circuit voltage may have a magnitude that is between about 0-1V greater than the magnitude of the hold voltage, for example between about 0-0.4V greater than the magnitude of the hold voltage. In various cases, the magnitude of the target open circuit voltage is at least about 0.025V greater than the magnitude of the hold voltage. The magnitude of the threshold charge density may be between about $1\times10^{-5}$ C/cm$^2$ and about 5 C/cm$^2$ in certain embodiments. In some cases, for example, the magnitude of the threshold charge density is between about 0.01-0.04 C/cm$^2$.

In certain embodiments, the processor is further designed or configured to, after determining whether the open circuit voltage has a magnitude greater than or equal to a magnitude of a target open circuit voltage and before determining whether the supplied charge gives rise to a total delivered charge density greater than or equal to a threshold charge density, increase the magnitude of voltage applied to the bus bars as a result of determining that either the magnitude of the determined open circuit voltage is less than the magnitude of the target open circuit voltage, or that the magnitude of the determined total delivered charge density is less than the magnitude of the threshold charge density. The processor may repeat, such as at a frequency of between about 5 seconds and about 5 minutes, the determining of whether the open circuit voltage has a magnitude greater than or equal to a magnitude of a target open circuit voltage and whether the supplied charge gives rise to a total delivered charge density that is greater than or equal to a threshold charge density. The optically switchable device may be an electrochromic device. The bus bars may be separated from one another by at least about 10 inches in some cases.

In a further aspect of the disclosed embodiments, another method of controlling a transition of an optically switchable device is provided. The method involves transitioning from a starting optical state to an ending optical state by applying a voltage to a first bus bar of the optically switchable device; determining, at one or more times during the transition, whether an open circuit voltage between the first bus bar and a second bus bar of the optically switchable device comprises a magnitude greater than or equal to a magnitude of a target open circuit voltage, and determining whether a charge supplied to the optically switchable device gives rise to a total delivered charge density greater than or equal to a threshold charge density. The method may continue with determining if the magnitude of the open circuit voltage is greater than or equal to the magnitude of the target open circuit voltage, and if the magnitude of the total delivered charge density is determined to be greater than or equal to the magnitude of the threshold charge density, applying a hold voltage to the first bus bar of the optically switchable device.

The target current may be about 0 Amps in some cases. The magnitude of the threshold charge density may be between about $1\times10^{-5}$ C/cm$^2$ and about 5 C/cm$^2$ in certain embodiments. In some cases, for example, the magnitude of the threshold charge density is between about 0.01-0.04 C/cm$^2$. In some embodiments, the probe voltage may have a magnitude that is between about 0-1V greater than the magnitude of the hold voltage, for example between about 0-0.4V greater than the magnitude of the hold voltage.

These and other features will be described in further detail below with reference to the associated drawings.

DETAILED DESCRIPTION

Definitions

Figure 1A:
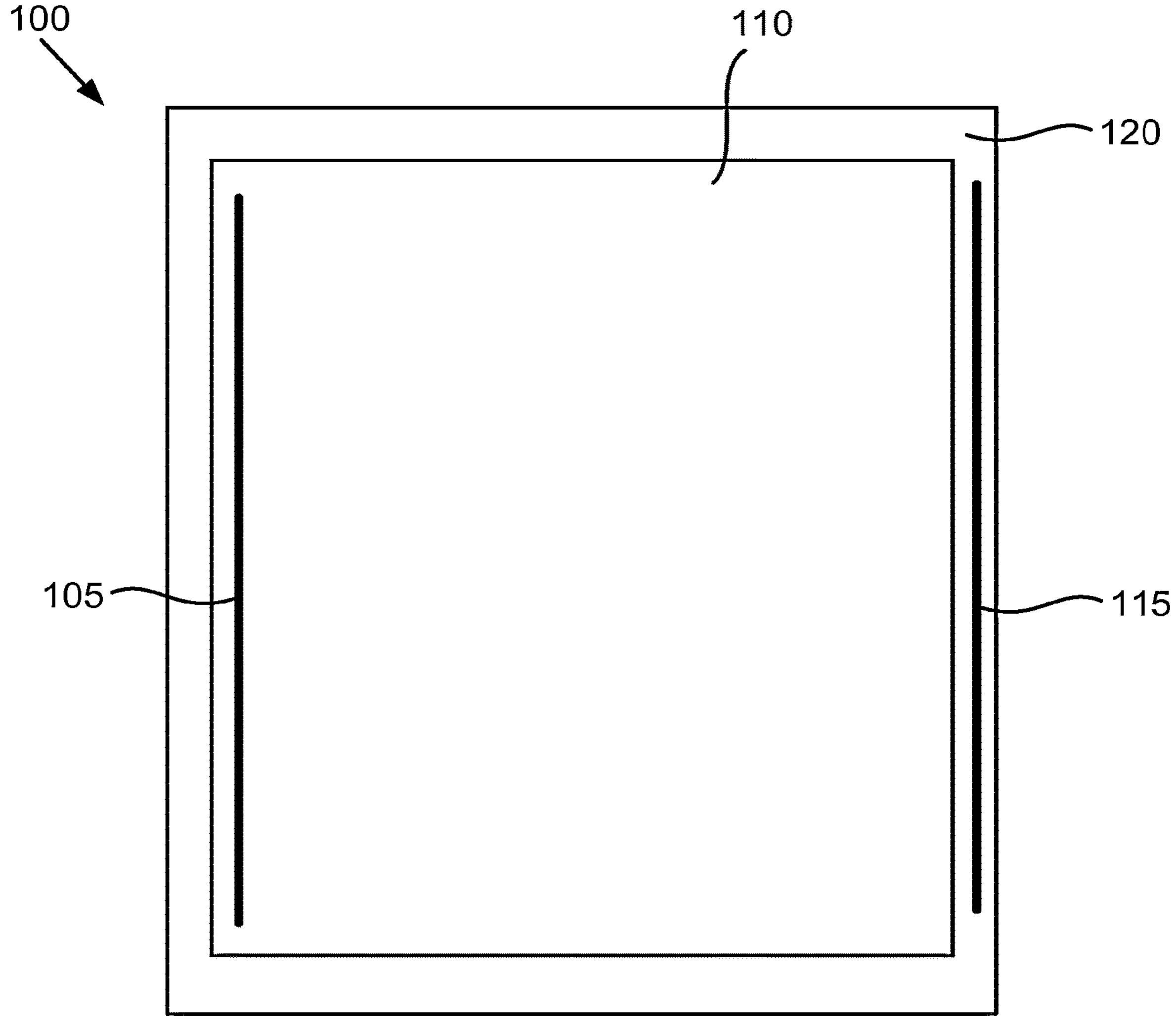
FIG. 1A schematically depicts a planar bus bar arrangement.

An "optically switchable device" is a thin device that changes optical state in response to electrical input. It reversibly cycles between two or more optical states. Switching between these states is controlled by applying predefined current and/or voltage to the device. The device typically includes two thin conductive sheets that straddle at least one optically active layer. The electrical input driving the change in optical state is applied to the thin conductive sheets. In certain implementations, the input is provided by bus bars in electrical communication with the conductive sheets.

While the disclosure emphasizes electrochromic devices as examples of optically switchable devices, the disclosure is not so limited. Examples of other types of optically switchable device include certain electrophoretic devices, liquid crystal devices, and the like. Optically switchable devices may be provided on various optically switchable products, such as optically switchable windows. However, the embodiments disclosed herein are not limited to switchable windows. Examples of other types of optically switchable products include mirrors, displays, and the like. In the context of this disclosure, these products are typically provided in a non-pixelated format.

An "optical transition" is a change in any one or more optical properties of an optically switchable device. The optical property that changes may be, for example, tint, reflectivity, refractive index, color, etc. In certain embodiments, the optical transition will have a defined starting optical state and a defined ending optical state. For example the starting optical state may be 80% transmissivity and the ending optical state may be 50% transmissivity. The optical transition is typically driven by applying an appropriate electric potential across the two thin conductive sheets of the optically switchable device.

A "starting optical state" is the optical state of an optically switchable device immediately prior to the beginning of an optical transition. The starting optical state is typically defined as the magnitude of an optical state which may be tint, reflectivity, refractive index, color, etc. The starting optical state may be a maximum or minimum optical state for the optically switchable device; e.g., 90% or 4% transmissivity. Alternatively, the starting optical state may be an intermediate optical state having a value somewhere between the maximum and minimum optical states for the optically switchable device; e.g., 50% transmissivity.

An "ending optical state" is the optical state of an optically switchable device immediately after the complete optical transition from a starting optical state. The complete transition occurs when optical state changes in a manner understood to be complete for a particular application. For example, a complete tinting might be deemed a transition from 75% optical transmissivity to 10% transmissivity. The ending optical state may be a maximum or minimum optical state for the optically switchable device; e.g., 90% or 4% transmissivity. Alternatively, the ending optical state may be an intermediate optical state having a value somewhere between the maximum and minimum optical states for the optically switchable device; e.g., 50% transmissivity.

"Bus bar" refers to an electrically conductive strip attached to a conductive layer such as a transparent conductive electrode spanning the area of an optically switchable device. The bus bar delivers electrical potential and current from an external lead to the conductive layer. An optically switchable device includes two or more bus bars, each connected to a single conductive layer of the device. In various embodiments, a bus bar forms a long thin line that spans most of the length of the length or width of a device. Often, a bus bar is located near the edge of the device.

"Applied Voltage" or $V_{app}$ refers the difference in potential applied to two bus bars of opposite polarity on the electrochromic device. Each bus bar is electronically connected to a separate transparent conductive layer. The applied voltage may different magnitudes or functions such as driving an optical transition or holding an optical state. Between the transparent conductive layers are sandwiched the optically switchable device materials such as electrochromic materials. Each of the transparent conductive layers experiences a potential drop between the position where a bus bar is connected to it and a location remote from the bus bar. Generally, the greater the distance from the bus bar, the greater the potential drop in a transparent conducting layer. The local potential of the transparent conductive layers is often referred to herein as the $V_{TCL}$. Bus bars of opposite polarity may be laterally separated from one another across the face of an optically switchable device.

"Effective Voltage" or $V_{eff}$ refers to the potential between the positive and negative transparent conducting layers at any particular location on the optically switchable device. In Cartesian space, the effective voltage is defined for a particular x,y coordinate on the device. At the point where $V_{eff}$ is measured, the two transparent conducting layers are separated in the z-direction (by the device materials), but share the same x,y coordinate.

"Hold Voltage" refers to the applied voltage necessary to indefinitely maintain the device in an ending optical state. In some cases, without application of a hold voltage, electrochromic windows return to their natural tint state. In other words, maintenance of a desired tint state requires application of a hold voltage.

Figure 3:
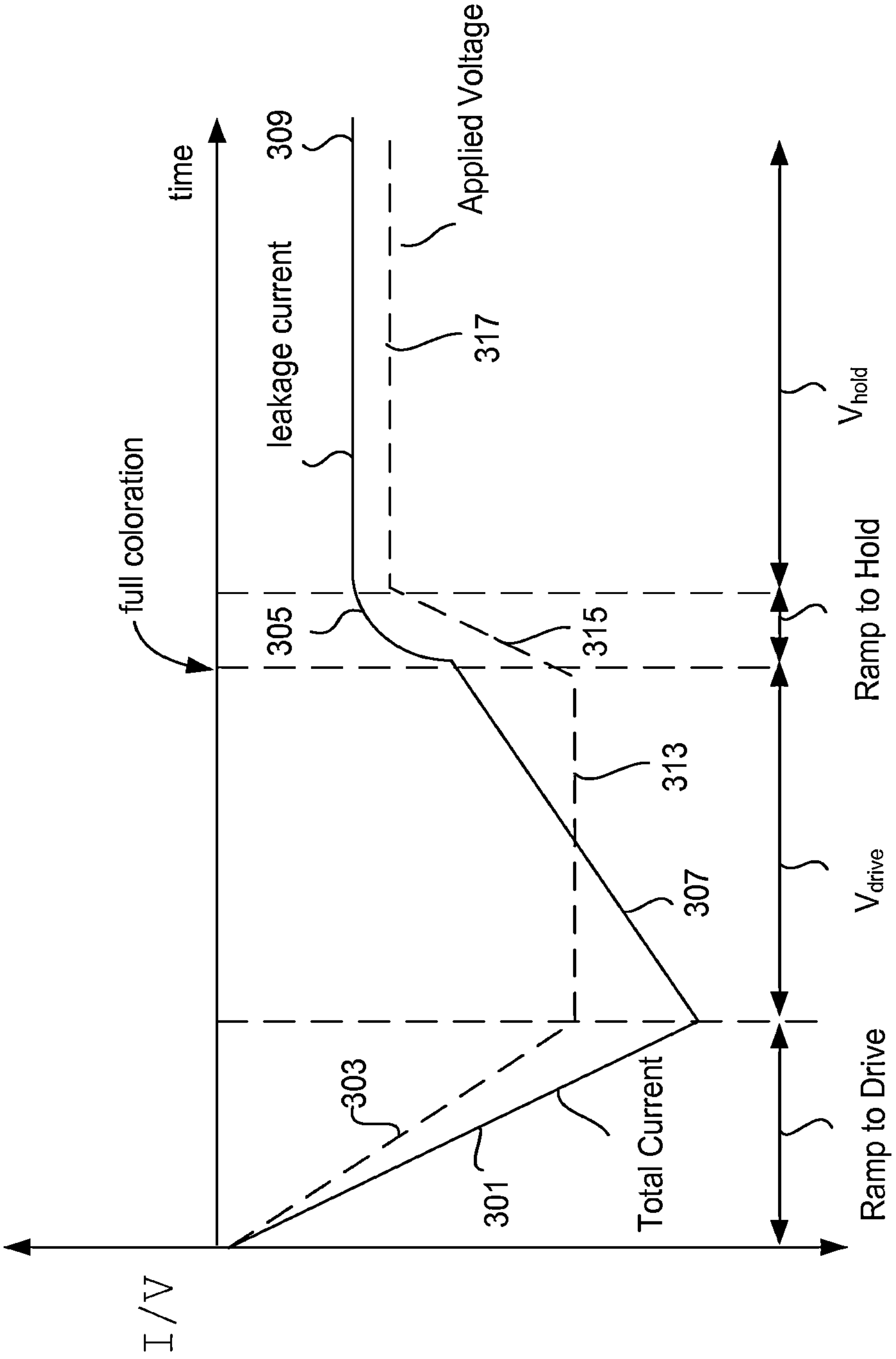
FIG. 3 is a graph depicting certain voltage and current profiles associated with driving an electrochromic device from clear to tinted.

"Drive Voltage" refers to the applied voltage provided during at least a portion of the optical transition. The drive voltage may be viewed as "driving" at least a portion of the optical transition. Its magnitude is different from that of the applied voltage immediately prior to the start of the optical transition. In certain embodiments, the magnitude of the drive voltage is greater than the magnitude of the hold voltage. An example application of drive and hold voltages is depicted in FIG. 3

Context and Overview

The disclosed embodiments make use of electrical probing and monitoring to determine when an optical transition between a first optical state and a second optical state of an optically switchable device has proceeded to a sufficient extent that the application of a drive voltage can be terminated. For example, electrical probing allows for application of drive voltages for less time than previously thought possible, as a particular device is driven based on electrical probing of its actual optical transition progression in real time. Further, real time monitoring can help ensure that an optical transition progresses to a desired state. In various embodiments, terminating the drive voltage is accomplished by dropping the applied voltage to a hold voltage. This approach takes advantage of an aspect of optical transitions that is typically considered undesirable—the propensity of thin optically switchable devices to transition between optical states non-uniformly. In particular, many optically switchable devices initially transition at locations close to the bus bars and only later at regions far from the bus bars (e.g., near the center of the device). Surprisingly, this non-uniformity can be harnessed to probe the optical transition. By allowing the transition to be probed in the manner described herein, optically switchable devices avoid the need for custom characterization and associated preprogramming of device control algorithms specifying the length of time a drive voltage is applied as well as obviating "one size fits all" fixed time period drive parameters that account for variations in temperature, device structure variability, and the like across many devices. Before describing probing and monitoring techniques in more detail, some context on optical transitions in electrochromic devices will be provided.

Driving a transition in a typical electrochromic device is accomplished by applying a defined voltage to two separated bus bars on the device. In such a device, it is convenient to position bus bars perpendicular to the smaller dimension of a rectangular window (see FIG. 1A). This is because the transparent conducting layers used to deliver an applied voltage over the face of the thin film device have an associated sheet resistance, and the bus bar arrangement allows for the shortest span over which current must travel to cover the entire area of the device, thus lowering the time it takes for the conductor layers to be fully charged across their respective areas, and thus lowering the time to transition the device.

While an applied voltage, $V_{app}$, is supplied across the bus bars, essentially all areas of the device see a lower local effective voltage ($V_{eff}$) due to the sheet resistance of the transparent conducting layers and the current draw of the device. The center of the device (the position midway between the two bus bars) frequently has the lowest value of $V_{eff}$. This may result in an unacceptably small optical switching range and/or an unacceptably slow switching time in the center of the device. These problems may not exist at the edges of the device, nearer the bus bars. This is explained in more detail below with reference to FIGS. 1B and 1C.

FIG. 1A shows a top-down view of an electrochromic lite 100 including bus bars having a planar configuration. Electrochromic lite 100 includes a first bus bar 105 disposed on a first conductive layer 110 and a second bus bar 115 disposed on a second conductive layer, 120. An electrochromic stack (not shown) is sandwiched between first conductive layer 110 and second conductive layer 120. As shown, first bus bar 105 may extend substantially across one side of first conductive layer 110. Second bus bar 115 may extend substantially across one side of second conductive layer 120 opposite the side of electrochromic lite 100 on which first bus bar 105 is disposed. Some devices may have extra bus bars, e.g. on all four edges, but this complicates fabrication. A further discussion of bus bar configurations, including planar configured bus bars, is found in U.S. patent application Ser. No. 13/452,032 filed Apr. 20, 2012, which is incorporated herein by reference in its entirety.

Figure 1B:
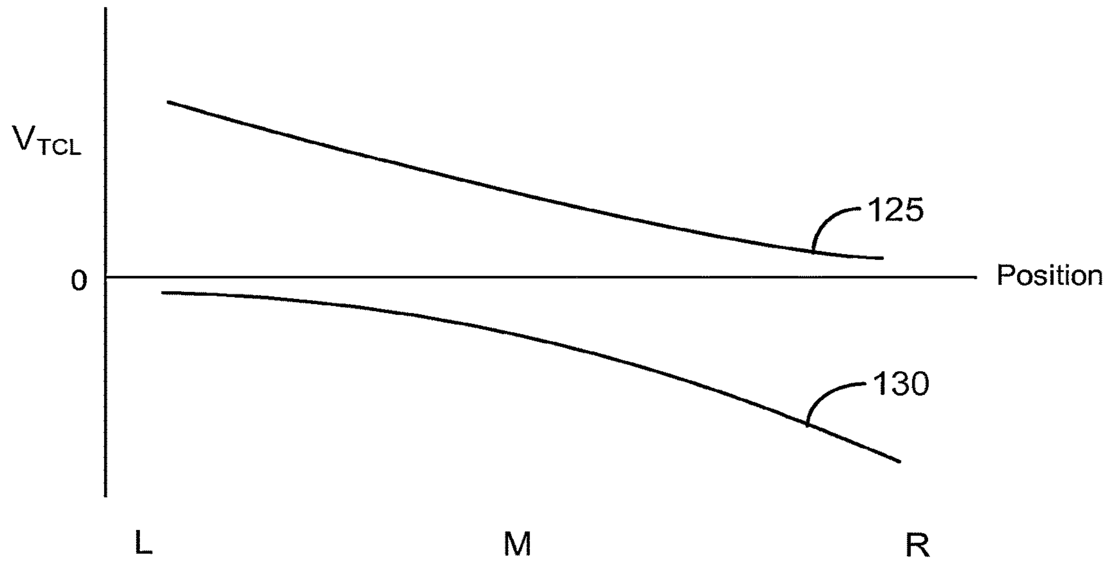
FIG. 1B presents a simplified plot of the local voltage value on each transparent conductive layer as a function of position on the layer

FIG. 1B is a graph showing a plot of the local voltage in first transparent conductive layer 110 and the voltage in second transparent conductive layer 120 that drives the transition of electrochromic lite 100 from a clear state to a tinted state, for example. Plot 125 shows the local values of the voltage $V_{TCL}$ in first transparent conductive layer 110. As shown, the voltage drops from the left hand side (e.g., where first bus bar 105 is disposed on first conductive layer 110 and where the voltage is applied) to the right hand side of first conductive layer 110 due to the sheet resistance and current passing through first conductive layer 110. Plot 130 also shows the local voltage $V_{TCL}$ in second conductive layer 120. As shown, the voltage increases (decreases in magnitude) from the right hand side (e.g., where second bus bar 115 is disposed on second conductive layer 120 and where the voltage is applied) to the left hand side of second conductive layer 120 due to the sheet resistance of second conductive layer 120. The value of the applied voltage, $V_{app}$, in this example is the difference in voltage between the right end of potential plot 130 and the left end of potential plot 125. The value of the effective voltage, $V_{eff}$, at any location between the bus bars is the difference in values of curves 130 and 125 at the position on the x-axis corresponding to the location of interest.

Figure 1C:
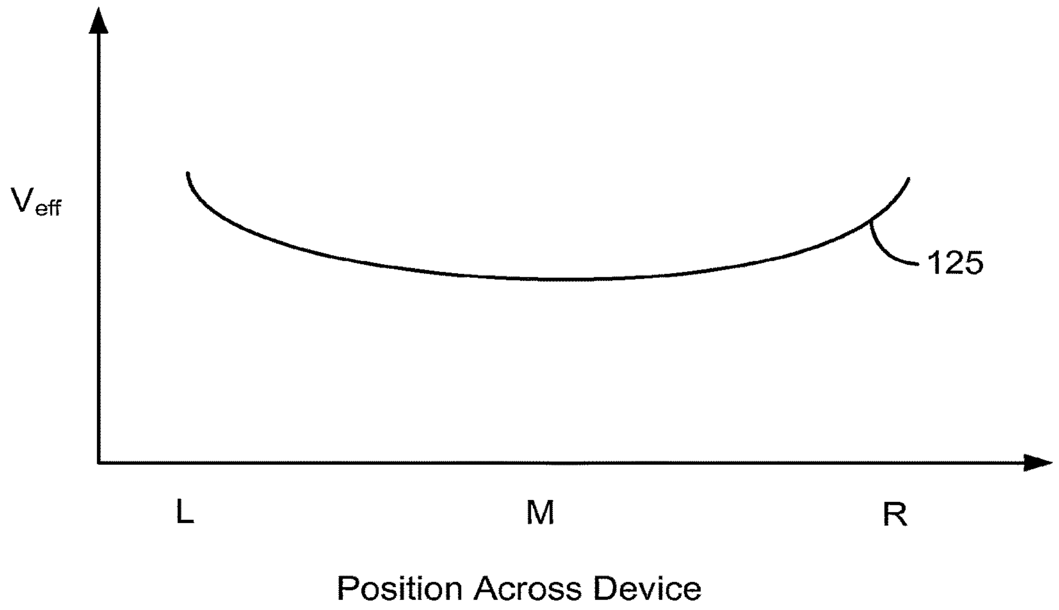
FIG. 1C presents a simplified plot of $V_{eff}$ as a function of position across the device

FIG. 1C is a graph showing a plot of $V_{eff}$ across the electrochromic device between first and second conductive layers 110 and 120 of electrochromic lite 100. As explained, the effective voltage is the local voltage difference between the first conductive layer 110 and the second conductive layer 120. Regions of an electrochromic device subjected to higher effective voltages transition between optical states faster than regions subjected to lower effective voltages. As shown, the effective voltage is the lowest at the center of electrochromic lite 100 and highest at the edges of electrochromic lite 100. The voltage drop across the device is due to ohmic losses as current passes through the device. The voltage drop across large electrochromic windows can be alleviated by configuring additional bus bars within the viewing area of the window, in effect dividing one large optical window into multiple smaller electrochromic windows which can be driven in series or parallel. However, this approach may not be aesthetically appealing due to the contrast between the viewable area and the bus bar(s) in the viewable area. That is, it may be much more pleasing to the eye to have a monolithic electrochromic device without any distracting bus bars in the viewable area.

As described above, as the window size increases, the electronic resistance to current flowing across the thin face of the TC layers also increases. This resistance may be measured between the points closest to the bus bar (referred to as edge of the device in following description) and in the points furthest away from the bus bars (referred to as the center of the device in following description). When current passes through a TCL, the voltage drops across the TCL face and this reduces the effective voltage at the center of the device. This effect is exacerbated by the fact that typically as window area increases, the leakage current density for the window stays constant but the total leakage current increases due to the increased area. Thus with both of these effects the effective voltage at the center of the electrochromic window falls substantially, and poor performance may be observed for electrochromic windows which are larger than, for example, about 30 inches across. This issue can be addressed by using a higher $V_{app}$ such that the center of the device reaches a suitable effective voltage.

Typically the range of safe operation for solid state electrochromic devices is between about 0.5V and 4V, or more typically between about 0.8V and about 3V, e.g. between 0.9V and 1.8V. These are local values of $V_{eff}$. In one embodiment, an electrochromic device controller or control algorithm provides a driving profile where $V_{eff}$ is always below 3V, in another embodiment, the controller controls $V_{eff}$ so that it is always below 2.5V, in another embodiment, the controller controls $V_{eff}$ so that it is always below 1.8V. The recited voltage values refer to the time averaged voltage (where the averaging time is of the order of time required for small optical response, e.g. few seconds to few minutes).

An added complexity of electrochromic windows is that the current drawn through the window is not fixed over the duration of the optical transition. Instead, during the initial part of the transition, the current through the device is substantially larger (up to 100× larger) than in the end state when the optical transition is complete or nearly complete. The problem of poor coloration in center of the device is further exacerbated during this initial transition period, as the value $V_{eff}$ at the center is significantly lower than what it will be at the end of the transition period.

In the case of an electrochromic device with a planar bus bar, it can be shown that the $V_{eff}$ across a device with planar bus bars is generally given by:

$$\Delta V(0) = V_{app} - RJL^2/2 \quad \text{Equation 1}$$

$$\Delta V(L) = V_{app} - RJL^2/2$$

$$\Delta V(L/2) = V_{app} - 3RJL^2/4$$

where:

$V_{app}$ is the voltage difference applied to the bus bars to drive the electrochromic window;

ΔV(0) is $V_{eff}$ at the bus bar connected to the first transparent conducting layer (in the example below, TEC type TCO);

ΔV(L) is $V_{eff}$ at the bus bar connected to the second transparent conducting layer (in the example below, ITO type TCO);

ΔV(L/2) is $V_{eff}$ at the center of the device, midway between the two planar bus bars;

R=transparent conducting layer sheet resistance;

J=instantaneous average current density; and

L=distance between the bus bars of the electrochromic device.

The transparent conducting layers are assumed to have substantially similar, if not the same, sheet resistance for the calculation. However those of ordinary skill in the art will appreciate that the applicable physics of the ohmic voltage drop and local effective voltage still apply even if the transparent conducting layers have dissimilar sheet resistances.

As noted, certain embodiments pertain to controllers and control algorithms for driving optical transitions in devices having planar bus bars. In such devices, substantially linear bus bars of opposite polarity are disposed at opposite sides of a rectangular or other polygonally shaped electrochromic device. In some embodiments, devices with non-planar bus bars may be employed. Such devices may employ, for example, angled bus bars disposed at vertices of the device. In such devices, the bus bar effective separation distance, L, is determined based on the geometry of the device and bus bars. A discussion of bus bar geometries and separation distances may be found in U.S. patent application Ser. No. 13/452,032, entitled "Angled Bus Bar", and filed Apr. 20, 2012, which is incorporated herein by reference in its entirety.

As R, J or L increase, $V_{eff}$ across the device decreases, thereby slowing or reducing the device coloration during transition and even in the final optical state. Referring to Equation 1, the $V_{eff}$ across the window is at least $RJL^2/2$ lower than $V_{app}$. It has been found that as the resistive voltage drop increases (due to increase in the window size, current draw etc.) some of the loss can be negated by increasing $V_{app}$ but doing so only to a value that keeps $V_{eff}$ at the edges of the device below the threshold where reliability degradation would occur.

In summary, it has been recognized that both transparent conducting layers experience ohmic drop, and that drop increases with distance from the associated bus bar, and therefore $V_{TCL}$ decreases with distance from the bus bar for both transparent conductive layers. As a consequence $V_{eff}$ decreases in locations removed from both bus bars.

To speed along optical transitions, the applied voltage is initially provided at a magnitude greater than that required to hold the device at a particular optical state in equilibrium. This approach is illustrated in FIGS. 2 and 3.

Figure 2:
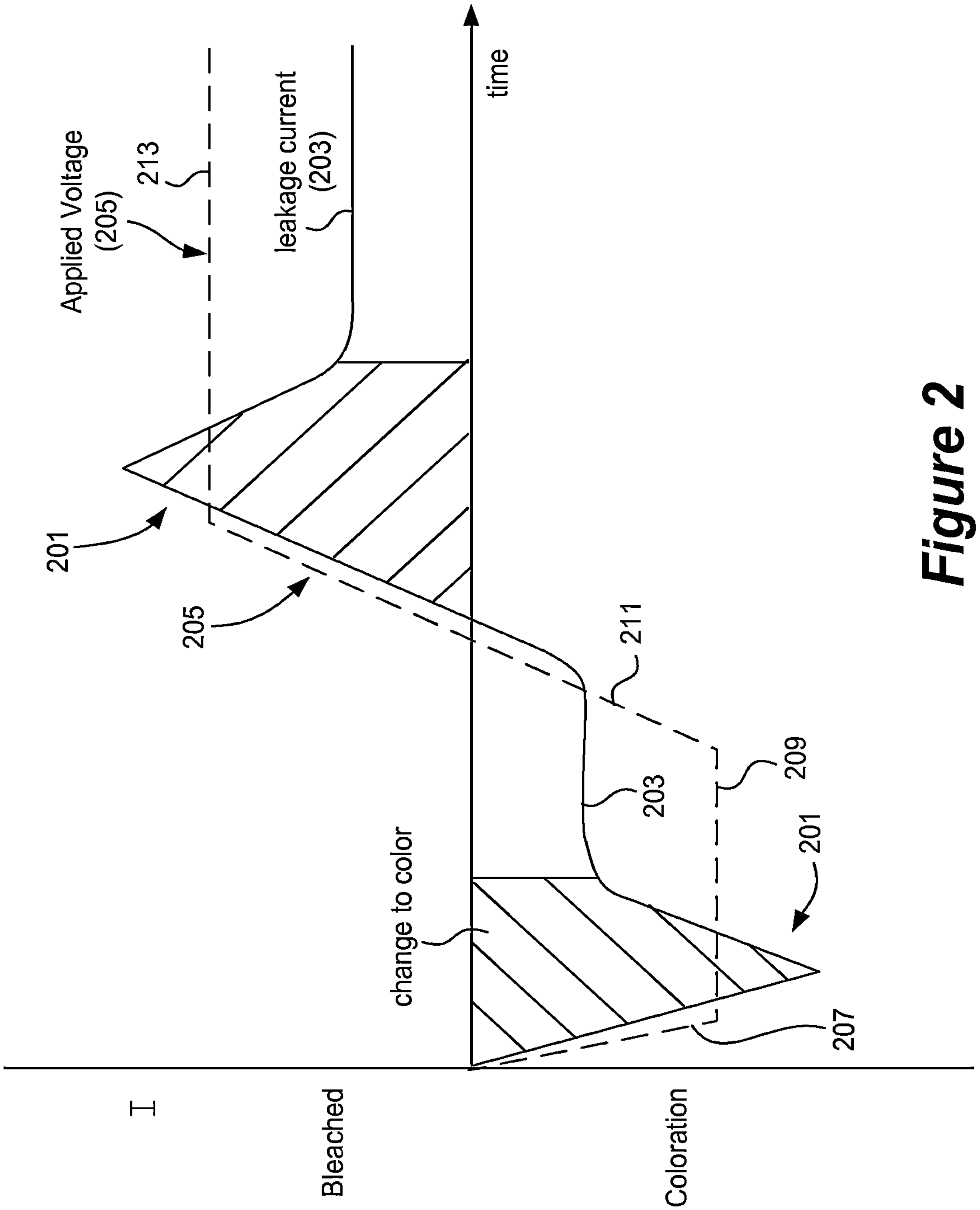
FIG. 2 is a graph depicting voltage and current profiles associated with driving an electrochromic device from clear to tinted and from tinted to clear.

FIG. 2 shows a complete current profile and voltage profile for an electrochromic device employing a simple voltage control algorithm to cause an optical state transition cycle (tinting followed by clearing) of an electrochromic device. In the graph, total current density (I) is represented as a function of time. As mentioned, the total current density is a combination of the ionic current density associated with an electrochromic transition and electronic leakage current between the electrochemically active electrodes. Many different types of electrochromic devices will have the depicted current profile. In one example, a cathodic electrochromic material such as tungsten oxide is used in conjunction with an anodic electrochromic material such as nickel tungsten oxide in counter electrode. In such devices, negative currents indicate coloration/tinting of the device. In one example, lithium ions flow from a nickel tungsten oxide anodically coloring electrochromic electrode into a tungsten oxide cathodically coloring electrochromic electrode. Correspondingly, electrons flow into the tungsten oxide electrode to compensate for the positively charged incoming lithium ions. Therefore, the voltage and current are shown to have a negative value.

The depicted profile results from ramping up the voltage to a set level and then holding the voltage to maintain the optical state. The current peaks 201 are associated with changes in optical state, i.e., tinting and clearing. Specifically, the current peaks represent delivery of the ionic charge needed to tint or clear the device. Mathematically, the shaded area under the peak represents the total charge required to tint or clear the device. The portions of the curve after the initial current spikes (portions 203) represent electronic leakage current while the device is in the new optical state.

In the figure, a voltage profile 205 is superimposed on the current curve. The voltage profile follows the sequence: negative ramp (207), negative hold (209), positive ramp (211), and positive hold (213). Note that the voltage remains constant after reaching its maximum magnitude and during the length of time that the device remains in its defined optical state. Voltage ramp 207 drives the device to its new the tinted state and voltage hold 209 maintains the device in the tinted state until voltage ramp 211 in the opposite direction drives the transition from tinted to clear states. In some switching algorithms, a current cap is imposed. That is, the current is not permitted to exceed a defined level in order to prevent damaging the device (e.g. driving ion movement through the material layers too quickly can physically damage the material layers). The coloration speed is a function of not only the applied voltage, but also the temperature and the voltage ramping rate.

FIG. 3 illustrates a voltage control profile in accordance with certain embodiments. In the depicted embodiment, a voltage control profile is employed to drive the transition from a clear state to a tinted state (or to an intermediate state). To drive an electrochromic device in the reverse direction, from a tinted state to a clear state (or from a more tinted to less tinted state), a similar but inverted profile is used. In some embodiments, the voltage control profile for going from tinted to clear is a mirror image of the one depicted in FIG. 3.

The voltage values depicted in FIG. 3 represent the applied voltage ($V_{app}$) values. The applied voltage profile is shown by the dashed line. For contrast, the current density in the device is shown by the solid line. In the depicted profile, $V_{app}$ includes four components: a ramp to drive component 303, which initiates the transition, a $V_{drive}$ component 313, which continues to drive the transition, a ramp to hold component 315, and a $V_{hold}$ component 317. The ramp components are implemented as variations in $V_{app}$ and the $V_{drive}$ and $V_{hold}$ components provide constant or substantially constant $V_{app}$ magnitudes.

The ramp to drive component is characterized by a ramp rate (increasing magnitude) and a magnitude of $V_{drive}$. When the magnitude of the applied voltage reaches $V_{drive}$, the ramp to drive component is completed. The $V_{drive}$ component is characterized by the value of $V_{drive}$ as well as the duration of $V_{drive}$. The magnitude of $V_{drive}$ may be chosen to maintain $V_{eff}$ with a safe but effective range over the entire face of the electrochromic device as described above.

The ramp to hold component is characterized by a voltage ramp rate (decreasing magnitude) and the value of $V_{hold}$ (or optionally the difference between $V_{drive}$ and $V_{hold}$). $V_{app}$ drops according to the ramp rate until the value of $V_{hold}$ is reached. The $V_{hold}$ component is characterized by the magnitude of $V_{hold}$ and the duration of $V_{hold}$. Actually, the duration of $V_{hold}$ is typically governed by the length of time that the device is held in the tinted state (or conversely in the clear state). Unlike the ramp to drive, $V_{drive}$, and ramp to hold components, the $V_{hold}$ component has an arbitrary length, which is independent of the physics of the optical transition of the device.

Each type of electrochromic device will have its own characteristic components of the voltage profile for driving the optical transition. For example, a relatively large device and/or one with a more resistive conductive layer will require a higher value of $V_{drive}$ and possibly a higher ramp rate in the ramp to drive component. U.S. patent application Ser. No. 13/449,251, filed Apr. 17, 2012, and incorporated herein by reference, discloses controllers and associated algorithms for driving optical transitions over a wide range of conditions. As explained therein, each of the components of an applied voltage profile (ramp to drive, $V_{drive}$, ramp to hold, and $V_{hold}$, herein) may be independently controlled to address real-time conditions such as current temperature, current level of transmissivity, etc. In some embodiments, the values of each component of the applied voltage profile is set for a particular electrochromic device (having its own bus bar separation, resistivity, etc.) and does not vary based on current conditions. In other words, in such embodiments, the voltage profile does not take into account feedback such as temperature, current density, and the like.

As indicated, all voltage values shown in the voltage transition profile of FIG. 3 correspond to the $V_{app}$ values described above. They do not correspond to the $V_{eff}$ values described above. In other words, the voltage values depicted in FIG. 3 are representative of the voltage difference between the bus bars of opposite polarity on the electrochromic device.

In certain embodiments, the ramp to drive component of the voltage profile is chosen to safely but rapidly induce ionic current to flow between the electrochromic and counter electrodes. As shown in FIG. 3, the current in the device follows the profile of the ramp to drive voltage component until the ramp to drive portion of the profile ends and the $V_{drive}$ portion begins. See current component 301 in FIG. 3. Safe levels of current and voltage can be determined empirically or based on other feedback. U.S. Pat. No. 8,254,013, filed Mar. 16, 2011, issued Aug. 28, 2012 and incorporated herein by reference, presents examples of algorithms for maintaining safe current levels during electrochromic device transitions.

In certain embodiments, the value of $V_{drive}$ is chosen based on the considerations described above. Particularly, it is chosen so that the value of $V_{eff}$ over the entire surface of the electrochromic device remains within a range that effectively and safely transitions large electrochromic devices. The duration of $V_{drive}$ can be chosen based on various considerations. One of these ensures that the drive potential is held for a period sufficient to cause the substantial coloration of the device. For this purpose, the duration of $V_{drive}$ may be determined empirically, by monitoring the optical density of the device as a function of the length of time that $V_{drive}$ remains in place. In some embodiments, the duration of $V_{drive}$ is set to a specified time period. In another embodiment, the duration of $V_{drive}$ is set to correspond to a desired amount of ionic and/or electronic charge being passed. As shown, the current ramps down during $V_{drive}$. See current segment 307.

Another consideration is the reduction in current density in the device as the ionic current decays as a consequence of the available lithium ions completing their journey from the anodic coloring electrode to the cathodic coloring electrode (or counter electrode) during the optical transition. When the transition is complete, the only current flowing across device is leakage current through the ion conducting layer. As a consequence, the ohmic drop in potential across the face of the device decreases and the local values of $V_{eff}$ increase. These increased values of $V_{eff}$ can damage or degrade the device if the applied voltage is not reduced. Thus, another consideration in determining the duration of $V_{drive}$ is the goal of reducing the level of $V_{eff}$ associated with leakage current. By dropping the applied voltage from $V_{drive}$ to $V_{hold}$, not only is $V_{eff}$ reduced on the face of the device but leakage current decreases as well. As shown in FIG. 3, the device current transitions in a segment 305 during the ramp to hold component. The current settles to a stable leakage current 309 during $V_{hold}$.

Controlling $V_{drive}$ Using Feedback from the Optical Transition

A challenge arises because it can be difficult to predict how long the applied drive voltage should be applied before transitioning to the hold voltage. Devices of different sizes, and more particularly devices having bus bars separated by particular distances, require different lengths of time for applying the drive voltage. Further, the processes employed to fabricate optically switchable devices such as electrochromic devices may vary subtly from one batch to another or one process revision to another. The subtle process variations translate into potentially different requirements for the length of time that the drive voltage must be applied to the devices used in operation. Still further, environmental conditions, and particularly temperature, can influence the length of time that the applied voltage should be applied to drive the transition.

To account for all these variables, current technology may define many distinct control algorithms with distinct periods of time for applying a defined drive voltage for each of many different window sizes or device features. A rationale for doing this is to ensure that the drive voltage is applied for a sufficient period, regardless of device size and type, to ensure that the optical transition is complete. Currently many different sized electrochromic windows are manufactured. While it is possible to pre-determine the appropriate drive voltage time for each and every different type of window, this can be a tedious, expensive, and time-consuming process. An improved approach, described here, is to determine on-the-fly the length of time that the drive voltage should be applied.

Further, it may be desirable to cause the transition between two defined optical states to occur within a defined duration, regardless of the size of the optically switchable device, the process under which the device is fabricated, and the environmental conditions in which the device is operating at the time of the transition. This goal can be realized by monitoring the course of the transition and adjusting the drive voltage as necessary to ensure that the transition completes in the defined time. Adjusting the magnitude of the drive voltage is one way of accomplishing this.

Certain disclosed embodiments apply a probing technique to assess the progress of an optical transition while the device is in transition. As illustrated in FIG. 3, there are typically distinct ramp to drive and the drive voltage maintenance stages of the optical transition. The probe technique can be applied during either of these. In many embodiments, it is applied during the drive voltage maintenance portion of the algorithm.

In certain embodiments, the probing technique involves pulsing the current or voltage applied to drive the transition and then monitoring the current or voltage response to detect an overdrive condition in the vicinity of the bus bars. An overdrive condition occurs when the local effective voltage is greater than needed to cause a local optical transition. For example, if an optical transition to a clear state is deemed complete when $V_{eff}$ reaches 2V, and the local value of $V_{eff}$ near a bus bar is 2.2V, the position near the bus bar may be characterized as in an overdrive condition.

One example of a probing technique involves pulsing the applied drive voltage by dropping it to the level of the hold voltage (or the hold voltage modified by an appropriate offset) and monitoring the current response to determine the direction of the current response. In this example, when the current response reaches a defined threshold, the device control system determines that it is now time to transition from the drive voltage to the hold voltage.

Figure 4A:
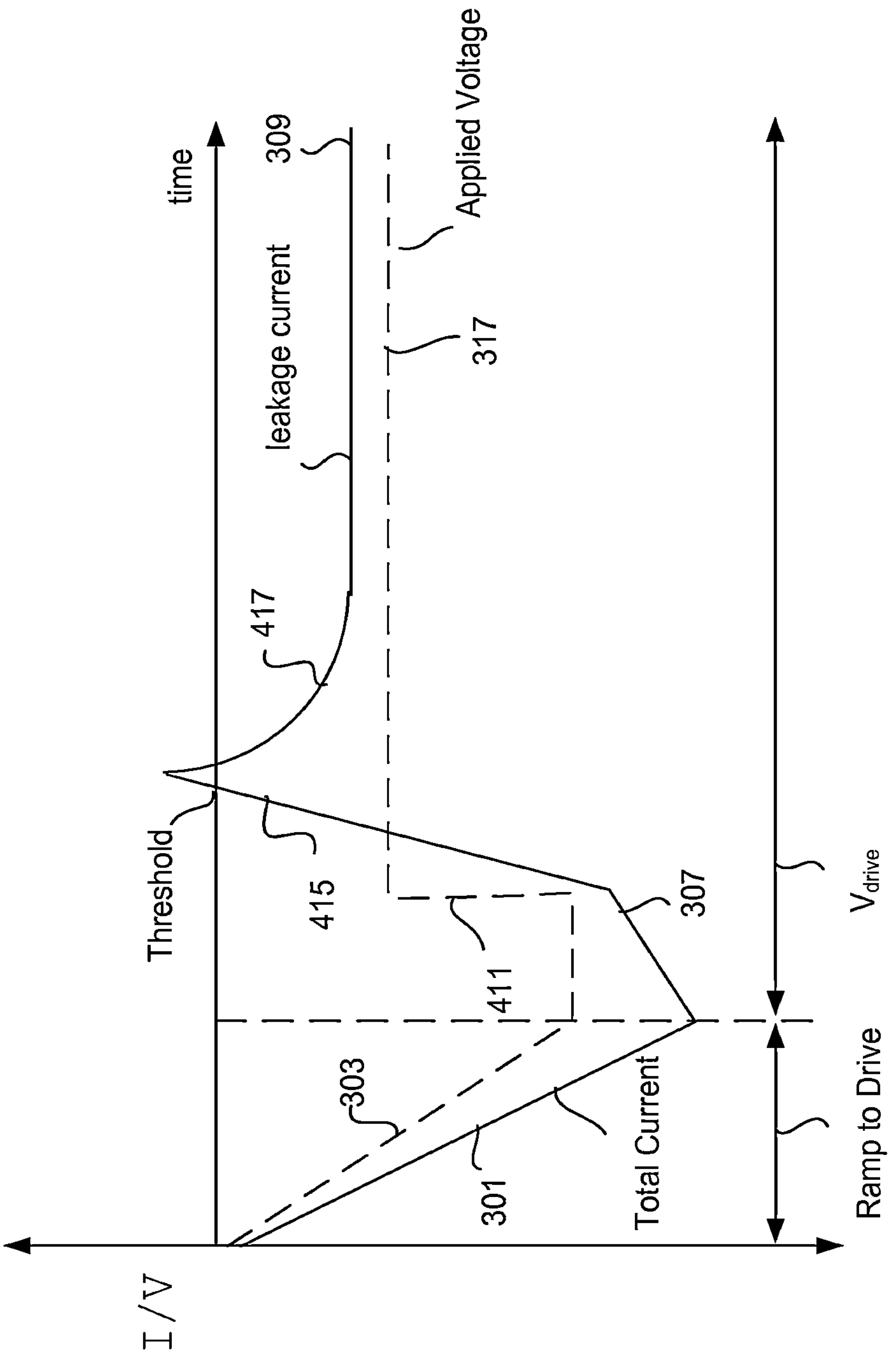
FIG. 4A is a graph depicting an optical transition in which a drop in applied voltage from $V_{drive}$ to $V_{hold}$ results in a net current flow establishing that the optical transition has proceeded far enough to permit the applied voltage to remain at $V_{hold}$ for the duration of the ending optical state.

FIG. 4A is a graph depicting an optical transition in which a drop in applied voltage from $V_{drive}$ to $V_{hold}$ results in a net current flow establishing that the optical transition has proceeded far enough to permit the applied voltage to remain at $V_{hold}$ for the duration of the ending optical state. This is illustrated by a voltage drop 411 in $V_{app}$ from V drive to $V_{hold}$. Voltage drop 411 is performed during a period when the $V_{app}$ might otherwise be constrained to remain in the drive phase shown in FIG. 3. The current flowing between the bus bars began dropping (becoming less negative), as illustrated by current segment 307, when the applied voltage initially stopped increasing (becoming more negative) and plateaued at $V_{drive}$. However, when the applied voltage now dropped at 411, the current began decreasing more readily as illustrated by current segment 415. In accordance with some embodiments, the level of current is measured after a defined period of time passes following the voltage drop 411. If the current is below a certain threshold, the optical transition is deemed complete, and the applied voltage may remain at $V_{hold}$ (or move to $V_{hold}$ if it is at some other level below $V_{drive}$). In the particular example of FIG. 4A, the current threshold is exceeded as illustrated. Therefore, the $V_{app}$ remains at $V_{hold}$ for the duration of the ending optical state. $V_{hold}$ may be selected for the ending optical state it provides. Such ending optical state may be a maximum, minimum, or intermediate optical state for the optical device undergoing the transition.

Figure 4B:
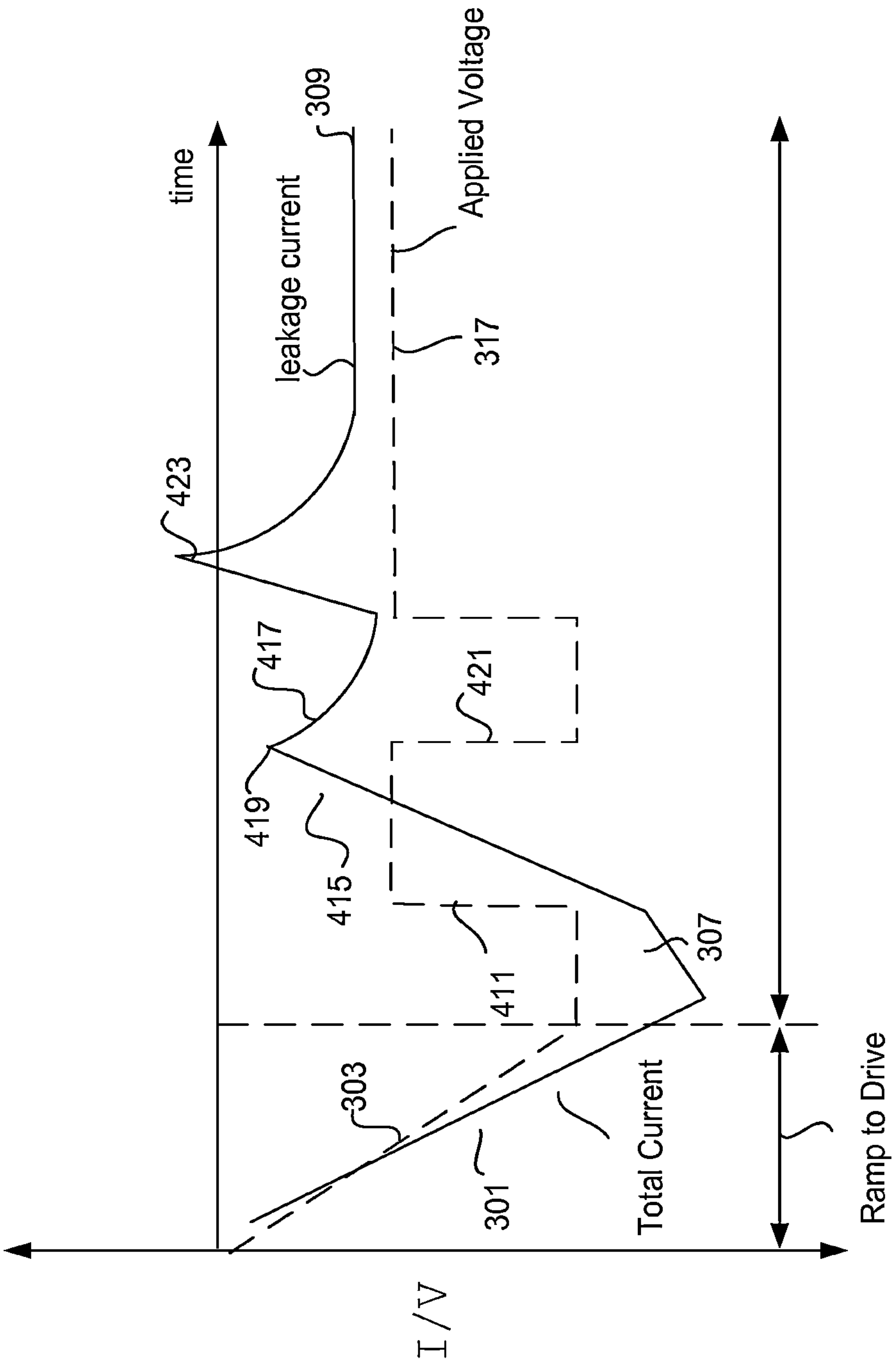
FIG. 4B is a graph depicting an optical transition in which an initial drop in applied voltage from $V_{drive}$ to $V_{hold}$ results in a net current flow indicating that the optical transition has not yet proceeded far enough to permit the applied voltage to remain at $V_{hold}$ for the duration of the ending optical state. Therefore the applied voltage is returned to $V_{drive}$ for a further period of time before again dropping again to $V_{hold}$ at which point the resulting current establishes that the optical transition has proceeded far enough to permit the applied voltage to remain at $V_{hold}$ for the duration of the ending optical state.

In situations where the current does not reach the threshold when measured, it may be appropriate to return $V_{app}$ to $V_{drive}$. FIG. 4B illustrates this situation. FIG. 4B is a graph depicting an optical transition in which an initial drop in applied voltage from $V_{drive}$ to $V_{hold}$ (see 411) results in a net current flow indicating that the optical transition has not yet proceeded far enough to permit the applied voltage to remain at $V_{hold}$ for the duration of the ending optical state. Note that current segment 415, which has a trajectory resulting from voltage drop 411, does not reach the threshold when probed at 419. Therefore the applied voltage is returned to $V_{drive}$ for a further period of time—while the current recovers at 417—before again dropping again to $V_{hold}$ (421) at which point the resulting current (423) establishes that the optical transition has proceeded far enough to permit the applied voltage to remain at $V_{hold}$ for the duration of the ending optical state. As explained, the ending optical state may be a maximum, minimum, or intermediate optical state for the optical device undergoing the transition.

As explained, the hold voltage is a voltage that will maintain the optical device in equilibrium at a particular optical density or other optical condition. It produces a steady-state result by generating a current that offsets the leakage current in the ending optical state. The drive voltage is applied to speed the transition to a point where applying the hold voltage will result in a time invariant desired optical state.

The probing technique described herein may be understood in terms of the physical mechanisms associated with an optical transition driven from bus bars at the edges of a device. Basically, the technique relies on differential values of the effective voltage experienced in the optically switchable device across the face of the device, and particularly the variation in $V_{eff}$ from the center of the device to the edge of the device. The local variation in potential on the transparent conductive layers results in different values of $V_{eff}$ across the face of the device. The value of $V_{eff}$ experienced by the optically switchable device near the bus bars is far greater the value of $V_{eff}$ in the center of the device. As a consequence, the local charge buildup in the region next to the bus bars is significantly greater than the charge buildup in the center the device.

At some point during the optical transition, the value of $V_{eff}$ at the edge of the device near the bus bars is sufficient to exceed the ending optical state desired for the optical transition whereas in the center of the device, the value of $V_{eff}$ is insufficient to reach that ending state. The ending state may be an optical density value associated with the endpoint in the optical transition. While in this intermediate stage of the optical transition, if the drive voltage is dropped to the hold voltage, the portion of the electrochromic device close to the bus bars will effectively try to transition back toward the state from which it started. However, as the device state in the center of the device has not yet reached the end state of the optical transition, when a hold voltage is applied, the center portion of the device will continue transitioning in the direction desired for the optical transition.

When the device in this intermediate stage of transition experiences the change in applied voltage from the drive voltage to the hold voltage (or some other suitably lower magnitude voltage), the portions of the device located near the bus bars—where the device is effectively overdriven—generate current flowing in the direction opposite that required to drive the transition. In contrast, the regions of the device in the center, which have not yet fully transitioned to the final state, continue to promote current flow in a direction required to drive the transition.

Over the course of the optical transition, and while the device is experiencing the applied drive voltage, there is a gradual increase in the driving force for causing current to flow in the reverse direction when the device is subject to a sudden drop in applied voltage. By monitoring the flow of current in response to perturbations away from drive voltage, one can determine a point at which the transition from the first state to the second state is sufficiently far along that a transition from drive voltage to hold voltage is appropriate. By "appropriate," it is meant that the optical transition is sufficiently complete from the edge of the device to the center of the device. Such transition can be defined in many ways depending upon the specifications of the product and its application. In one embodiment, it assumes that the transition from the first state to the second state is at least about 80% of complete or at least about 95% of complete. Complete reflecting the change in optical density from the first state to the second state. The desired level of completeness may correspond to a threshold current level as depicted in the examples of FIGS. 4A and 4B.

Many possible variations to the probing protocol exist. Such variations may include certain pulse protocols defined in terms of the length of time from the initiation of the transition to the first pulse, the duration of the pulses, the size of the pulses, and the frequency of the pulses.

In one embodiment, the pulse sequence is begun immediately upon the application of a drive voltage or a ramp to drive voltage that initiates the transition between the first optical state and second optical state. In other words, there would be no lag time between the initiation of the transition and the application of pulsing. In some implementations, the probe duration is sufficiently short (e.g., about 1 second or less) that probing back and forth between $V_{drive}$ and $V_{hold}$ for the entire transition is not significantly detrimental to switching time. However, in some embodiments, it is unnecessary to start probing right away. In some cases, switching is initiated after about 50% of an expected or nominal switching period is complete, or about 75% of such period is complete. Often, the distance between bus bars is known or can be read using an appropriately configured controller. With the distance known, a conservative lower limit for initiating probing may be implemented based on approximate known switching time. As an example, the controller may be configured to initiate probing after about 50-75% of expected switching duration is complete.

In some embodiments, the probing begins after about 30 seconds from initiating the optical transition. Relatively earlier probing may be especially helpful in cases where an interrupt command is received. An interrupt command is one that instructs the device to switch to a third optical transmission state when the device is already in the process of changing from a first to a second optical transmission state). In this case, early probing can help determine the direction of the transition (i.e, whether the interrupt command requires the window to become lighter or darker than when the command is received). In some embodiments, the probing begins about 120 minutes (e.g., about 30 minutes, about 60 minutes, or about 90 minutes) after initiating the optical transition. Relatively later probing may be more useful where larger windows are used, and where the transition occurs from an equilibrium state. For architectural glass, probing may begin about 30 seconds to 30 minutes after initiating the optical transition, in some cases between about 1-5 minutes, for example between about 1-3 minutes, or between about 10-30 minutes, or between about 20-30 minutes. In some embodiments, the probing begins about 1-5 minutes (e.g., about 1-3 minutes, about 2 minutes in a particular example) after initiating an optical transition through an interrupt command, while the probing begins about 10-30 minutes (e.g., about 20-30 minutes) after initiating an optical transition from an initial command given when the electrochromic device is in an equilibrium state.

In the examples of FIGS. 4A and 4B, the size of the pulses is between the drive voltage value and the hold voltage value. This may be done for convenience. Other pulse magnitudes are possible. For example, the pulse may a magnitude of about +/−about 500 mV of the hold voltage, or about +/−200 mV of the hold voltage. For context, an electrochromic device on a window, such as an architectural window, may have a drive voltage of about 0 volts to +/−20 volts (e.g., about +/−2 volts to +/−10 volts) and a hold voltage of about 0 volts to +/−4 volts (e.g., about +/−1 volt to +/−2 volts).

In various embodiments, the controller determines when during the optical transition the polarity of the probe current opposes the polarity of the bias due to transition proceeding to a significant extent. In other words, the current to the bus bars flows in a direction opposite of what would be expected if the optical transition was still proceeding.

Probing by dropping the applied voltage magnitude from $V_{drive}$ to $V_{hold}$ provides a convenient, and broadly applicable, mechanism for monitoring the transition to determine when the probe current first reverses polarity. Probing by dropping the voltage to a magnitude other than that of $V_{hold}$ may involve characterization of window performance. It appears that even very large windows (e.g., about 60") essentially complete their optical transition when the current first opposes the transition upon probing from $V_{drive}$ to $V_{hold}$.

In certain cases, probing occurs by dropping the applied voltage magnitude from $V_{drive}$ to $V_{probe}$, where $V_{probe}$ is a probe voltage other than the hold voltage. For example, $V_{probe}$ may be $V_{hold}$ as modified by an offset. Although many windows are able to essentially complete their optical transitions when the current first opposes the transition after probing from $V_{drive}$ to $V_{hold}$, certain windows may benefit from pulsing to a voltage slightly offset from the hold voltage. In general, the offset becomes increasingly beneficial as the size of the window increases, and as the temperature of the window drops. In certain cases, the offset is between about 0-1V, and the magnitude of $V_{probe}$ is between about 0-1V higher than the magnitude of $V_{hold}$. For example, the offset may be between about 0-0.4V. In these or other embodiments, the offset may be at least about 0.025V, or at least about 0.05V, or at least about 0.1V. The offset may result in the transition having a longer duration than it otherwise would. The longer duration helps ensure that the optical transition is able to fully complete. Techniques for selecting an appropriate offset from the hold voltage are discussed further below in the context of a target open circuit voltage.

In some embodiments, the controller notifies a user or the window network master controller of how far (by, e.g., percentage) the optical transition has progressed. This may be an indication of what transmission level the center of the window is currently at. Feedback regarding transition may be provided to user interface in a mobile device or other computational apparatus. See e.g., PCT Patent Application No. US2013/036456 filed Apr. 12, 2013, which is incorporated herein by reference in its entirety.

The frequency of the probe pulsing may be between about 10 seconds and 500 seconds. As used in this context, the "frequency" means the separation time between the midpoints of adjacent pulses in a sequence of two or more pulses. Typically, the frequency of the pulsing is between about 10 seconds and 120 seconds. In certain embodiments, the frequency the pulsing is between about 20 seconds and 30 seconds. In certain embodiments, the probe frequency is influenced by the size of the electrochromic device or the separation between bus bars in the device. In certain embodiments, the probe frequency is chosen as a function the expected duration of the optical transition. For example, the frequency may be set to be about $1/5^{th}$ to about $1/50^{th}$ (or about $1/10^{th}$ to about $1/30^{th}$) of the expected duration of the transition time. Note that transition time may correspond to the expected duration of $V_{app}=V_{drive}$. Note also that the expected duration of the transition may be a function of the size of the electrochromic device (or separation of bus bars). In one example, the duration for 14" windows is ~2.5 minutes, while the duration for 60" windows is ~40 minutes. In one example, the probe frequency is every 6.5 seconds for a 14" window and every 2 minutes for a 60" window.

In various implementations, the duration of each pulse is between about $1\times10^{-5}$ and 20 seconds. In some embodiments, the duration of the pulses is between about 0.1 and 20 seconds, for example between about 0.5 seconds and 5 seconds.

As indicated, in certain embodiments, an advantage of the probing techniques disclosed herein is that only very little information need be pre-set with the controller that is responsible for controlling a window transition. Typically, such information includes only the hold voltage (and voltage offset, if applicable) associated for each optical end state. Additionally, the controller may specify a difference in voltage between the hold voltage and a drive voltage, or alternatively, the value of $V_{drive}$ itself. Therefore, for any chosen ending optical state, the controller would know the magnitudes of $V_{hold}$, $V_{offset}$ and $V_{drive}$. The duration of the drive voltage is determined using the probing algorithm described here. In other words, the controller determines how to appropriately apply the drive voltage as a consequence of actively probing the extent of the transition in real time.

Figure 5A:
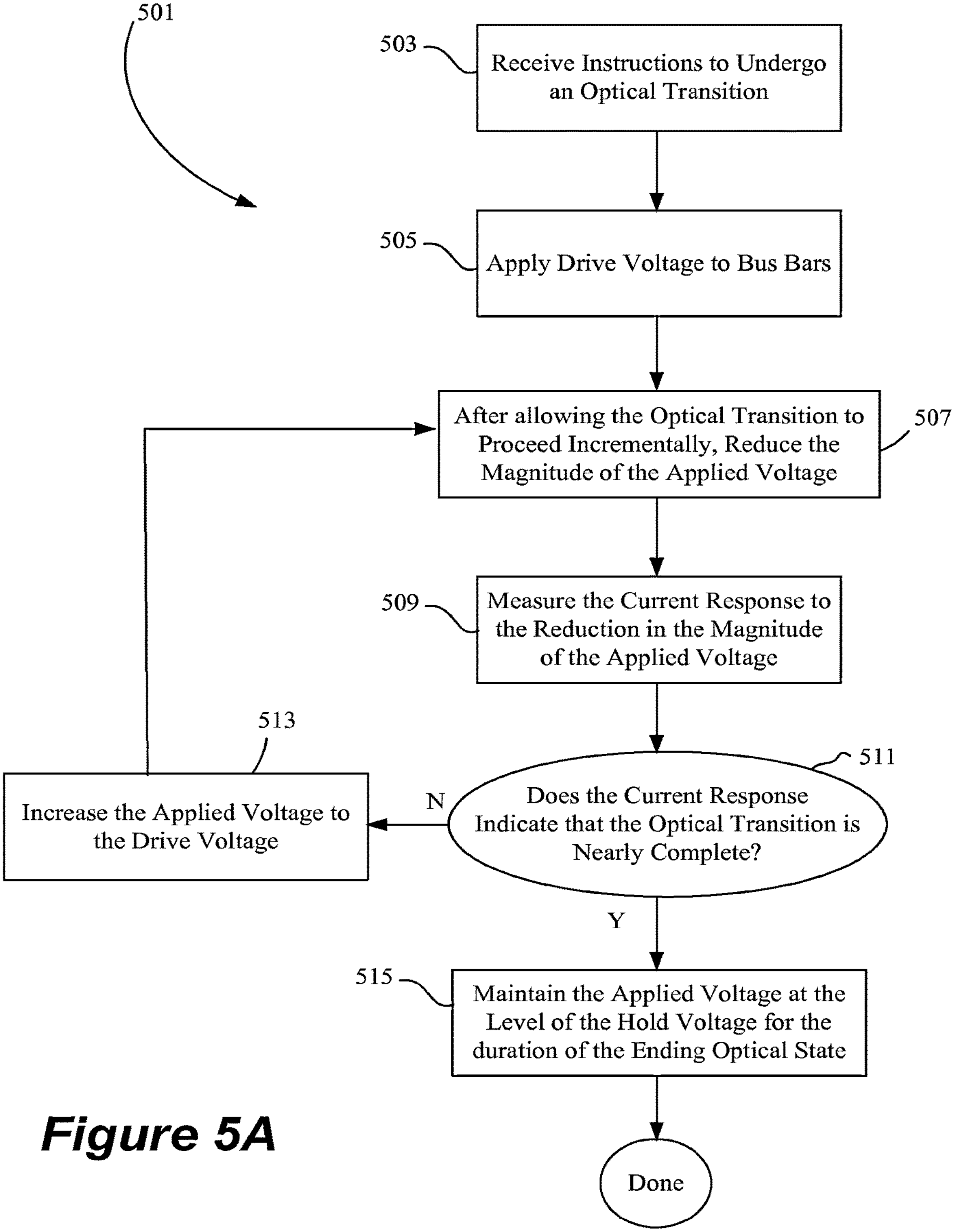
FIG. 5A is a flow chart depicting a process for probing the progress of an optical transition and determining when the transition is complete.

FIG. 5A presents a flowchart 501 for a process of monitoring and controlling an optical transition in accordance with certain disclosed embodiments. As depicted, the process begins with an operation denoted by reference number 503, where a controller or other control logic receives instructions to direct the optical transition. As explained, the optical transition may be an optical transition between a tinted state and a more clear state of electrochromic device. The instructions for directing the optical transition may be provided to the controller based upon a preprogrammed schedule, an algorithm reacting to external conditions, manual input from a user, etc. Regardless of how the instructions originate, the controller acts on them by applying a drive voltage to the bus bars of the optically switchable device. See the operation denoted by reference number 505.

As explained above, in conventional embodiments, the drive voltage is applied to the bus bars for a defined period of time after which it is presumed that the optical transition is sufficiently complete that the applied voltage can be dropped to a hold voltage. In such embodiments, the hold voltage is then maintained for the duration of the pending optical state. In contrast, in accordance with embodiments disclosed herein, the transition from a starting optical state to an ending optical state is controlled by probing the condition of the optically switchable device one or more times during the transition. This procedure is reflected in operations 507, et seq. of FIG. 5A.

In operation 507, the magnitude of the applied voltage is dropped after allowing the optical transition to proceed for an incremental period of time. The duration of this incremental transition is significantly less than the total duration required to fully complete the optical transition. Upon dropping the magnitude of the applied voltage, the controller measures the response of the current flowing to the bus bars. See operation 509. The relevant controller logic may then determine whether the current response indicates that the optical transition is nearly complete. See decision 511. As explained above, the determination of whether an optical transition is nearly complete can be accomplished in various ways. For example, it may be determined by the current reaching a particular threshold. Assuming that the current response does not indicate that the optical transition is nearly complete, process control is directed to an operation denoted by reference number 513. In this operation, the applied voltage is returned to the magnitude of the drive voltage. Process controls then loops back to operation 507 where the optical transition is allowed to proceed by a further increment before again dropping the magnitude of the applied voltage to the bus bars.

At some point in the procedure 501, decision operation 511 determines that the current response indicates that the optical transition is in fact nearly complete. At this point, process control proceeds to an operation indicated by reference number 515, where the applied voltage is transitioned to or maintained at the hold voltage for the duration of the ending optical state. At this point, the process is complete.

Separately, in some implementations, the method or controller may specify a total duration of the transition. In such implementations, the controller may be programmed to use a modified probing algorithm to monitor the progress of the transition from the starting state to the end state. The progress can be monitored by periodically reading a current value in response to a drop in the applied voltage magnitude such as with the probing technique described above. The probing technique may also be implemented using a drop in applied current (e.g., measuring the open circuit voltage) as explained below. The current or voltage response indicates how close to completion the optical transition has come. In some cases, the response is compared to a threshold current or voltage for a particular time (e.g., the time that has elapsed since the optical transition was initiated). In some embodiments, the comparison is made for a progression of the current or voltage responses using sequential pulses or checks. The steepness of the progression may indicate when the end state is likely to be reached. A linear extension to this threshold current may be used to predict when the transition will be complete, or more precisely when it will be sufficiently complete that it is appropriate to drop the drive voltage to the hold voltage.

With regard to algorithms for ensuring that the optical transition from first state to the second state occurs within a defined timeframe, the controller may be configured or designed to increase the drive voltage as appropriate to speed up the transition when the interpretation of the pulse responses suggests that the transition is not progressing fast enough to meet the desired speed of transition. In certain embodiments, when it is determined that the transition is not progressing sufficiently fast, the transition switches to a mode where it is driven by an applied current. The current is sufficiently great to increase the speed of the transition but is not so great that it degrades or damages the electrochromic device. In some implementations, the maximum suitably safe current may be referred to as $I_{safe}$. Examples of $I_{safe}$ may range between about 5 and 250 $\mu A/cm^2$. In current controlled drive mode, the applied voltage is allowed to float during the optical transition. Then, during this current controlled drive step, could the controller periodically probes by, e.g., dropping to the hold voltage and checking for completeness of transition in the same way as when using a constant drive voltage.

In general, the probing technique may determine whether the optical transition is progressing as expected. If the technique determines that the optical transition is proceeding too slowly, it can take steps to speed the transition. For example, it can increase the drive voltage. Similarly, the technique may determine that the optical transition is proceeding too quickly and risks damaging the device. When such determination is made, the probing technique may take steps to slow the transition. As an example, the controller may reduce the drive voltage.

In some applications, groups of windows are set to matching transition rates by adjusting the voltage and/or driving current based on the feedback obtained during the probing (by pulse or open circuit measurements). In embodiments where the transition is controlled by monitoring the current response, the magnitude of the current response may be compared from controller to controller (for each of the group of windows) to determine how to scale the driving potential or driving current for each window in the group. The rate of change of open circuit voltage could be used in the same manner.

Figure 5B:
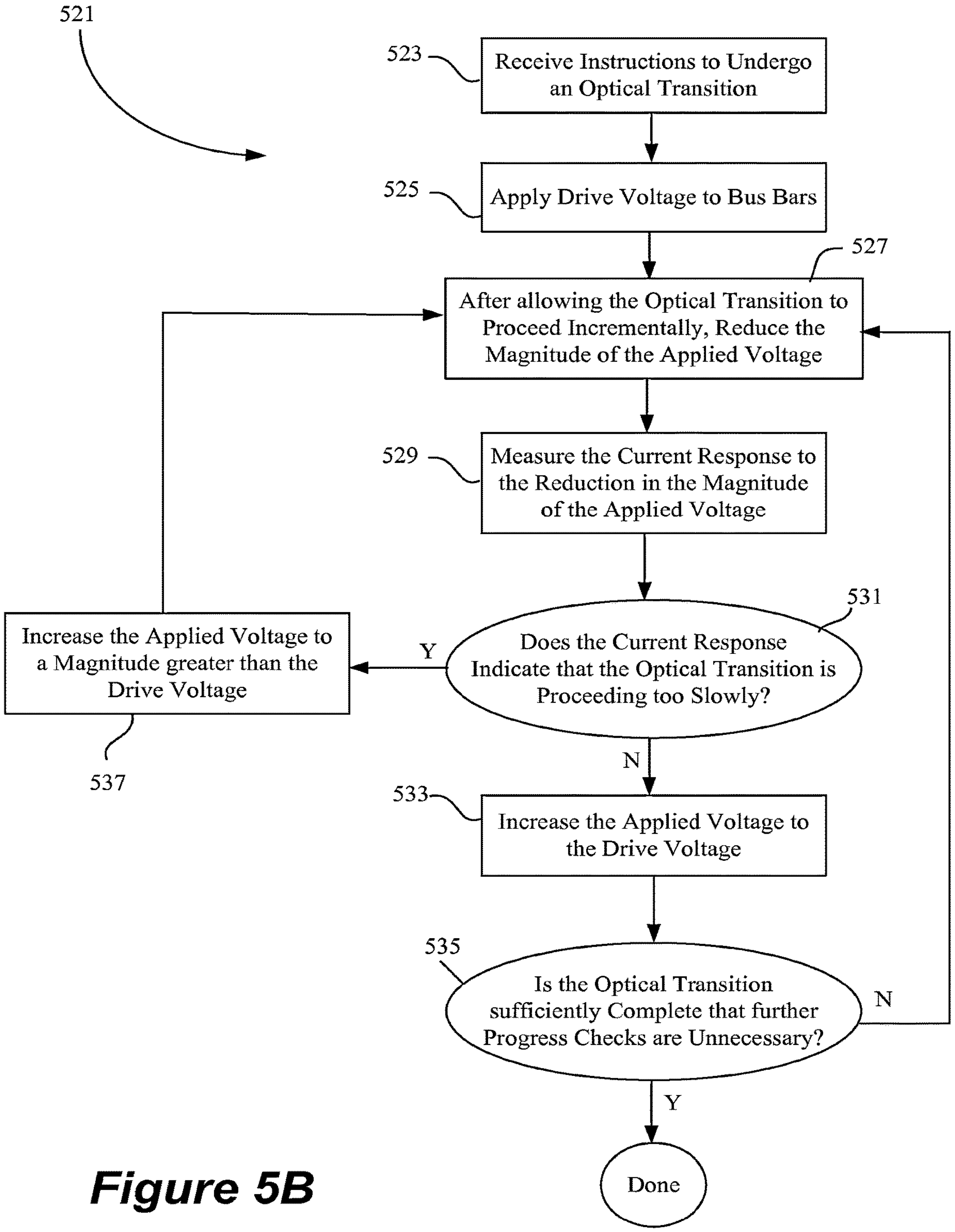
FIG. 5B is a flow chart depicting a process for probing the progress of an optical transition and speeding the transition if it is not progressing sufficiently fast.

FIG. 5B presents a flowchart 521 depicting an example process for ensuring that the optical transition occurs sufficiently fast, e.g., within a defined time period. The first four depicted operations in flowchart 521 correspond to the first four operations in flowchart 501. In other words, operation 523, 525, 527, and 529 of flowchart 521 correspond to operations 503, 505, 507, and 509 of flowchart 501. Briefly, in operation 523, the controller or other appropriate logic receives instructions to undergo an optical transition. Then, at operation 525, the controller applies a drive voltage to the bus bars. After allowing the optical transition to proceed incrementally, the controller drops the magnitude of the applied voltage to the bus bars. See operation 527. The magnitude of the lower voltage is typically, though not necessarily, the hold voltage. As mentioned, the lower voltage may also be the hold voltage as modified by an offset (the offset often falling between about 0-1V, for example between about 0-0.4V in many cases). Next, the controller measures the current response to the applied voltage drop. See operation 529.

The controller next determines whether the current response indicates that the optical transition is proceeding too slowly. See decision 531. As explained, the current response may be analyzed in various ways determine whether the transition is proceeding with sufficient speed. For example, the magnitude of the current response may be considered or the progression of multiple current responses to multiple voltage pulses may be analyzed to make this determination.

Assuming that operation 531 establishes that the optical transition is proceeding rapidly enough, the controller then increases the applied voltage back to the drive voltage. See operation 533. Thereafter, the controller then determines whether the optical transition is sufficiently complete that further progress checks are unnecessary. See operation 535. In certain embodiments, the determination in operation 535 is made by considering the magnitude of the current response as discussed in the context of FIG. 5A. Assuming that the optical transition is not yet sufficiently complete, process control returns to operation 527, where the controller allows the optical transition to progress incrementally further before again dropping the magnitude of the applied voltage.

Assuming that execution of operation 531 indicates that the optical transition is proceeding too slowly, process control is directed to an operation 537 where the controller increases the magnitude of the applied voltage to a level that is greater than the drive voltage. This over drives the transition and hopefully speeds it along to a level that meets specifications. After increasing the applied voltage to this level, process control is directed to operation 527 where the optical transition continues for a further increment before the magnitude of the applied voltage is dropped. The overall process then continues through operation 529, 531, etc. as described above. At some point, decision 535 is answered in the affirmative and the process is complete. In other words, no further progress checks are required. The optical transition then completes as illustrated in, for example, flowchart 501.

Another application of the probing techniques disclosed herein involves on-the-fly modification of the optical transition to a different end state. In some cases, it will be necessary to change the end state after a transition begins. Examples of reasons for such modification include a user's manual override a previously specified end tint state and a wide spread electrical power shortage or disruption. In such situations, the initially set end state might be transmissivity=40% and the modified end state might be transmissivity=5%.

Where an end state modification occurs during an optical transition, the probing techniques disclosed herein can adapt and move directly to the new end state, rather than first completing the transition to the initial end state.

In some implementations, the transition controller/method detects the current state of the window using a voltage/current sense as disclosed herein and then moves to a new drive voltage immediately. The new drive voltage may be determined based on the new end state and optionally the time allotted to complete the transition. If necessary, the drive voltage is increased significantly to speed the transition or drive a greater transition in optical state. The appropriate modification is accomplished without waiting for the initially defined transition to complete. The probing techniques disclosed herein provide a way to detect where in the transition the device is and make adjustments from there.

It should be understood that the probing techniques presented herein need not be limited to measuring the magnitude of the device's current in response to a voltage drop (pulse). There are various alternatives to measuring the magnitude of the current response to a voltage pulse as an indicator of how far as the optical transition has progressed. In one example, the profile of a current transient provides useful information. In another example, measuring the open circuit voltage of the device may provide the requisite information. In such embodiments, the pulse involves simply applying no voltage to device and then measuring the voltage that the open circuit device applies. Further, it should be understood that current and voltage based algorithms are equivalent. In a current based algorithm, the probe is implemented by dropping the applied current and monitoring the device response. The response may be a measured change in voltage. For example, the device may be held in an open circuit condition to measure the voltage between bus bars.

Figure 5C:
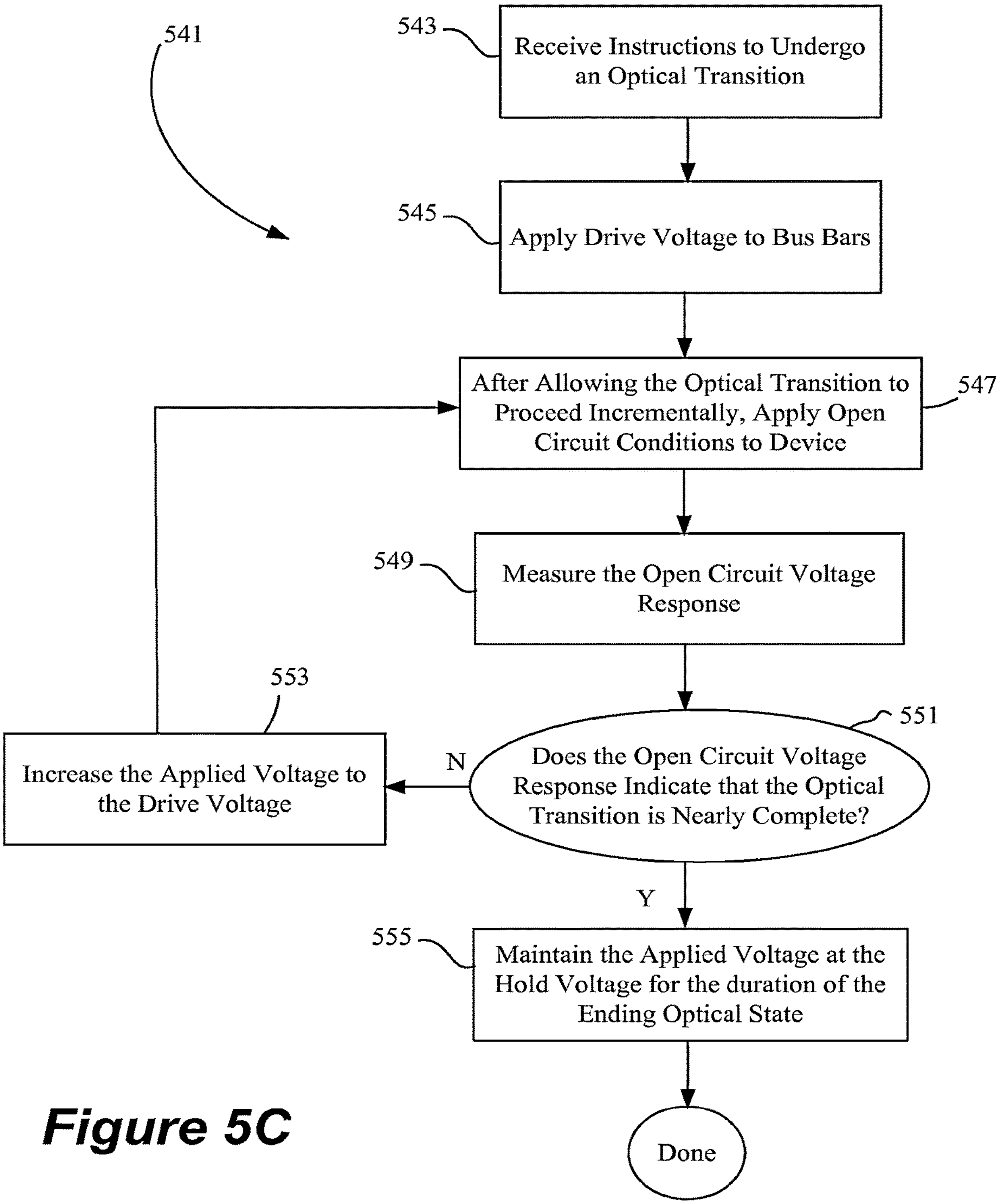
FIGS. 5C-5F are flow charts depicting alternative processes for probing the progress of an optical transitioning and determining when the transition is complete.

FIG. 5C presents a flowchart 501 for a process of monitoring and controlling an optical transition in accordance with certain disclosed embodiments. In this case, the process condition probed is the open circuit voltage, as described in the previous paragraph. The first two depicted operations in flowchart 541 correspond to the first two operations in flowcharts 501 and 521. In other words, operations 543 and 545 of flowchart 541 correspond to operations 503 and 505 of flowchart 501. Briefly, in operation 543, the controller or other appropriate logic receives instructions to undergo an optical transition. Then, at operation 545, the controller applies a drive voltage to the bus bars. After allowing the optical transition to proceed incrementally, the controller applies open circuit conditions to the electrochromic device at operation 547. Next, the controller measures the open circuit voltage response at operation 549.

As is the case above, the controller may measure the electronic response (in this case the open circuit voltage) after a defined period has passed since applying the open circuit conditions. Upon application of open circuit conditions, the voltage typically experiences an initial drop relating to the ohmic losses in external components connected to the electrochromic device. Such external components may be, for example, conductors and connections to the device. After this initial drop, the voltage experiences a first relaxation and settles at a first plateau voltage. The first relaxation relates to internal ohmic losses, for example over the electrode/electrolyte interfaces within the electrochromic devices. The voltage at the first plateau corresponds to the voltage of the cell, with both the equilibrium voltage and the overvoltages of each electrode. After the first voltage plateau, the voltage experiences a second relaxation to an equilibrium voltage. This second relaxation is much slower, for example on the order of hours. In some cases it is desirable to measure the open circuit voltage during the first plateau, when the voltage is relatively constant for a short period of time. This technique may be beneficial in providing especially reliable open circuit voltage readings. In other cases, the open circuit voltage is measured at some point during the second relaxation. This technique may be beneficial in providing sufficiently reliable open circuit readings while using less expensive and quick-operating power/control equipment.

In some embodiments, the open circuit voltage is measured after a set period of time after the open circuit conditions are applied. The optimal time period for measuring the open circuit voltage is dependent upon the distance between the bus bars. The set period of time may relate to a time at which the voltage of a typical or particular device is within the first plateau region described above. In such embodiments, the set period of time may be on the order of milliseconds (e.g., a few milliseconds in some examples). In other cases, the set period of time may relate to a time at which the voltage of a typical or particular device is experiencing the second relaxation described above. Here, the set period of time may be on the order of about 1 second to several seconds, in some cases. Shorter times may also be used depending on the available power supply and controller. As noted above, the longer times (e.g., where the open circuit voltage is measured during the second relaxation) may be beneficial in that they still provide useful open circuit voltage information without the need for high end equipment capable of operating precisely at very short timeframes.

In certain implementations, the open circuit voltage is measured/recorded after a timeframe that is dependent upon the behavior of the open circuit voltage. In other words, the open circuit voltage may be measured over time after open circuit conditions are applied, and the voltage chosen for analysis may be selected based on the voltage vs. time behavior. As described above, after application of open circuit conditions, the voltage goes through an initial drop, followed by a first relaxation, a first plateau, and a second relaxation. Each of these periods may be identified on a voltage vs. time plot based on the slope of curve. For example, the first plateau region will relate to a portion of the plot where the magnitude of dVoc/dt is relatively low. This may correspond to conditions in which the ionic current has stopped (or nearly stopped) decaying. As such, in certain embodiments, the open circuit voltage used in the feedback/analysis is the voltage measured at a time when the magnitude of dVoc/dt drops below a certain threshold.

Returning to FIG. 5C, after the open circuit voltage response is measured, it can be compared to a target open circuit voltage at operation 551. The target open circuit voltage may correspond to the hold voltage. In certain cases, discussed further below, the target open circuit voltage corresponds to the hold voltage as modified by an offset. Techniques for choosing an appropriate offset from the hold voltage are discussed further below. Where the open circuit voltage response indicates that the optical transition is not yet nearly complete (i.e., where the open circuit voltage has not yet reached the target open circuit voltage), the method continues at operation 553, where the applied voltage is increased to the drive voltage for an additional period of time. After the additional period of time has elapsed, the method can repeat from operation 547, where the open circuit conditions are again applied to the device. At some point in the method 541, it will be determined in operation 551 that the open circuit voltage response indicates that the optical transition is nearly complete (i.e., where the open circuit voltage response has reached the target open circuit voltage). When this is the case, the method continues at operation 555, where the applied voltage is maintained at the hold voltage for the duration of the ending optical state.

The method 541 of FIG. 5C is very similar to the method 501 of FIG. 5A. The main difference is that in FIG. 5C, the relevant variable measured is the open circuit voltage, while in FIG. 5A, the relevant variable measured is the current response when a reduced voltage is applied. In another embodiment, the method 521 of FIG. 5B is modified in the same way. In other words, the method 521 may be altered such that probing occurs by placing the device in open circuit conditions and measuring the open circuit voltage rather than a current response.

In another embodiment, the process for monitoring and controlling an optical transition takes into account the total amount of charge delivered to the electrochromic device during the transition, per unit area of the device. This quantity may be referred to as the delivered charge density or total delivered charge density. As such, an additional criterion such as the total charge density delivered may be used to ensure that the device fully transitions under all conditions.

The total delivered charge density may be compared to a threshold charge density (also referred to as a target charge density) to determine whether the optical transition is nearly complete. The threshold charge density may be chosen based on the minimum charge density required to fully complete or nearly complete the optical transition under the likely operating conditions. In various cases, the threshold charge density may be chosen/estimated based on the charge density required to fully complete or nearly complete the optical transition at a defined temperature (e.g., at about −40° C., at about −30° C., at about −20° C., at about −10° C., at about 0° C., at about 10° C., at about 20° C., at about 25° C., at about 30° C., at about 40° C., at about 60° C., etc.).

The optimum threshold charge density may also be affected by the leakage current of the electrochromic device. Devices that have higher leakage currents should have higher threshold charge densities. In some embodiments, an appropriate threshold charge density may be determined empirically for an individual window or window design. In other cases, an appropriate threshold may be calculated/selected based on the characteristics of the window such as the size, bus bar separation distance, leakage current, starting and ending optical states, etc. Example threshold charge densities range between about $1\times10^{-5}$ C/cm$^2$ and about 5 C/cm$^2$, for example between about $1\times10^{-4}$ and about 0.5 C/cm$^2$, or between about 0.005-0.05 C/cm$^2$, or between about 0.01-0.04 C/cm$^2$, or between about 0.01-0.02 in many cases. Smaller threshold charge densities may be used for partial transitions (e.g., fully clear to 25% tinted) and larger threshold charge densities may be used for full transitions. A first threshold charge density may be used for bleaching/clearing transitions, and a second threshold charge density may be used for coloring/tinting transitions. In certain embodiments, the threshold charge density is higher for tinting transitions than for clearing transitions. In a particular example, the threshold charge density for tinting is between about 0.013-0.017 C/cm$^2$, and the threshold charge density for clearing is between about 0.016-0.020 C/cm$^2$. Additional threshold charge densities may be appropriate where the window is capable of transitioning between more than two states. For instance, if the device switches between four different optical states: A, B, C, and D, a different threshold charge density may be used for each transition (e.g., A to B, A to C, A to D, B to A, etc.).

In some embodiments, the threshold charge density is determined empirically. For instance, the amount of charge required to accomplish a particular transition between desired end states may be characterized for devices of different sizes. A curve may be fit for each transition to correlate the bus bar separation distance with the required charge density. Such information may be used to determine the minimum threshold charge density required for a particular transition on a given window. In some cases, the information gathered in such empirical determinations is used to calculate an amount of charge density that corresponds to a certain level of change (increase or decrease) in optical density.

Figure 5D:
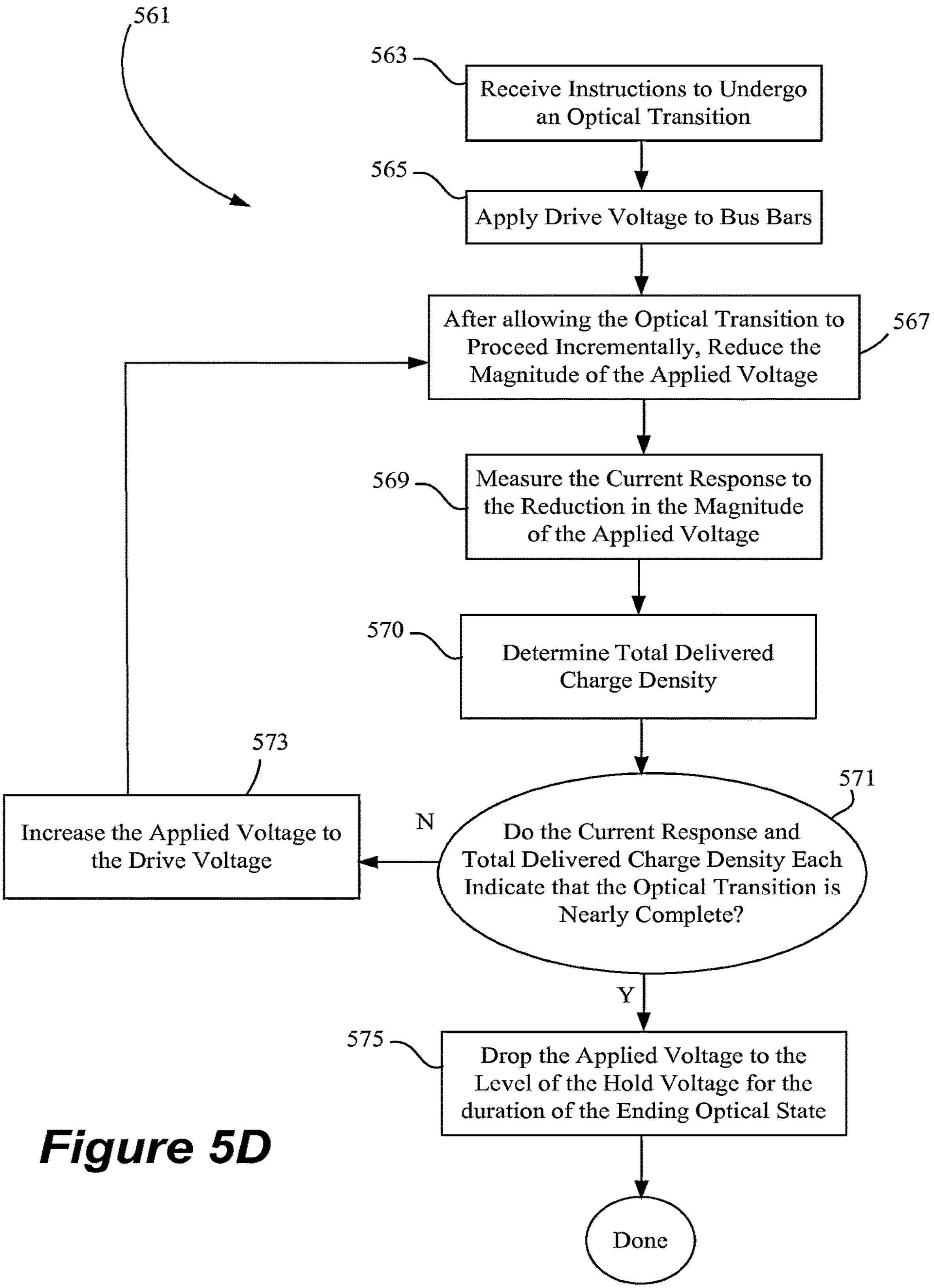

FIG. 5D presents a flow chart for a method 561 for monitoring and controlling an optical transition in an electrochromic device. The method starts at operations 563 and 565, which correspond to operations 503 and 505 of FIG. 5A. At 563, the controller or other appropriate logic receives instructions to undergo an optical transition. Then, at operation 565, the controller applies a drive voltage to the bus bars. After allowing the optical transition to proceed incrementally, the magnitude of the voltage applied to the bus bars is reduced to a probe voltage (which in some cases is the hold voltage, and in other cases is the hold voltage modified by an offset) at operation 567. Next at operation 569, the current response to the reduced applied voltage is measured.

Thus far, the method 561 of FIG. 5D is identical to the method 501 of FIG. 5A. However, the two methods diverge at this point in the process, with method 561 continuing at operation 570, where the total delivered charge density is determined. The total delivered charge density may be calculated based on the current delivered to the device during the optical transition, integrated over time. At operation 571, the relevant controller logic may determine whether the current response and total delivered charge density each indicate that the optical transition is nearly complete. As explained above, the determination of whether an optical transition is nearly complete can be accomplished in various ways. For example, it may be determined by the current reaching a particular threshold, and by the delivered charge density reaching a particular threshold. Both the current response and the total delivered charge density must indicate that the transition is nearly complete before the method can continue on at operation 575, where the applied voltage is transitioned to or maintained at the hold voltage for the duration of the ending optical state. Assuming at least one of the current response and total delivered charge density indicate that the optical transition is not yet nearly complete at operation 571, process control is directed to an operation denoted by reference number 573. In this operation, the applied voltage is returned to the magnitude of the drive voltage. Process control then loops back to operation 567 where the optical transition is allowed to proceed by a further increment before again dropping the magnitude of the applied voltage to the bus bars.

Figure 5E:
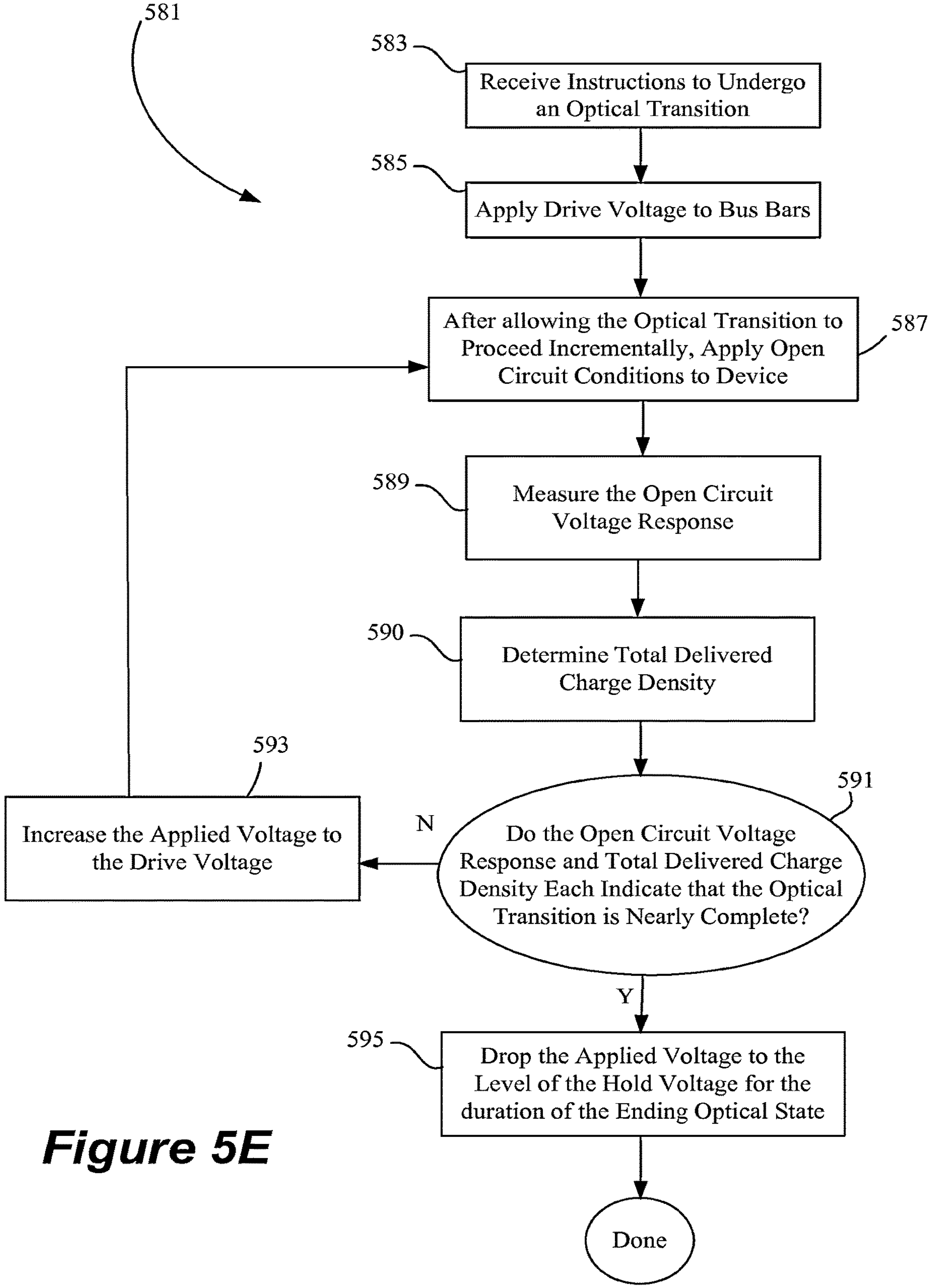

FIG. 5E presents an alternative method for monitoring and controlling an optical transition in an electrochromic device. The method starts at operations 583 and 585, which correspond to operations 503 and 505 of FIG. 5A. At 583, the controller or other appropriate logic receives instructions to undergo an optical transition. Then, at operation 585, the controller applies a drive voltage to the bus bars. After allowing the optical transition to proceed incrementally, open circuit conditions are applied to the device at operation 587. Next at operation 589, the open circuit voltage of the device is measured.

Thus far, the method 581 of FIG. 5E is identical to the method 541 of FIG. 5C. However, the two methods diverge at this point in the process, with method 581 continuing at operation 590, where the total delivered charge density is determined. The total delivered charge density may be calculated based on the current delivered to the device during the optical transition, integrated over time. At operation 591, the relevant controller logic may determine whether the open circuit voltage and total delivered charge density each indicate that the optical transition is nearly complete. Both the open circuit voltage response and the total delivered charge density must indicate that the transition is nearly complete before the method can continue on at operation 595, where the applied voltage is transitioned to or maintained at the hold voltage for the duration of the ending optical state. Assuming at least one of the open circuit voltage response and total delivered charge density indicate that the optical transition is not yet nearly complete at operation 591, process control is directed to an operation denoted by reference number 593. In this operation, the applied voltage is returned to the magnitude of the drive voltage. Process control then loops back to operation 587 where the optical transition is allowed to proceed by a further increment before again applying open circuit conditions to the device. The method 581 of FIG. 5E is very similar to the method 561 of FIG. 5D. The principal difference between the two embodiments is that in FIG. 5D, the applied voltage drops and a current response is measured, whereas in FIG. 5E, open circuit conditions are applied and an open circuit voltage is measured.

Figure 5F:
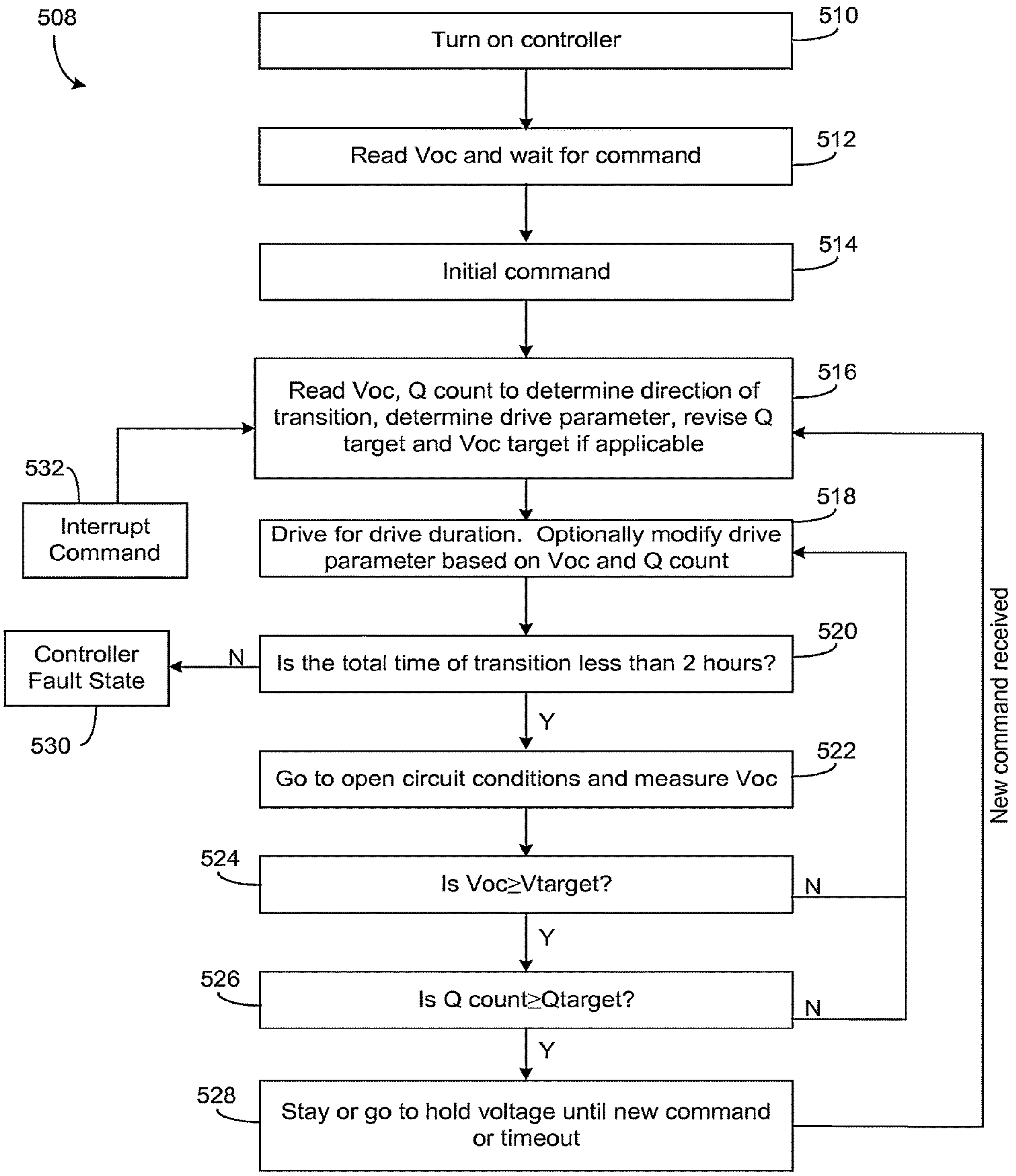

FIG. 5F illustrates a flowchart for a related method 508 for controlling an optical transition in an electrochromic device. The method 508 of FIG. 5F is similar to the method 581 of FIG. 5E. The method 508 begins at operation 510 where the controller is turned on. Next, at operation 512, the open circuit voltage (Voc) is read and the device waits for an initial command. An initial command is received at operation 514, the command indicating that the window should switch to a different optical state. After the command is received, open circuit conditions are applied and the open circuit voltage is measured at operation 516. The amount of charge delivered (Q) may also be read at block 516. These parameters determine the direction of the transition (whether the window is supposed to get more tinted or more clear), and impact the optimal drive parameter. An appropriate drive parameter (e.g., drive voltage) is selected at operation 516. This operation may also involve revising the target charge count and target open circuit voltage, particularly in cases where an interrupt command is received, as discussed further below.

After the open circuit voltage is read at operation 516, the electrochromic device is driven for a period of time. The drive duration may be based on the busbar separation distance in some cases. In other cases, a fixed drive duration may be used, for example about 30 seconds. This driving operation may involve applying a drive voltage or current to the device. Operation 518 may also involve modifying a drive parameter based on the sensed open circuit voltage and/or charge count. Next, at operation 520, it is determined whether the total time of the transition (thus far) is less than a threshold time. The threshold time indicated in FIG. 5F is 2 hours, though other time periods may be used as appropriate. If it is determined that the total time of transition is not less than the threshold time (e.g., where the transition has taken at least 2 hours and is not yet complete), the controller may indicate that it is in a fault state at operation 530. This may indicate that something has caused an error in the transition process. Otherwise, where the total time of transition is determined to be less than the threshold time, the method continues at operation 522. Here, open circuit conditions are again applied, and the open circuit voltage is measured. At operation 524, it is determined whether the measured open circuit voltage is greater than or equal to the target voltage (in terms of magnitude). If so, the method continues at operation 526, where it is determined whether the charge count (Q) is greater than or equal to the target charge count. If the answer in either of operations 524 or 526 is no, the method returns to block 518 where the electrochromic device transition is driven for an additional drive duration. Where the answer in both of operations 524 and 526 is yes, the method continues at operation 528, where a hold voltage is applied to maintain the electrochromic device in the desired tint state. Typically, the hold voltage continues to be applied until a new command is received, or until a timeout is experienced.

When a new command is received after the transition is complete, the method may return to operation 516. Another event that can cause the method to return to operation 516 is receiving an interrupt command, as indicated in operation 532. An interrupt command may be received at any point in the method after an initial command is received at operation 514 and before the transition is essentially complete at operation 528. The controller should be capable of receiving multiple interrupt commands over a transition. One example interrupt command involves a user directing a window to change from a first tint state (e.g., fully clear) to a second tint state (e.g., fully tinted), then interrupting the transition before the second tint state is reached to direct the window to change to a third tint state (e.g., half tinted) instead of the second tint state. After receiving a new command or an interrupt command, the method returns to block 516 as indicated above. Here, open circuit conditions are applied and the open circuit voltage and charge count are read. Based on the open circuit voltage and charge count readings, as well as the desired third/final tint state, the controller is able to determine appropriate drive conditions (e.g., drive voltage, target voltage, target charge count, etc.) for reaching the third tint state. For instance, the open circuit voltage/charge count may be used to indicate in which direction the transition should occur. The charge count and charge target may also be reset after receiving a new command or an interrupt command. The updated charge count may relate to the charge delivered to move from the tint state when the new/interrupt command is received to the desired third tint state. Because the new command/interrupt command will change the starting and ending points of the transition, the target open circuit voltage and target charge count may need to be revised. This is indicated as an optional part of operation 516, and is particularly relevant where a new or interrupt command is received.

In certain implementations, the method involves using a static offset to the hold voltage. This offset hold voltage may be used to probe the device and elicit a current response, as described in relation to FIGS. 5A, 5B, and 5D. The offset hold voltage may also be used as a target open circuit voltage, as described in relation to FIGS. 5C and 5E. In certain cases, particularly for windows with a large separation between the bus bars (e.g., at least about 25"), the offset can be beneficial in ensuring that the optical transition proceeds to completion across the entire window.

In many cases, an appropriate offset is between about 0-0.5V (e.g., about 0.1-0.4V, or between about 0.1-0.2V). Typically, the magnitude of an appropriate offset increases with the size of the window. An offset of about 0.2V may be appropriate for a window of about 14 inches, and an offset of about 0.4V may be appropriate for a window of about 60 inches. These values are merely examples and are not intended to be limiting. In some embodiments, a window controller is programmed to use a static offset to $V_{hold}$. The magnitude and in some cases direction of the static offset may be based on the device characteristics such as the size of the device and the distance between the bus bars, the driving voltage used for a particular transition, the leakage current of the device, the peak current density, capacitance of the device, etc. In various embodiments, the static offset is determined empirically. In some designs, it is calculated dynamically, when the device is installed or while it is installed and operating, from monitored electrical and/or optical parameters or other feedback.

In other embodiments, a window controller may be programmed to dynamically calculate the offset to $V_{hold}$. In one implementation, the window controller dynamically calculates the offset to $V_{hold}$ based on one or more of the device's current optical state (OD), the current delivered to the device (I), the rate of change of current delivered to the device (dI/dt), the open circuit voltage of the device ($V_{oc}$), and the rate of change of the open circuit voltage of the device ($dV_{oc}/dt$). This embodiment is particularly useful because it does not require any additional sensors for controlling the transition. Instead, all of the feedback is generated by pulsing the electronic conditions and measuring the electronic response of the device. The feedback, along with the device characteristics mentioned above, may be used to calculate the optimal offset for the particular transition occurring at that time. In other embodiments, the window controller may dynamically calculate the offset to $V_{hold}$ based on certain additional parameters. These additional parameters may include the temperature of the device, ambient temperature, and signals gathered by photoptic sensors on the window. These additional parameters may be helpful in achieving uniform optical transitions at different conditions. However, use of these additional parameters also increases the cost of manufacture due to the additional sensors required.

The offset may be beneficial in various cases due to the non-uniform quality of the effective voltage, $V_{eff}$, applied across the device. The non-uniform $V_{eff}$ is shown in FIG. 2, for example, described above. Because of this non-uniformity, the optical transition does not occur in a uniform manner. In particular, areas near the bus bars experience the greatest $V_{eff}$ and transition quickly, while areas removed from the bus bars (e.g., the center of the window) experience the lowest $V_{eff}$ and transition more slowly. The offset can help ensure that the optical transition proceeds to completion at the center of the device where the change is slowest.

Figure 6A:
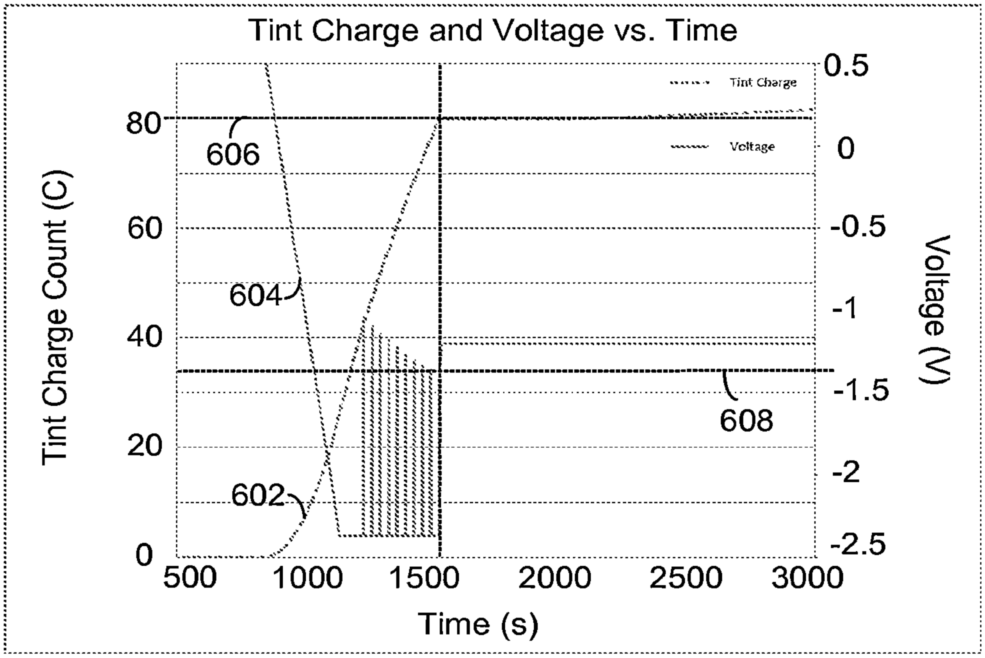
FIGS. 6A and 6B show graphs depicting the total charge delivered over time and the voltage applied over time during an electrochromic transition when using the method of FIG. 5E to probe and monitor the progress of the transition, at room temperature (FIG. 6A) and at a reduced temperature (FIG. 6B).
Figure 6B:
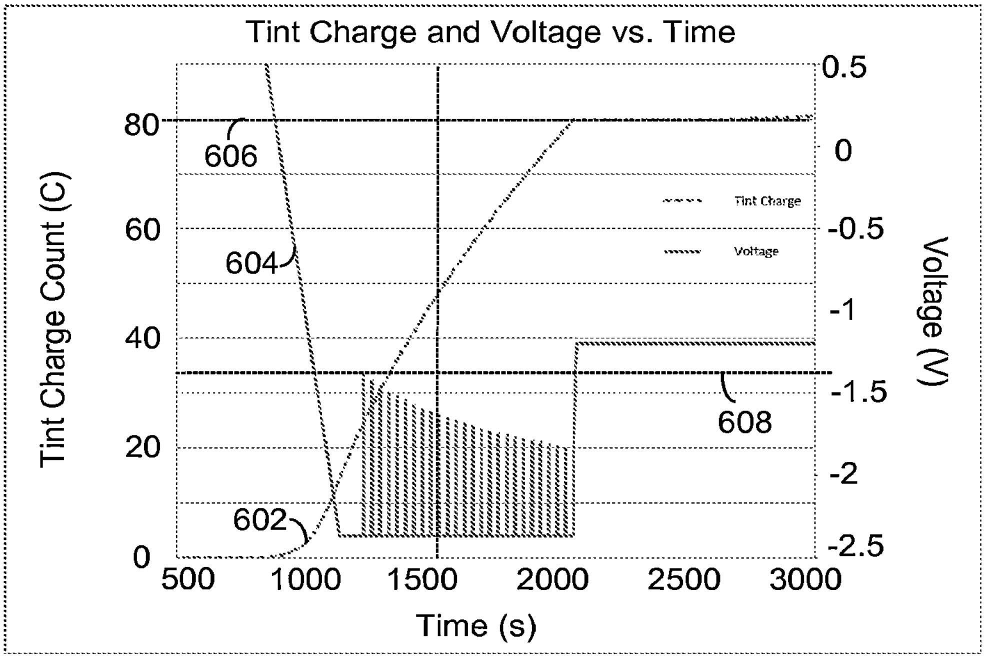

FIGS. 6A and 6B show graphs depicting the total charge delivered over time and the applied voltage over time during two different electrochromic tinting transitions. The window in each case measured about 24×24 inches. The total charge delivered is referred to as the Tint Charge Count, and is measured in coulombs (C). The total charge delivered is presented on the left hand y-axis of each graph, and the applied voltage is presented on the right hand y-axis of each graph. In each figure, line 602 corresponds to the total charge delivered and line 604 corresponds to the applied voltage. Further, line 606 in each graph corresponds to a threshold charge (the threshold charge density multiplied by the area of the window), and line 608 corresponds to a target open circuit voltage. The threshold charge and target open circuit voltage are used in the method shown in FIG. 5E to monitor/control the optical transition.

The voltage curves 604 in FIGS. 6A and 6B each start out with a ramp to drive component, where the magnitude of the voltage ramps up to the drive voltage of about −2.5V. After an initial period of applying the drive voltage, the voltage begins to spike upwards at regular intervals. These voltage spikes occur when the electrochromic device is being probed. As described in FIG. 5E, the probing occurs by applying open circuit conditions to the device. The open circuit conditions result in an open circuit voltage, which correspond to the voltage spikes seen in the graphs. Between each probe/open circuit voltage, there is an additional period where the applied voltage is the drive voltage. In other words, the electrochromic device is driving the transition and periodically probing the device to test the open circuit voltage and thereby monitor the transition. The target open circuit voltage, represented by line 608, was selected to be about −1.4V for each case. The hold voltage in each case was about −1.2V. Thus, the target open circuit voltage was offset from the hold voltage by about 0.2V.

In the transition of FIG. 6A, the magnitude of the open circuit voltage exceeds the magnitude of the target open circuit voltage at about 1500 seconds. Because the relevant voltages in this example are negative, this is shown in the graph as the point at which the open circuit voltage spikes first fall below the target open circuit voltage. In the transition of FIG. 6B, the magnitude of the open circuit voltage exceeds the magnitude of the target open circuit voltage sooner than in FIG. 6A, around 1250 seconds.

The total delivered charge count curves 602 in FIGS. 6A and 6B each start at 0 and rise monotonically. In the transition of FIG. 6A, the delivered charge reaches the threshold charge at around 1500 seconds, which was very close to the time at which the target open circuit voltage was met. Once both conditions were met, the voltage switched from the drive voltage to the hold voltage, around 1500 seconds. In the transition of FIG. 6B, the total delivered charge took about 2100 seconds to reach the charge threshold, which is about 14 minutes longer than it took the voltage to reach the target voltage for this transition. After both the target voltage and threshold charge are met, the voltage is switched to the hold voltage. The additional requirement of the total charge delivered results in the FIG. 6B case driving the transition at the drive voltage for a longer time than might otherwise be used. This helps ensure full and uniform transitions across many window designs at various environmental conditions.

In another embodiment, the optical transition is monitored through voltage sensing pads positioned directly on the transparent conductive layers (TCLs). This allows for a direct measurement of the $V_{eff}$ at the center of the device, between the bus bars where $V_{eff}$ is at a minimum. In this case, the controller indicates that the optical transition is complete when the measured $V_{eff}$ at the center of the device reaches a target voltage such as the hold voltage. In various embodiments, the use of sensors may reduce or eliminate the benefit from using a target voltage that is offset from the hold voltage. In other words, the offset may not be needed and the target voltage may equal the hold voltage when the sensors are present. Where voltage sensors are used, there should be at least one sensor on each TCL. The voltage sensors may be placed at a distance mid-way between the bus bars, typically off to a side of the device (near an edge) so that they do not affect (or minimally affect) the viewing area. The voltage sensors may be hidden from view in some cases by placing them proximate a spacer/separator and/or frame that obscures the view of the sensor.

Figure 6C:
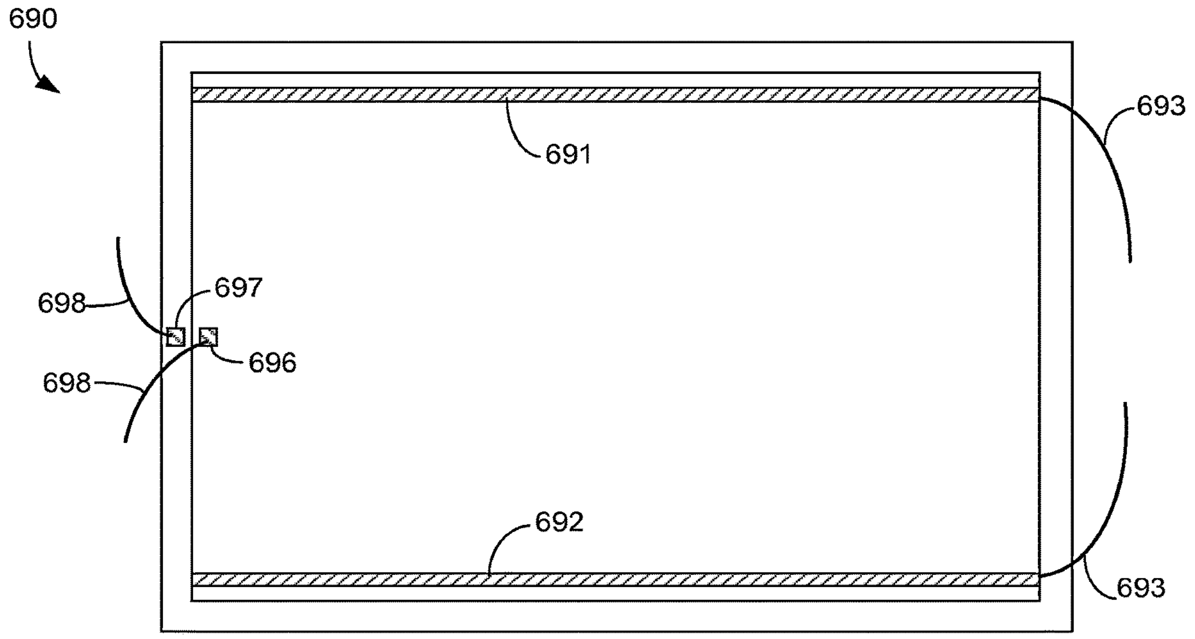
FIG. 6C illustrates an electrochromic window having a pair of voltage sensors on the transparent conductive oxide layers according to an embodiment.

FIG. 6C presents an embodiment of an EC window 690 that utilizes sensors to directly measure the effective voltage at the center of the device. The EC window 690 includes top bus bar 691 and bottom bus bar 692, which are connected by wires 693 to a controller (not shown). Voltage sensor 696 is placed on the top TCL, and voltage sensor 697 is placed on the bottom TCL. The sensors 696 and 697 are placed at a distance mid-way between the bus bars 691 and 692, though they are off to the side of the device. In some cases the voltage sensors may be positioned such that they reside within a frame of the window. This placement helps hide the sensors and promote optimal viewing conditions. The voltage sensors 696 and 697 are connected to the controller through wires 698. The wires 693 and 698 may pass under or through a spacer/separator placed and sealed in between the panes of the window. The window 690 shown in FIG. 6C may utilize any of the methods described herein for controlling an optical transition.

In some implementations, the voltage sensing pads may be conductive tape pads. The pads may be as small as about 1 $mm^2$ in some embodiments. In these or other cases, the pads may be about 10 $mm^2$ or less. A four wire system may be used in embodiments utilizing such voltage sensing pads.

Electrochromic Devices and Controllers—Examples

Figure 7A:
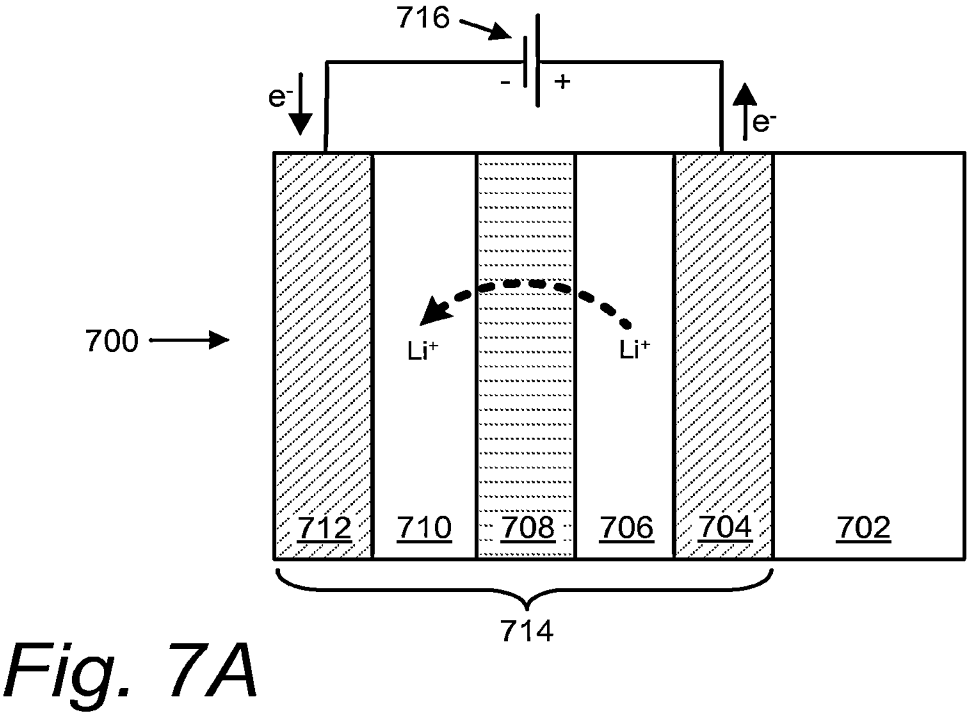
FIGS. 7A and 7B present cross-sectional views of an example electrochromic device in operation.
Figure 7B:
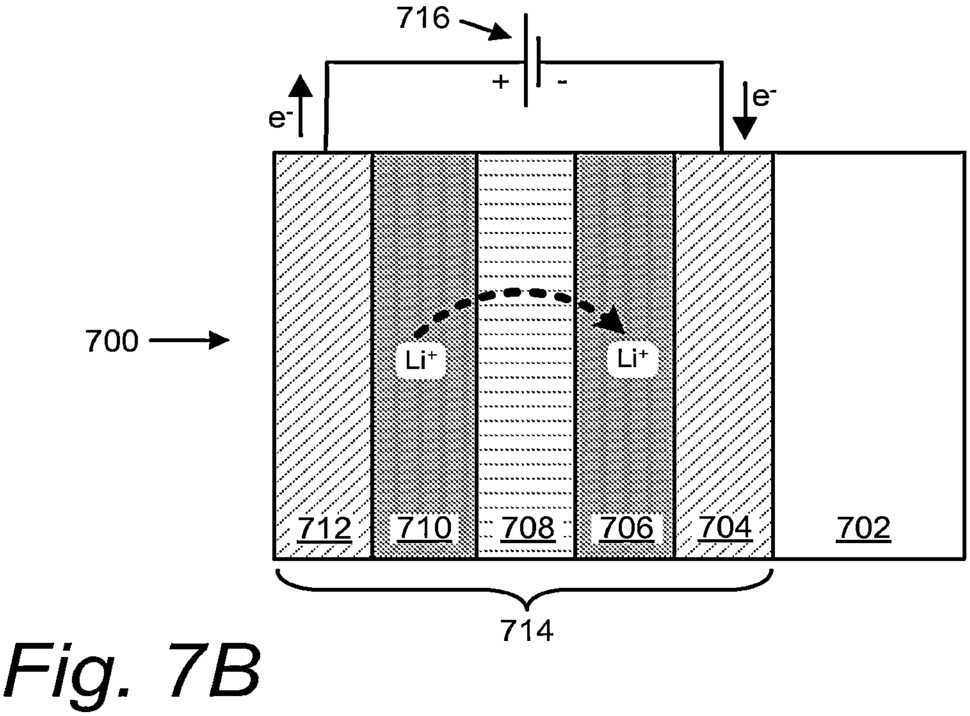

Examples of electrochromic device structure and fabrication will now be presented. FIGS. 7A and 7B are schematic cross-sections of an electrochromic device, 700, showing a common structural motif for such devices. Electrochromic device 700 includes a substrate 702, a conductive layer (CL) 704, an electrochromic layer (EC) 706, an optional ion conducting (electronically resistive) layer (IC) 708, a counter electrode layer (CE) 710, and another conductive layer (CL) 712. Elements 704, 706, 708, 710, and 712 are collectively referred to as an electrochromic stack, 714. In numerous embodiments, the stack does not contain ion conducting layer 708, or at least not as a discrete or separately fabricated layer. A voltage source, 716, operable to apply an electric potential across electrochromic stack 712 effects the transition of the electrochromic device from, e.g., a clear state (refer to FIG. 7A) to a tinted state (refer to FIG. 7B).

The order of layers may be reversed with respect to the substrate. That is, the layers may be in the following order: substrate, conductive layer, counter electrode layer, ion conducting layer, electrochromic material layer, and conductive layer. The counter electrode layer may include a material that is electrochromic or not. If both the electrochromic layer and the counter electrode layer employ electrochromic materials, one of them should be a cathodically coloring material and the other should be an anodically coloring material. For example, the electrochromic layer may employ a cathodically coloring material and the counter electrode layer may employ an anodically coloring material. This is the case when the electrochromic layer is a tungsten oxide and the counter electrode layer is a nickel tungsten oxide.

The conductive layers commonly comprise transparent conductive materials, such as metal oxides, alloy oxides, and doped versions thereof, and are commonly referred to as "TCO" layers because they are made from transparent conducting oxides. In general, however, the transparent layers can be made of any transparent, electronically conductive material that is compatible with the device stack. Some glass substrates are provided with a thin transparent conductive oxide layer such as fluorinated tin oxide, sometimes referred to as "FTO."

Device 700 is meant for illustrative purposes, in order to understand the context of embodiments described herein. Methods and apparatus described herein are used to identify and reduce defects in electrochromic devices, regardless of the structural arrangement of the electrochromic device.

During normal operation, an electrochromic device such as device 700 reversibly cycles between a clear state and a tinted state. As depicted in FIG. 7A, in the clear state, a potential is applied across the electrodes (transparent conductor layers 704 and 712) of electrochromic stack 714 to cause available ions (e.g. lithium ions) in the stack to reside primarily in the counter electrode 710. If electrochromic layer 706 contains a cathodically coloring material, the device is in a clear state. In certain electrochromic devices, when loaded with the available ions, counter electrode layer 710 can be thought of as an ion storage layer.

Referring to FIG. 7B, when the potential on the electrochromic stack is reversed, the ions are transported across ion conducting layer 708 to electrochromic layer 706 and cause the material to enter the tinted state. Again, this assumes that the optically reversible material in the electrochromic device is a cathodically coloring electrochromic material. In certain embodiments, the depletion of ions from the counter electrode material causes it to color also as depicted. In other words, the counter electrode material is anodically coloring electrochromic material. Thus, layers 706 and 710 combine to reduce the amount of light transmitted through the stack. When a reverse voltage is applied to device 700, ions travel from electrochromic layer 706, through the ion conducting layer 708, and back into counter electrode layer 710. As a result, the device clears.

Some pertinent examples of electrochromic devices are presented in the following US patent applications, each incorporated by reference in its entirety: U.S. patent application Ser. No. 12/645,111, filed Dec. 22, 2009; U.S. patent application Ser. No. 12/772,055, filed Apr. 30, 2010; U.S. patent application Ser. No. 12/645,159, filed Dec. 22, 2009; U.S. patent application Ser. No. 12/814,279, filed Jun. 11, 2010; U.S. patent application Ser. No. 13/462,725, filed May 2, 2012 and U.S. patent application Ser. No. 13/763,505, filed Feb. 8, 2013.

Electrochromic devices such as those described in relation to FIGS. 7A and 7B are used in, for example, electrochromic windows. For example, substrate 702 may be architectural glass upon which electrochromic devices are fabricated. Architectural glass is glass that is used as a building material. Architectural glass is typically used in commercial buildings, but may also be used in residential buildings, and typically, though not necessarily, separates an indoor environment from an outdoor environment. In certain embodiments, architectural glass is at least 20 inches by 20 inches, and can be much larger, e.g., as large as about 72 inches by 120 inches.

In some embodiments, electrochromic glass is integrated into an insulating glass unit (IGU). An insulating glass unit includes multiple glass panes assembled into a unit, generally with the intention of maximizing the thermal insulating properties of a gas contained in the space formed by the unit while at the same time providing clear vision through the unit. Insulating glass units incorporating electrochromic glass are similar to insulating glass units currently known in the art, except for electrical terminals for connecting the electrochromic glass to voltage source.

The optical transition driving logic can be implemented in many different controller configurations and coupled with other control logic. Various examples of suitable controller design and operation are provided in the following patent applications, each incorporated herein by reference in its entirety: U.S. patent application Ser. No. 13/049,623, filed Mar. 16, 2011; U.S. patent application Ser. No. 13/049,756, filed Mar. 16, 2011; U.S. Pat. No. 8,213,074, filed Mar. 16, 2011; U.S. patent application Ser. No. 13/449,235, filed Apr. 17, 2012; U.S. patent application Ser. No. 13/449,248, filed Apr. 17, 2012; U.S. patent application Ser. No. 13/449,251, filed Apr. 17, 2012; U.S. patent application Ser. No. 13/326,168, filed Dec. 14, 2011; U.S. patent application Ser. No. 13/682,618, filed Nov. 20, 2012; and U.S. patent application Ser. No. 13/772,969, filed Feb. 21, 2013. The following description and associated figures, FIGS. 8 and 9, present certain non-limiting controller design options suitable for implementing the drive profiles described herein.

Figure 8:
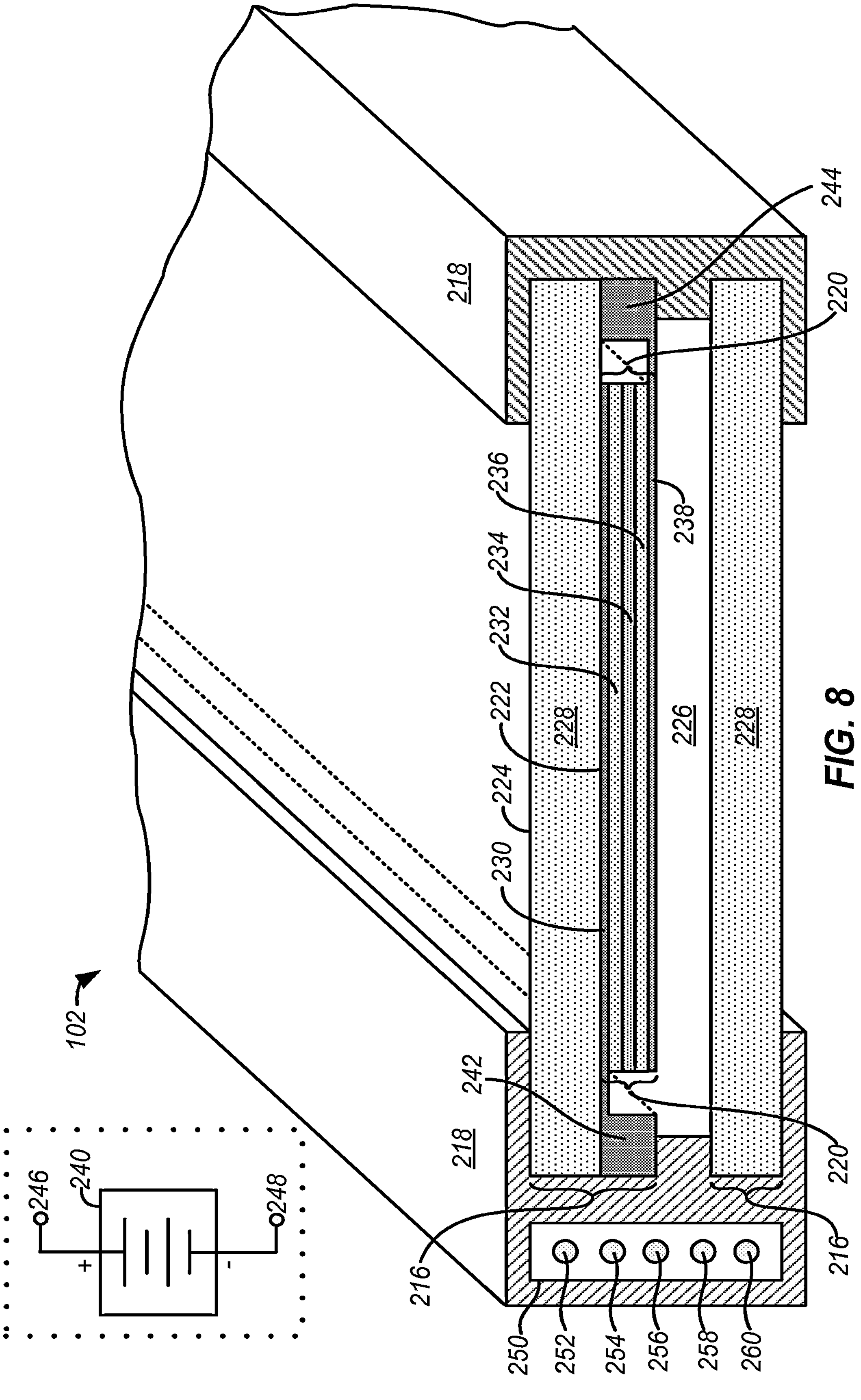
FIGS. 8 and 9 are representations of window controllers and associated components.
Figure 9:
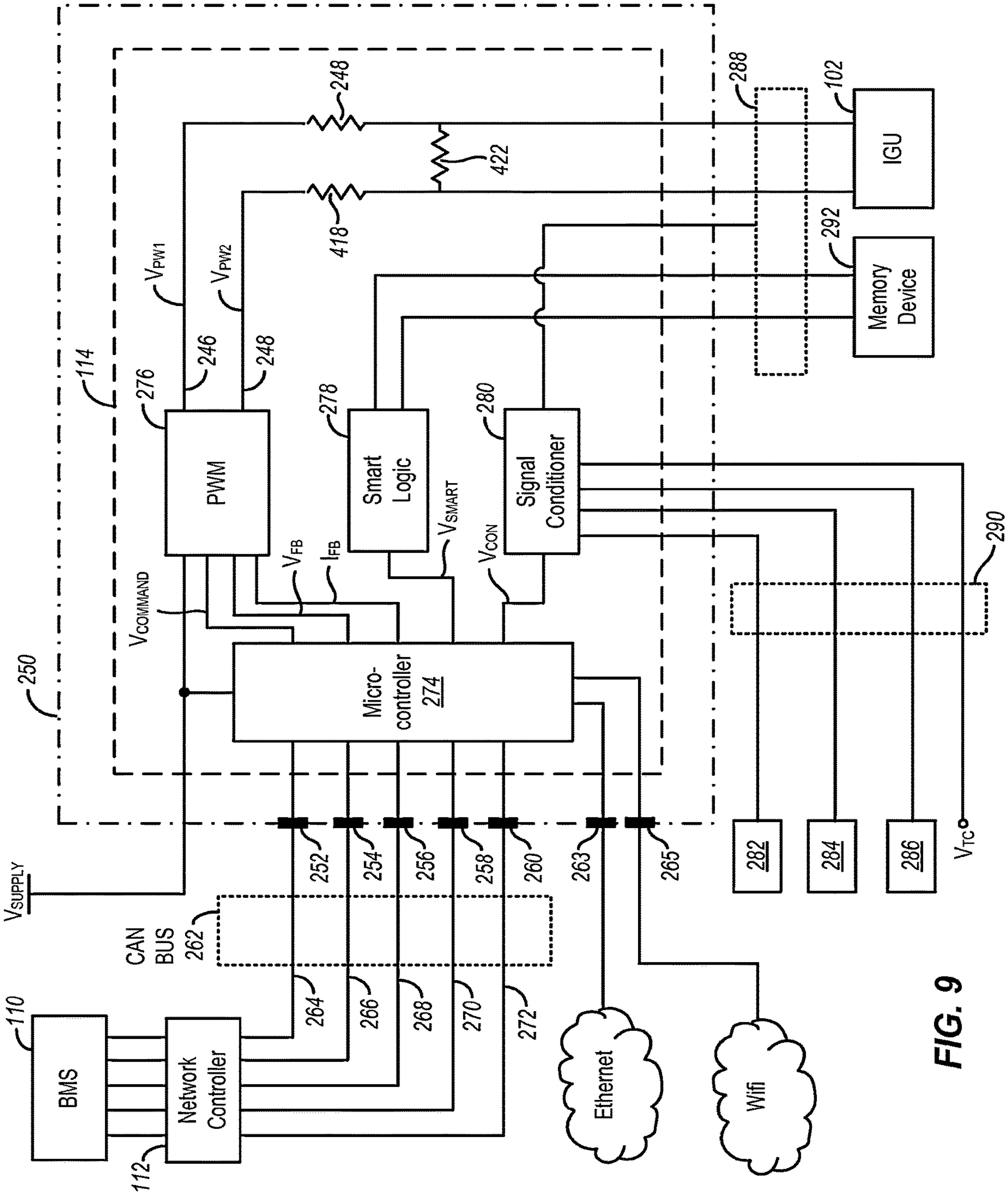

FIG. 8 shows a cross-sectional axonometric view of an embodiment of an IGU 102 that includes two window panes or lites 216 and a controller 250. In various embodiments, IGU 102 can include one, two, or more substantially transparent (e.g., at no applied voltage) lites 216 as well as a frame, 218, that supports the lites 216. For example, the IGU 102 shown in FIG. 9 is configured as a double-pane window. One or more of the lites 216 can itself be a laminate structure of two, three, or more layers or lites (e.g., shatter-resistant glass similar to automotive windshield glass). In IGU 102, at least one of the lites 216 includes an electrochromic device or stack, 220, disposed on at least one of its inner surface, 222, or outer surface, 224: for example, the inner surface 222 of the outer lite 216.

In multi-pane configurations, each adjacent set of lites 216 can have an interior volume, 226, disposed between them. Generally, each of the lites 216 and the IGU 102 as a whole are rectangular and form a rectangular solid. However, in other embodiments other shapes (e.g., circular, elliptical, triangular, curvilinear, convex, concave) may be desired. In some embodiments, the volume 226 between the lites 116 is evacuated of air. In some embodiments, the IGU 102 is hermetically-sealed. Additionally, the volume 226 can be filled (to an appropriate pressure) with one or more gases, such as argon (Ar), krypton (Kr), or xenon (Xn), for example. Filling the volume 226 with a gas such as Ar, Kr, or Xn can reduce conductive heat transfer through the IGU 102 because of the low thermal conductivity of these gases. The latter two gases also can impart improved acoustic insulation due to their increased weight.

In some embodiments, frame 218 is constructed of one or more pieces. For example, frame 218 can be constructed of one or more materials such as vinyl, PVC, aluminum (Al), steel, or fiberglass. The frame 218 may also include or hold one or more foam or other material pieces that work in conjunction with frame 218 to separate the lites 216 and to hermetically seal the volume 226 between the lites 216. For example, in a typical IGU implementation, a spacer lies between adjacent lites 216 and forms a hermetic seal with the panes in conjunction with an adhesive sealant that can be deposited between them. This is termed the primary seal, around which can be fabricated a secondary seal, typically of an additional adhesive sealant. In some such embodiments, frame 218 can be a separate structure that supports the IGU construct.

Each lite 216 includes a substantially transparent or translucent substrate, 228. Generally, substrate 228 has a first (e.g., inner) surface 222 and a second (e.g., outer) surface 224 opposite the first surface 222. In some embodiments, substrate 228 can be a glass substrate. For example, substrate 228 can be a conventional silicon oxide ($SO_x$)-based glass substrate such as soda-lime glass or float glass, composed of, for example, approximately 75% silica ($SiO_2$) plus $Na_2O$, CaO, and several minor additives. However, any material having suitable optical, electrical, thermal, and mechanical properties may be used as substrate 228. Such substrates also can include, for example, other glass materials, plastics and thermoplastics (e.g., poly(methyl methacrylate), polystyrene, polycarbonate, allyl diglycol carbonate, SAN (styrene acrylonitrile copolymer), poly(4-methyl-1-pentene), polyester, polyimide), or mirror materials. If the substrate is formed from, for example, glass, then substrate 228 can be strengthened, e.g., by tempering, heating, or chemically strengthening. In other implementations, the substrate 228 is not further strengthened, e.g., the substrate is untempered.

In some embodiments, substrate 228 is a glass pane sized for residential or commercial window applications. The size of such a glass pane can vary widely depending on the specific needs of the residence or commercial enterprise. In some embodiments, substrate 228 can be formed of architectural glass. Architectural glass is typically used in commercial buildings, but also can be used in residential buildings, and typically, though not necessarily, separates an indoor environment from an outdoor environment. In certain embodiments, a suitable architectural glass substrate can be at least approximately 20 inches by approximately 20 inches, and can be much larger, for example, approximately 80 inches by approximately 120 inches, or larger. Architectural glass is typically at least about 2 millimeters (mm) thick and may be as thick as 6 mm or more. Of course, electrochromic devices 220 can be scalable to substrates 228 smaller or larger than architectural glass, including in any or all of the respective length, width, or thickness dimensions. In some embodiments, substrate 228 has a thickness in the range of approximately 1 mm to approximately 10 mm. In some embodiments, substrate 228 may be very thin and flexible, such as Gorilla Glass® or Willow™ Glass, each commercially available from Corning, Inc. of Corning, New York, these glasses may be less than 1 mm thick, as thin as 0.3 mm thick.

Electrochromic device 220 is disposed over, for example, the inner surface 222 of substrate 228 of the outer pane 216 (the pane adjacent the outside environment). In some other embodiments, such as in cooler climates or applications in which the IGUs 102 receive greater amounts of direct sunlight (e.g., perpendicular to the surface of electrochromic device 220), it may be advantageous for electrochromic device 220 to be disposed over, for example, the inner surface (the surface bordering the volume 226) of the inner pane adjacent the interior environment. In some embodiments, electrochromic device 220 includes a first conductive layer (CL) 230 (often transparent), an electrochromic layer (EC) 232, an ion conducting layer (IC) 234, a counter electrode layer (CE) 236, and a second conductive layer (CL) 238 (often transparent). Again, layers 230, 232, 234, 236, and 238 are also collectively referred to as electrochromic stack 220.

A power source 240 operable to apply an electric potential ($V_{app}$) to the device and produce $V_{eff}$ across a thickness of electrochromic stack 220 and drive the transition of the electrochromic device 220 from, for example, a clear or lighter state (e.g., a transparent, semitransparent, or translucent state) to a tinted or darker state (e.g., a tinted, less transparent or less translucent state). In some other embodiments, the order of layers 230, 232, 234, 236, and 238 can be reversed or otherwise reordered or rearranged with respect to substrate 238.

In some embodiments, one or both of first conductive layer 230 and second conductive layer 238 is formed from an inorganic and solid material. For example, first conductive layer 230, as well as second conductive layer 238, can be made from a number of different materials, including conductive oxides, thin metallic coatings, conductive metal nitrides, and composite conductors, among other suitable materials. In some embodiments, conductive layers 230 and 238 are substantially transparent at least in the range of wavelengths where electrochromism is exhibited by the electrochromic layer 232. Transparent conductive oxides include metal oxides and metal oxides doped with one or more metals. For example, metal oxides and doped metal oxides suitable for use as first or second conductive layers 230 and 238 can include indium oxide, indium tin oxide (ITO), doped indium oxide, tin oxide, doped tin oxide, zinc oxide, aluminum zinc oxide, doped zinc oxide, ruthenium oxide, doped ruthenium oxide, among others. As indicated above, first and second conductive layers 230 and 238 are sometimes referred to as "transparent conductive oxide" (TCO) layers.

In some embodiments, commercially available substrates, such as glass substrates, already contain a transparent conductive layer coating when purchased. In some embodiments, such a product can be used for both substrate 238 and conductive layer 230 collectively. Examples of such glass substrates include conductive layer-coated glasses sold under the trademark TEC Glass™ by Pilkington, of Toledo, Ohio and SUNGATE™ 300 and SUNGATE™ 500 by PPG Industries of Pittsburgh, Pennsylvania. Specifically, TEC Glass™ is, for example, a glass coated with a fluorinated tin oxide conductive layer.

In some embodiments, first or second conductive layers 230 and 238 can each be deposited by physical vapor deposition processes including, for example, sputtering. In some embodiments, first and second conductive layers 230 and 238 can each have a thickness in the range of approximately 0.01 μm to approximately 1 μm. In some embodiments, it may be generally desirable for the thicknesses of the first and second conductive layers 230 and 238 as well as the thicknesses of any or all of the other layers described below to be individually uniform with respect to the given layer; that is, that the thickness of a given layer is uniform and the surfaces of the layer are smooth and substantially free of defects or other ion traps.

A primary function of the first and second conductive layers 230 and 238 is to spread an electric potential provided by a power source 240, such as a voltage or current source, over surfaces of the electrochromic stack 220 from outer surface regions of the stack to inner surface regions of the stack. As mentioned, the voltage applied to the electrochromic device experiences some Ohmic potential drop from the outer regions to the inner regions as a result of a sheet resistance of the first and second conductive layers 230 and 238. In the depicted embodiment, bus bars 242 and 244 are provided with bus bar 242 in contact with conductive layer 230 and bus bar 244 in contact with conductive layer 238 to provide electric connection between the voltage or current source 240 and the conductive layers 230 and 238. For example, bus bar 242 can be electrically coupled with a first (e.g., positive) terminal 246 of power source 240 while bus bar 244 can be electrically coupled with a second (e.g., negative) terminal 248 of power source 240.

In some embodiments, IGU 102 includes a plug-in component 250. In some embodiments, plug-in component 250 includes a first electrical input 252 (e.g., a pin, socket, or other electrical connector or conductor) that is electrically coupled with power source terminal 246 via, for example, one or more wires or other electrical connections, components, or devices. Similarly, plug-in component 250 can include a second electrical input 254 that is electrically coupled with power source terminal 248 via, for example, one or more wires or other electrical connections, components, or devices. In some embodiments, first electrical input 252 can be electrically coupled with bus bar 242, and from there with first conductive layer 230, while second electrical input 254 can be coupled with bus bar 244, and from there with second conductive layer 238. The conductive layers 230 and 238 also can be connected to power source 240 with other conventional means as well as according to other means described below with respect to a window controller. For example, as described below with reference to FIG. 9, first electrical input 252 can be connected to a first power line while second electrical input 254 can be connected to a second power line. Additionally, in some embodiments, third electrical input 256 can be coupled to a device, system, or building ground. Furthermore, in some embodiments, fourth and fifth electrical inputs/outputs 258 and 260, respectively, can be used for communication between, for example, a window controller or microcontroller and a network controller.

In some embodiments, electrical input 252 and electrical input 254 receive, carry, or transmit complementary power signals. In some embodiments, electrical input 252 and its complement electrical input 254 can be directly connected to the bus bars 242 and 244, respectively, and on the other side, to an external power source that provides a variable DC voltage (e.g., sign and magnitude). The external power source can be a window controller (see element 114 of FIG. 9) itself, or power from a building transmitted to a window controller or otherwise coupled to electrical inputs 252 and 254. In such an embodiment, the electrical signals transmitted through electrical inputs/outputs 258 and 260 can be directly connected to a memory device to allow communication between the window controller and the memory device. Furthermore, in such an embodiment, the electrical signal input to electrical input 256 can be internally connected or coupled (within IGU 102) to either electrical input 252 or 254 or to the bus bars 242 or 244 in such a way as to enable the electrical potential of one or more of those elements to be remotely measured (sensed). This can allow the window controller to compensate for a voltage drop on the connecting wires from the window controller to the electrochromic device 220.

In some embodiments, the window controller can be immediately attached (e.g., external to the IGU 102 but inseparable by the user) or integrated within the IGU 102. For example, U.S. patent application Ser. No. 13/049,750 naming Brown et al. as inventors, titled ONBOARD CONTROLLER FOR MULTISTATE WINDOWS and filed 16 Mar. 2011, incorporated by reference herein, describes in detail various embodiments of an "onboard" controller. In such an embodiment, electrical input 252 can be connected to the positive output of an external DC power source. Similarly, electrical input 254 can be connected to the negative output of the DC power source. As described below, however, electrical inputs 252 and 254 can, alternately, be connected to the outputs of an external low voltage AC power source (e.g., a typical 24 V AC transformer common to the HVAC industry). In such an embodiment, electrical inputs/outputs 258 and 260 can be connected to the communication bus between the window controller and a network controller. In this embodiment, electrical input/output 256 can be eventually (e.g., at the power source) connected with the earth ground (e.g., Protective Earth, or PE in Europe) terminal of the system.

Although the applied voltages may be provided as DC voltages, in some embodiments, the voltages actually supplied by the external power source are AC voltage signals. In some other embodiments, the supplied voltage signals are converted to pulse-width modulated voltage signals. However, the voltages actually "seen" or applied to the bus bars 242 and 244 are effectively DC voltages. Typically, the voltage oscillations applied at terminals 246 and 248 are in the range of approximately 1 Hz to 1 MHz, and in particular embodiments, approximately 100 kHz. In various embodiments, the oscillations have asymmetric residence times for the darkening (e.g., tinting) and lightening (e.g., clearing) portions of a period. For example, in some embodiments, transitioning from a first less transparent state to a second more transparent state requires more time than the reverse; that is, transitioning from the more transparent second state to the less transparent first state. As will be described below, a controller can be designed or configured to apply a driving voltage meeting these requirements.

The oscillatory applied voltage control allows the electrochromic device 220 to operate in, and transition to and from, one or more states without any necessary modification to the electrochromic device stack 220 or to the transitioning time. Rather, the window controller can be configured or designed to provide an oscillating drive voltage of appropriate wave profile, taking into account such factors as frequency, duty cycle, mean voltage, amplitude, among other possible suitable or appropriate factors. Additionally, such a level of control permits the transitioning to any state over the full range of optical states between the two end states. For example, an appropriately configured controller can provide a continuous range of transmissivity (% T) which can be tuned to any value between end states (e.g., opaque and clear end states).

To drive the device to an intermediate state using the oscillatory driving voltage, a controller could simply apply the appropriate intermediate voltage. However, there can be more efficient ways to reach the intermediate optical state.

This is partly because high driving voltages can be applied to reach the end states but are traditionally not applied to reach an intermediate state. One technique for increasing the rate at which the electrochromic device 220 reaches a desired intermediate state is to first apply a high voltage pulse suitable for full transition (to an end state) and then back off to the voltage of the oscillating intermediate state (just described). Stated another way, an initial low frequency single pulse (low in comparison to the frequency employed to maintain the intermediate state) of magnitude and duration chosen for the intended final state can be employed to speed the transition. After this initial pulse, a higher frequency voltage oscillation can be employed to sustain the intermediate state for as long as desired.

In some embodiments, each IGU 102 includes a component 250 that is "pluggable" or readily-removable from IGU 102 (e.g., for ease of maintenance, manufacture, or replacement). In some particular embodiments, each plug-in component 250 itself includes a window controller. That is, in some such embodiments, each electrochromic device 220 is controlled by its own respective local window controller located within plug-in component 250. In some other embodiments, the window controller is integrated with another portion of frame 218, between the glass panes in the secondary seal area, or within volume 226. In some other embodiments, the window controller can be located external to IGU 102. In various embodiments, each window controller can communicate with the IGUs 102 it controls and drives, as well as communicate to other window controllers, the network controller, BMS, or other servers, systems, or devices (e.g., sensors), via one or more wired (e.g., Ethernet) networks or wireless (e.g., WiFi) networks, for example, via wired (e.g., Ethernet) interface 263 or wireless (WiFi) interface 265. See FIG. 9. Embodiments having Ethernet or Wifi capabilities are also well-suited for use in residential homes and other smaller-scale non-commercial applications. Additionally, the communication can be direct or indirect, e.g., via an intermediate node between a master controller such as network controller 112 and the IGU 102.

FIG. 9 depicts a window controller 114, which may be deployed as, for example, component 250. In some embodiments, window controller 114 communicates with a network controller over a communication bus 262. For example, communication bus 262 can be designed according to the Controller Area Network (CAN) vehicle bus standard. In such embodiments, first electrical input 252 can be connected to a first power line 264 while second electrical input 254 can be connected to a second power line 266. In some embodiments, as described above, the power signals sent over power lines 264 and 266 are complementary; that is, collectively they represent a differential signal (e.g., a differential voltage signal). In some embodiments, line 268 is coupled to a system or building ground (e.g., an Earth Ground). In such embodiments, communication over CAN bus 262 (e.g., between microcontroller 274 and network controller 112) may proceed along first and second communication lines 270 and 272 transmitted through electrical inputs/outputs 258 and 260, respectively, according to the CANopen communication protocol or other suitable open, proprietary, or overlying communication protocol. In some embodiments, the communication signals sent over communication lines 270 and 272 are complementary; that is, collectively they represent a differential signal (e.g., a differential voltage signal).

In some embodiments, component 250 couples CAN communication bus 262 into window controller 114, and in particular embodiments, into microcontroller 274. In some such embodiments, microcontroller 274 is also configured to implement the CANopen communication protocol. Microcontroller 274 is also designed or configured (e.g., programmed) to implement one or more drive control algorithms in conjunction with pulse-width modulated amplifier or pulse-width modulator (PWM) 276, smart logic 278, and signal conditioner 280. In some embodiments, microcontroller 274 is configured to generate a command signal $V_{COMMAND}$, e.g., in the form of a voltage signal, that is then transmitted to PWM 276. PWM 276, in turn, generates a pulse-width modulated power signal, including first (e.g., positive) component $V_{PW1}$ and second (e.g., negative) component $V_{PW2}$, based on $V_{COMMAND}$. Power signals $V_{PW1}$ and $V_{PW2}$ are then transmitted over, for example, interface 288, to IGU 102, or more particularly, to bus bars 242 and 244 in order to cause the desired optical transitions in electrochromic device 220. In some embodiments, PWM 276 is configured to modify the duty cycle of the pulse-width modulated signals such that the durations of the pulses in signals $V_{PW1}$ and $V_{PW2}$ are not equal: for example, PWM 276 pulses $V_{PW1}$ with a first 60% duty cycle and pulses $V_{PW2}$ for a second 40% duty cycle. The duration of the first duty cycle and the duration of the second duty cycle collectively represent the duration, $t_{PWM}$ of each power cycle. In some embodiments, PWM 276 can additionally or alternatively modify the magnitudes of the signal pulses $V_{PW1}$ and $V_{PW2}$.

In some embodiments, microcontroller 274 is configured to generate $V_{COMMAND}$ based on one or more factors or signals such as, for example, any of the signals received over CAN bus 262 as well as voltage or current feedback signals, $V_{FB}$ and $I_{FB}$ respectively, generated by PWM 276. In some embodiments, microcontroller 274 determines current or voltage levels in the electrochromic device 220 based on feedback signals $I_{FB}$ or $V_{FB}$, respectively, and adjusts $V_{COMMAND}$ according to one or more rules or algorithms to effect a change in the relative pulse durations (e.g., the relative durations of the first and second duty cycles) or amplitudes of power signals $V_{PW1}$ and $V_{PW2}$ to produce voltage profiles as described above. Additionally or alternatively, microcontroller 274 can also adjust $V_{COMMAND}$ in response to signals received from smart logic 278 or signal conditioner 280. For example, a conditioning signal $V_{CON}$ can be generated by signal conditioner 280 in response to feedback from one or more networked or non-networked devices or sensors, such as, for example, an exterior photosensor or photodetector 282, an interior photosensor or photodetector 284, a thermal or temperature sensor 286, or a tint command signal $V_{TC}$. For example, additional embodiments of signal conditioner 280 and $V_{CON}$ are also described in U.S. patent application Ser. No. 13/449,235, filed 17 Apr. 2012, and previously incorporated by reference.

In certain embodiments, $V_{TC}$ can be an analog voltage signal between 0 V and 10 V that can be used or adjusted by users (such as residents or workers) to dynamically adjust the tint of an IGU 102 (for example, a user can use a control in a room or zone of building 104 similarly to a thermostat to finely adjust or modify a tint of the IGUs 102 in the room or zone) thereby introducing a dynamic user input into the logic within microcontroller 274 that determines $V_{COMMAND}$. For example, when set in the 0 to 2.5 V range, $V_{TC}$ can be used to cause a transition to a 5% T state, while when set in the 2.51 to 5 V range, $V_{TC}$ can be used to cause a transition to a 20% T state, and similarly for other ranges such as 5.1 to 7.5 V and 7.51 to 10 V, among other range and voltage examples. In some embodiments, signal conditioner 280 receives the aforementioned signals or other signals over a communication bus or interface 290. In some embodiments, PWM 276 also generates $V_{COMMAND}$ based on a signal $V_{SMART}$ received from smart logic 278. In some embodiments, smart logic 278 transmits $V_{SMART}$ over a communication bus such as, for example, an Inter-Integrated Circuit ($I^2C$) multi-master serial single-ended computer bus. In some other embodiments, smart logic 278 communicates with memory device 292 over a 1-WIRE device communications bus system protocol (by Dallas Semiconductor Corp., of Dallas, Texas).

In some embodiments, microcontroller 274 includes a processor, chip, card, or board, or a combination of these, which includes logic for performing one or more control functions. Power and communication functions of microcontroller 274 may be combined in a single chip, for example, a programmable logic device (PLD) chip or field programmable gate array (FPGA), or similar logic. Such integrated circuits can combine logic, control and power functions in a single programmable chip. In one embodiment, where one pane 216 has two electrochromic devices 220 (e.g., on opposite surfaces) or where IGU 102 includes two or more panes 216 that each include an electrochromic device 220, the logic can be configured to control each of the two electrochromic devices 220 independently from the other. However, in one embodiment, the function of each of the two electrochromic devices 220 is controlled in a synergistic fashion, for example, such that each device is controlled in order to complement the other. For example, the desired level of light transmission, thermal insulative effect, or other property can be controlled via a combination of states for each of the individual electrochromic devices 220. For example, one electrochromic device may be placed in a tinted state while the other is used for resistive heating, for example, via a transparent electrode of the device. In another example, the optical states of the two electrochromic devices are controlled so that the combined transmissivity is a desired outcome.

In general, the logic used to control electrochromic device transitions can be designed or configured in hardware and/or software. In other words, the instructions for controlling the drive circuitry may be hard coded or provided as software. In may be said that the instructions are provided by "programming". Such programming is understood to include logic of any form including hard coded logic in digital signal processors and other devices which have specific algorithms implemented as hardware. Programming is also understood to include software or firmware instructions that may be executed on a general purpose processor. In some embodiments, instructions for controlling application of voltage to the bus bars are stored on a memory device associated with the controller or are provided over a network. Examples of suitable memory devices include semiconductor memory, magnetic memory, optical memory, and the like. The computer program code for controlling the applied voltage can be written in any conventional computer readable programming language such as assembly language, C, C++, Pascal, Fortran, and the like. Compiled object code or script is executed by the processor to perform the tasks identified in the program.

As described above, in some embodiments, microcontroller 274, or window controller 114 generally, also can have wireless capabilities, such as wireless control and powering capabilities. For example, wireless control signals, such as radio-frequency (RF) signals or infra-red (IR) signals can be used, as well as wireless communication protocols such as WiFi (mentioned above), Bluetooth, Zigbee, EnOcean, among others, to send instructions to the microcontroller 274 and for microcontroller 274 to send data out to, for example, other window controllers, a network controller 112, or directly to a BMS 110. In various embodiments, wireless communication can be used for at least one of programming or operating the electrochromic device 220, collecting data or receiving input from the electrochromic device 220 or the IGU 102 generally, collecting data or receiving input from sensors, as well as using the window controller 114 as a relay point for other wireless communications. Data collected from IGU 102 also can include count data, such as a number of times an electrochromic device 220 has been activated (cycled), an efficiency of the electrochromic device 220 over time, among other useful data or performance metrics.

The window controller 114 also can have wireless power capability. For example, window controller can have one or more wireless power receivers that receive transmissions from one or more wireless power transmitters as well as one or more wireless power transmitters that transmit power transmissions enabling window controller 114 to receive power wirelessly and to distribute power wirelessly to electrochromic device 220. Wireless power transmission includes, for example, induction, resonance induction, RF power transfer, microwave power transfer, and laser power transfer. For example, U.S. patent application Ser. No. 12/971,576 naming Rozbicki as inventor, titled WIRELESS POWERED ELECTROCHROMIC WINDOWS and filed 17 Dec. 2010, incorporated by reference herein, describes in detail various embodiments of wireless power capabilities.

In order to achieve a desired optical transition, the pulse-width modulated power signal is generated such that the positive component $V_{PW1}$ is supplied to, for example, bus bar 244 during the first portion of the power cycle, while the negative component $V_{PW2}$ is supplied to, for example, bus bar 242 during the second portion of the power cycle.

In some cases, depending on the frequency (or inversely the duration) of the pulse-width modulated signals, this can result in bus bar 244 floating at substantially the fraction of the magnitude of $V_{PW1}$ that is given by the ratio of the duration of the first duty cycle to the total duration $t_{PWM}$ of the power cycle. Similarly, this can result in bus bar 242 floating at substantially the fraction of the magnitude of $V_{PW2}$ that is given by the ratio of the duration of the second duty cycle to the total duration $t_{PWM}$ of the power cycle. In this way, in some embodiments, the difference between the magnitudes of the pulse-width modulated signal components $V_{PW1}$ and $V_{PW2}$ is twice the effective DC voltage across terminals 246 and 248, and consequently, across electrochromic device 220. Said another way, in some embodiments, the difference between the fraction (determined by the relative duration of the first duty cycle) of $V_{PW1}$ applied to bus bar 244 and the fraction (determined by the relative duration of the second duty cycle) of $V_{PW2}$ applied to bus bar 242 is the effective DC voltage $V_{EFF}$ applied to electrochromic device 220. The current IEFF through the load—electromagnetic device 220—is roughly equal to the effective voltage VEFF divided by the effective resistance (represented by resistor 316) or impedance of the load.

Those of ordinary skill in the art will also understand that this description is applicable to various types of drive mechanism including fixed voltage (fixed DC), fixed polarity (time varying DC) or a reversing polarity (AC, MF, RF power etc. with a DC bias).

The controller may be configured to monitor voltage and/or current from the optically switchable device. In some embodiments, the controller is configured to calculate current by measuring voltage across a known resistor in the driving circuit. Other modes of measuring or calculating current may be employed. These modes may be digital or analog.

OTHER EMBODIMENTS

Although the foregoing embodiments have been described in some detail to facilitate understanding, the described embodiments are to be considered illustrative and not limiting. It will be apparent to one of ordinary skill in the art that certain changes and modifications can be practiced within the scope of the appended claims. For example, while the drive profiles have been described with reference to electrochromic devices having planar bus bars, they apply to any bus bar orientation in which bus bars of opposite polarity are separated by distances great enough to cause a significant ohmic voltage drop in a transparent conductor layer from one bus bar to another. Further, while the drive profiles have been described with reference to electrochromic devices, they can be applied to other devices in which bus bars of opposite polarity are disposed at opposite sides of the devices.

What is claimed is:

1. A method for controlling a transition of an optically switchable device from a starting optical state to an ending optical state, the method comprising:

applying a voltage between a first bus bar and a second bus bar of the optically switchable device;

at one or more times, reducing a magnitude of the voltage applied between the first and second bus bars of the optically switchable device to a probe voltage and detecting a current response, and periodically determining a charge supplied to the optically switchable device;

determining whether the detected current response reaches a target current, and determining whether a magnitude of the supplied charge is greater than or equal to a threshold charge; and if it is determined the detected current response reaches the target current, and that the magnitude of the supplied charge is greater than or equal to the magnitude of the threshold charge, applying a hold voltage.

2. The method of claim 1, wherein reducing the magnitude of the voltage applied between the first and second bus bars of the optically switchable device is performed periodically during the transition.

3. The method of claim 2, wherein reducing the magnitude of the voltage applied between the first and second bus bars of the optically switchable device is performed at a frequency between about once every 10 seconds and about once every 500 seconds.

4. The method of claim 3, wherein the frequency is between about once every 10 seconds and once every 120 seconds.

5. The method of claim 4, wherein the frequency is between about once every 20 seconds and once every 30 seconds.

6. The method of claim 2, wherein reducing the magnitude of the voltage applied between the first and second bus bars of the optically switchable device is performed at a frequency that is selected based on a size of the optically switchable device or a separation distance between the first and second bus bars of the optically switchable device.

7. The method of claim 2, wherein reducing the magnitude of the voltage applied between the first and second bus bars of the optically switchable device is performed at a frequency that is selected based on an expected duration of the transition.

8. The method of claim 7, wherein the frequency is selected such that the magnitude of the voltage applied between the first and second bus bars of the optically switchable device is reduced between about 5 times and about 50 times over the transition.

9. The method of claim 1, wherein the magnitude of the voltage applied between the first and second bus bars of the optically switchable device is reduced for a duration that is between about $1\times10^{-5}$ second and about 20 seconds.

10. The method of claim 9, wherein the duration is between about 0.1 second and about 20 seconds.

11. The method of claim 10, wherein the duration is between about 0.5 second and about 5 seconds.

12. The method of claim 1, wherein the threshold charge corresponds to a charge density comprising a value between about $1\times10^{-5}$ C/cm$^2$ and about 5 C/cm$^2$.

13. The method of claim 1, wherein the target current is about 0 Amps.

14. The method of claim 1, wherein the probe voltage has a magnitude that is between about 0V and about 1V greater than a magnitude of the hold voltage.

15. The method of claim 14, wherein the magnitude of the probe voltage is between about 0V and about 0.4V greater than the magnitude of the hold voltage.

16. The method of claim 1, wherein a magnitude of the probe voltage is at least about 0.025V greater than a magnitude of the hold voltage.

17. The method of claim 16, wherein the magnitude of the probe voltage is at least about 0.05V greater than the magnitude of the hold voltage.

18. The method of claim 17, wherein the magnitude of the probe voltage is at least about 0.1V greater than the magnitude of the hold voltage.

19. The method of claim 1, wherein the optically switchable device is an electrochromic device.

* * * * *